DATA STORAGE AND RETRIEVAL SYSTEM

Filed Sept. 30, 1964 35 Sheets-Sheet 1

INVENTORS
JOHN L. CRAFT
EUGENE R. FLOTO
JOHN W. NEWITT
HOWARD J. SMITH, JR.
BY [signature]
ATTORNEY

ABSOLUTE SEARCH

INTEGRAL SEARCH

FORMATS

FIG. 4

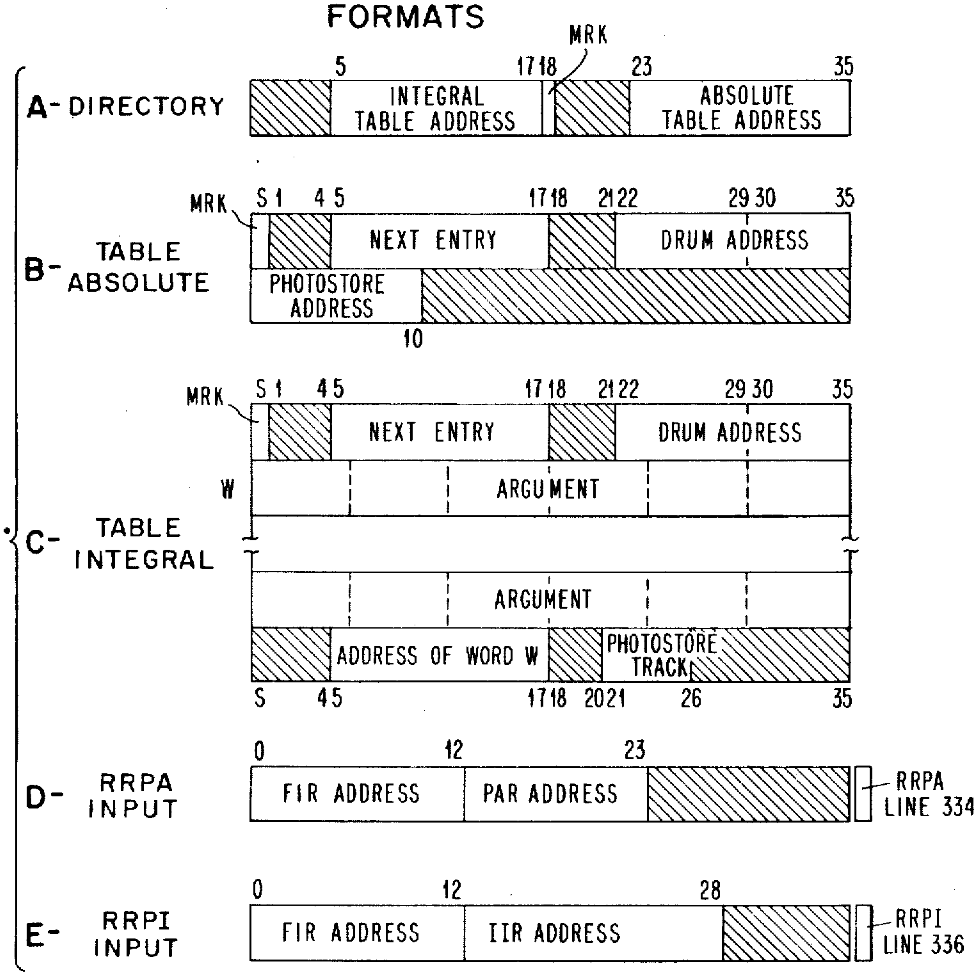

PHOTOSTORE FORMATS

FIG. 5

A- ABSOLUTE $\alpha 1\ \alpha 2\ \phi$ TR $\tau$ (FUNCTION) $\alpha 1\ \alpha 2$ B- EARLY WARNING $\alpha 1\ \alpha 2\ \phi$ TR' $\tau\ \alpha 1\ \alpha 2$ WHERE R' = R WITH A BIT IN HIGHEST ORDER POSITION OF THE BYTE C- INTEGRAL (NORMAL) $\alpha 1\ \alpha 2$ (ARGUMENT) $\tau$ (FUNCTION) $\alpha 1\ \alpha 2$ D- INTEGRAL (WITH PREFIX) $\alpha 1\ \alpha 2$ (PREFIX) $\alpha 1$ (ARGUMENT) $\tau$ (FUNCTION) $\mu$ (NEW PREFIX) $\alpha 1\ \alpha 2$ E- INTEGRAL (LAST ENTRY) $\alpha 1\ \alpha 2$ (ARGUMENT) $\tau$ (FUNCTION) $\phi$ Fn $\alpha 1\ \alpha 2$

FIG. 6

A- DRUM NON-VERIFIED $\alpha 1\ \alpha 2\ \tau$ (FUNCTION) $\alpha 1\ \alpha 2$

B- DRUM VERIFIED $\alpha 1\ \alpha 2$ S$\tau$ (FUNCTION) $1 \alpha 2 \alpha$

Sept. 26, 1967 J. L. CRAFT ETAL 3,344,405

DATA STORAGE AND RETRIEVAL SYSTEM

Filed Sept. 30, 1964 35 Sheets-Sheet 5

Sept. 26, 1967 J. L. CRAFT ETAL 3,344,405

DATA STORAGE AND RETRIEVAL SYSTEM

Filed Sept. 30, 1964 35 Sheets-Sheet 28

DATA STORAGE AND RETRIEVAL SYSTEM

Filed Sept. 30, 1964

UPPER COMPARATOR

United States Patent Office 3,344,405

Patented Sept. 26, 1967

3,344,405

DATA STORAGE AND RETRIEVAL SYSTEM

John L. Craft, Beacon, Eugene R. Floto, Brewster, and John W. Newitt, Briarcliff Manor, N.Y., and Howard J. Smith, Jr., Glen Rock, N.J., assignors to International Business Machines Corporation, New York, N.Y., a corporation of New York Filed Sept. 30, 1964, Ser. No. 400,450

16 Claims. (Cl. 340—172.5)

ABSTRACT OF THE DISCLOSURE

The invention relates to a storage and retrieval system for data units. The main body of the data is stored in a photostore, and related data to that in the photostore such as, for example, errata and addenda, is stored in a drum. The system also includes a core memory which includes one table for each dictionary on the photostore. There is an entry in the table for each data unit on the drum. The system may operate in either of two modes. If data is to be retrieved from a position addressable dictionary, the system operates in an absolute mode, whereas if data is to be retrieved from a content addressable memory, the system operates in an integral mode. When operated in this latter mode, the table in the core memory is first scanned to determine the best match for an input identifier. Thereafter the photostore is searched to determine if it contains a better match for the input identifier. If so, the data unit is read out of the photostore; if not, the data unit is read out of the drum. When operated in the absolute mode the input address is used to interrogate the core memory to determine if there are entries in the drum. If so, the drum is searched before the photostore. If not, the system proceeds directly to a read out operation on the photostore.

INDEX

| | Column |
|---|---|
| I. Introductory Material | 1 |
| II. General Description | 4 |
| III. General Description of Operation | 6 |
| A. Absolute Search | 6 |
| B. Integral Search Operation | 9 |
| IV. Detailed Circuit Description | 12 |
| V. Detailed Description of Operation | 29 |
| A. Absolute Search | 29 |
| B. Read-Record Integral | 43 |
| VI. Appendix | 63 |
| A. Triggers | 63 |
| B. Detectors | 75 |
| C. Data Lines | 77 |
| D. Comparator Outputs | 79 |

This invention relates to data storage and retrieval systems and more particularly to an improved system of this type using a read-write memory in conjunction with a read-only memory.

In order for an electronic data processing system to perform many accounting and record-keeping functions and such sophisticated functions as language translation and information retrieval, it is necessary that the system have the capacity to store a huge data base. In the past, peripheral equipment having relatively slow access time has often been used to store this file data, thereby substantially increasing the access time to any desired unit of data and substantially reducing the throughput of the system.

Recent advances in photographic storage media have provided new memory devices which are capable of storing a huge data base while still providing fair access time to any desired data unit. However, these memory devices are limited to operation in the read-only mode. It is therefore not possible to supplement, alter, correct, replace, or otherwise act upon a data unit once it has been stored. While it is theoretically possible to produce a completely new photographic storage device each time a change is to be made, this is a relatively slow and costly operation and is not feasible either from an economic or a time standpoint. Another, more practical, solution to the problem presented by the read-only capabilities of the photographic storage devices is to provide an auxiliary read-write store in which changes and other supplementary information is stored between the time periods that new photographic storage devices are produced. Such an auxiliary store could also provide improved reliability by providing a place where information which was erroneously reproduced on the photographic storage media could be stored and retrieved. Such an entry could be made in the auxiliary store whenever it was determined that there was an error on the photographic storage media.

However, when an auxiliary store is employed, there are problems of integrating it into the memory system. Since it would be almost impossible for a person using the system to know whether a given data unit had been corrected or otherwise supplemented, the system must have the capacity to accept all requests for information as if they were on the photostore and give the output from the read-write auxiliary store where the information is in fact contained therein. In order to achieve maximum speed of operation, this capability must be built into the system rather than being derived from a stored program. Another desirable feature of a memory system of this type is that it be content addressable so as to permit the retrieval of a data unit having a known characteristic and that it also be directly addressable so that more rapid retrieval may be effected where the address at which a given unit of information is stored is known. When operating in its content-addressable mode, it must be able to automatically determine on which storage media the best match for a given input request is to be found. Also, when operating in the content-addressable mode, it is desirable that the system have the capability of retrieving information from more than one dictionary, with the term "dictionary" being used here in a broad sense to include tables, directories, and other such compilations of data. This latter capability is particularly useful in information retrieval applications where each dictionary is ordered on a different field of the record, the system providing the capability to retrieve information on the basis of any one of several criteria. Further, when operating in the content-addressable mode, the system should have some processing capability to reduce the size of the dictionary required and to otherwise assist in the retrieval operation. Finally, since some time is required to find where a given data unit is in the memory system, it is desirable that the memory system have the capacity to connect its buffer to the main portion of the data processor during a portion of the period that the search is being performed and that it provide an early warning of when the data is to be located so as to enable the data processor to get out of the buffer before the reading of information into the buffer begins.

It is therefore a primary object of this invention to provide an improved data storage and retrieval system.

A more specific object of this invention is to provide a data storage and retrieval system which has the capacity for storing a huge data base while still providing good access time to the information.

Another object of this invention is to provide a read-only memory with read-write capabilities.

A still more specific object of this invention is to provide an integrated memory system including a read-only memory in which most of the data is stored and a read-write memory in which addenda, errata, and other supplementary data for the main memory is stored.

Another object of this invention is to provide an integrated memory system of the type described above which is capable of being addressed as if all the information were stored in the read-only memory.

A still further object of this invention is to provide an integrated memory system of the type described above which is capable of being addressed either in the integral mode (i.e. content addressable) and in the direct mode (i.e. position addressable).

Another object of this invention is to provide a memory system in which a plurality of different dictionaries may be stored, which system is capable of accessing the proper dictionary to retrieve a desired unit of data.

A still further object of this invention is to provide an integrated memory system of the type described above which requires a minimum of search time to retrieve a desired data unit.

Another object of this invention is to provide a data storage and retrieval system which has the capacity to perform limited processing operations on the applied data so as to assist in the retrieval operation.

Still another object of this invention is to provide a memory system, the buffer of which may be connected to the remainder of the data processor during periods when a search for data is being performed and which provides the data processor with adequate early warning of the retrieval of a data unit so that the data processor may be out of the buffer when the data unit has been retrieved.

In accordance with these objects, this invention provides a read-only memory device in which a large number of data units are stored and a read-write memory device in which data units related to those in the read-only memory are stored. An additional memory device is provided to indicate which data units have a related data unit stored in the read-write memory. Where multiple dictionaries are stored in the read-only memory, a suitable entry in the additional memory device is used to get into the desired dictionary. If a position designation is applied to the system, the additional memory device immediately indicates if this position is in the read-write memory, and if it is in the read-write memory, the position in this memory at which it is stored. If the additional memory device indicates that the data position is not stored in the read-write memory, the system proceeds directly to the read-only memory to retrieve the desired data unit. On the other hand, if an identifier tag for the desired data is applied to the system, the additional memory device is scanned to find the best match for the applied tag. Associated with this best-match tag in the additional memory device is the address in the read-only memory where a search is begun for a possible better match. The best match found in the additional memory device is compared against tags in the read-only memory and, if no better match is found, the desired data unit is read out from the read-write memory from the address indicated in the additional memory device. If a potentially better match is found in the read-only memory, comparison is continued against the input tag and, if the tag in the photostore turns out to be a true match, the associated data unit is read out from the photostore.

The foregoing and other objects, features, and advantages of the invention will be apparent from the following more particular description of a preferred embodiment of the invention, as illustrated in the accompanying drawings.

In the drawings:

FIG. 4A is a diagram of the directory format for the preferred embodiment of the invention.

FIGS. 4B and 4C are diagrams of the table format for the preferred embodiment of the invention.

FIGS. 4D and 4E are diagrams of the input format for the preferred embodiment of the invention.

FIGS. 5A–5E are diagrams illustrating the various entry formats on the photostore.

FIGS. 6A–6B are diagrams illustrating the possible entry formats which appear on the drum in the preferred embodiment of the invention.

FIGS. 7A–7EE when taken together form a composite block diagram of a preferred embodiment of the invention.

Figure 1:
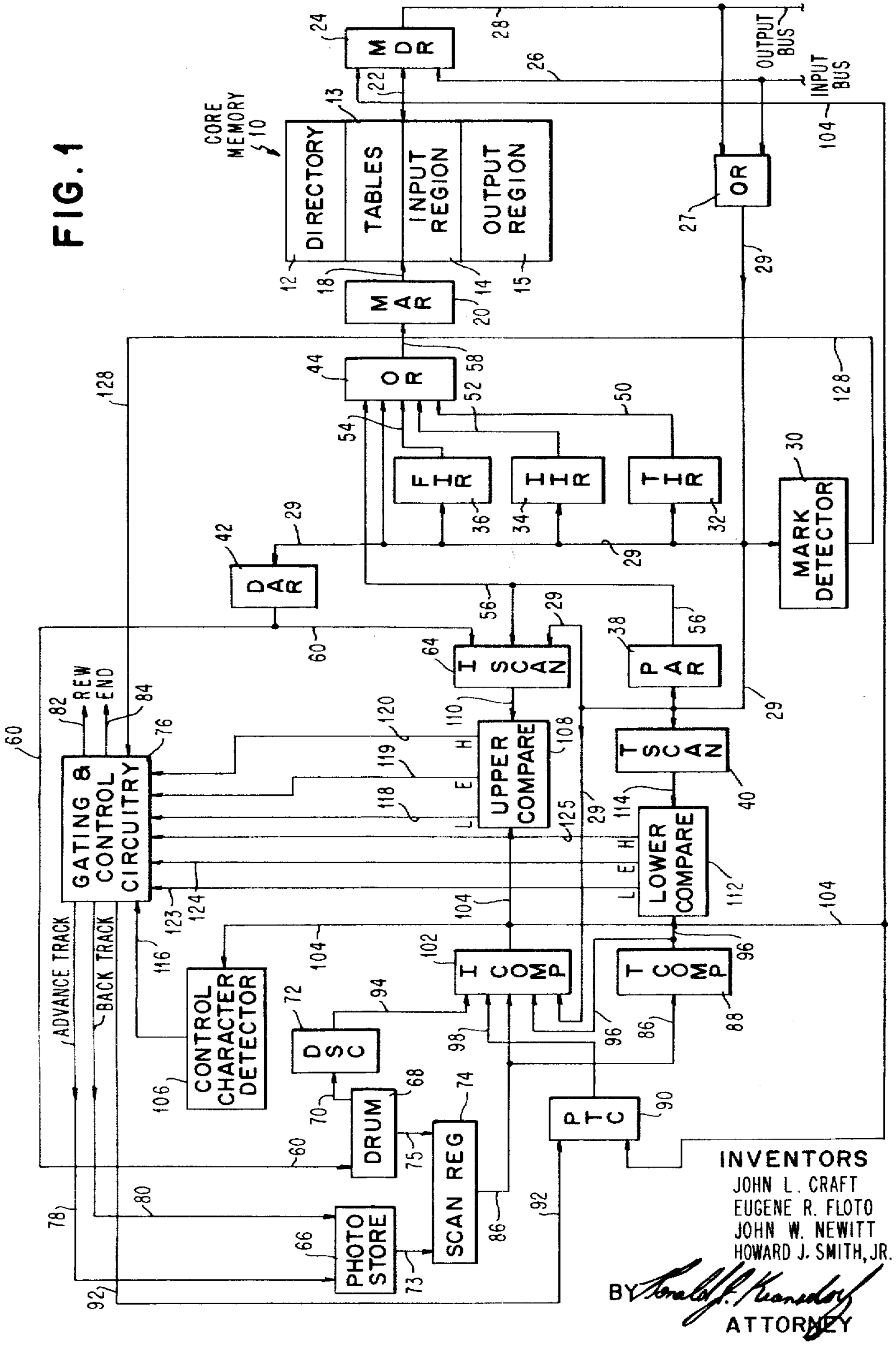
FIG. 1 is a simplified block diagram of an embodiment of the memory system of this invention.
Figures 7, 7A:
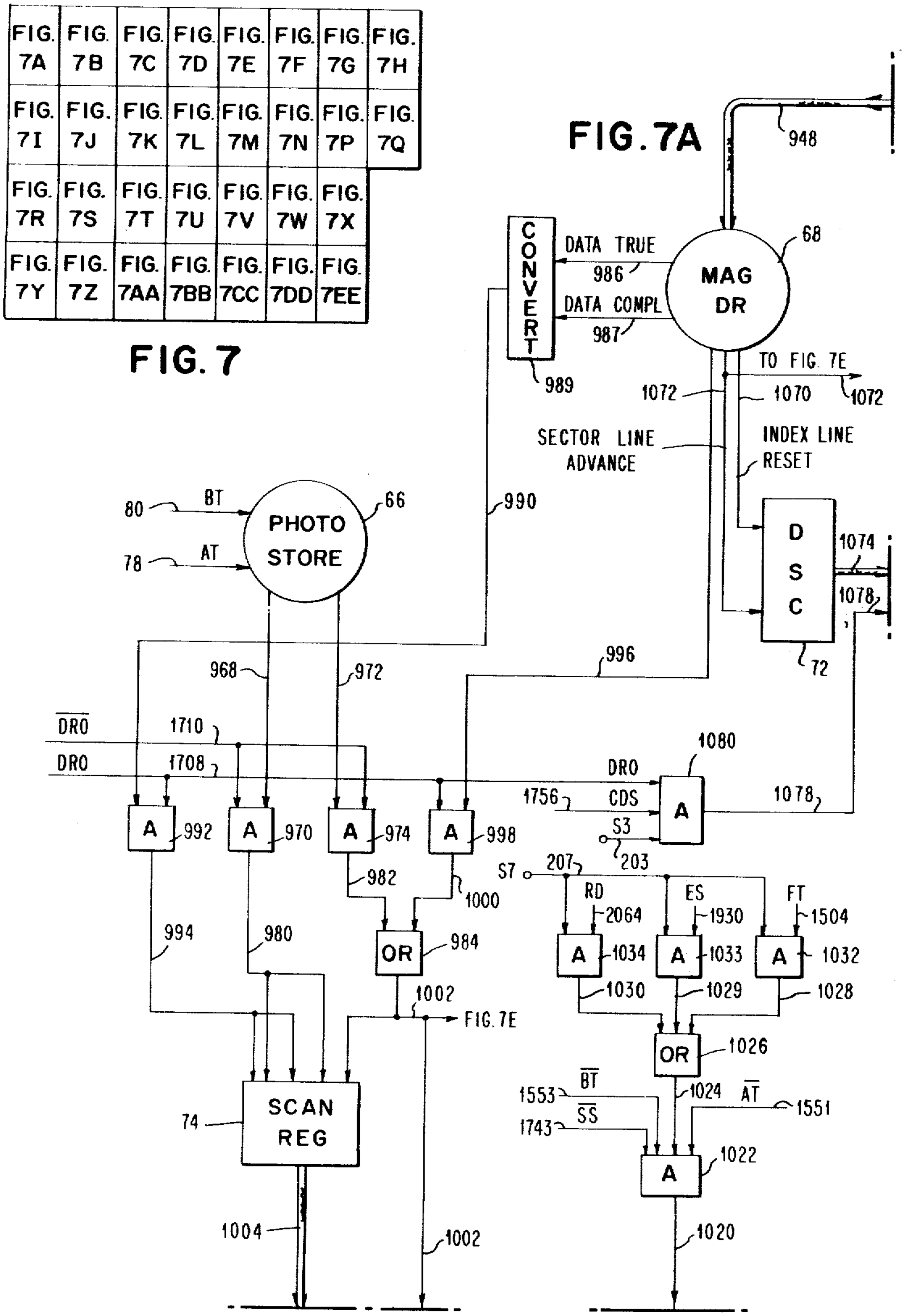
FIG. 7 is a diagram illustrating how FIGS. 7A–7EE are combined to form a composite block diagram of a preferred embodiment of the invention.
Figure 7B:
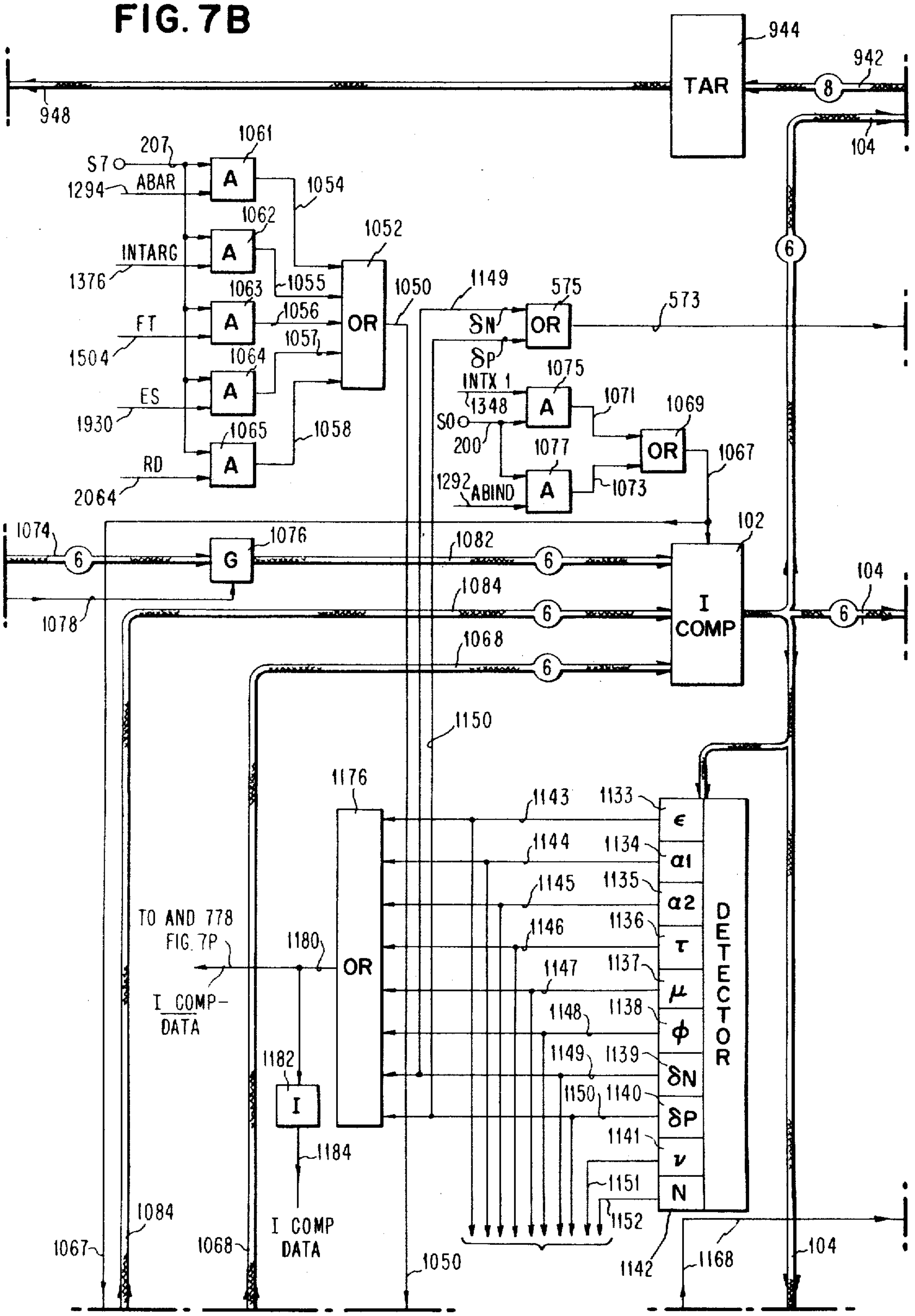
Figure 7C:
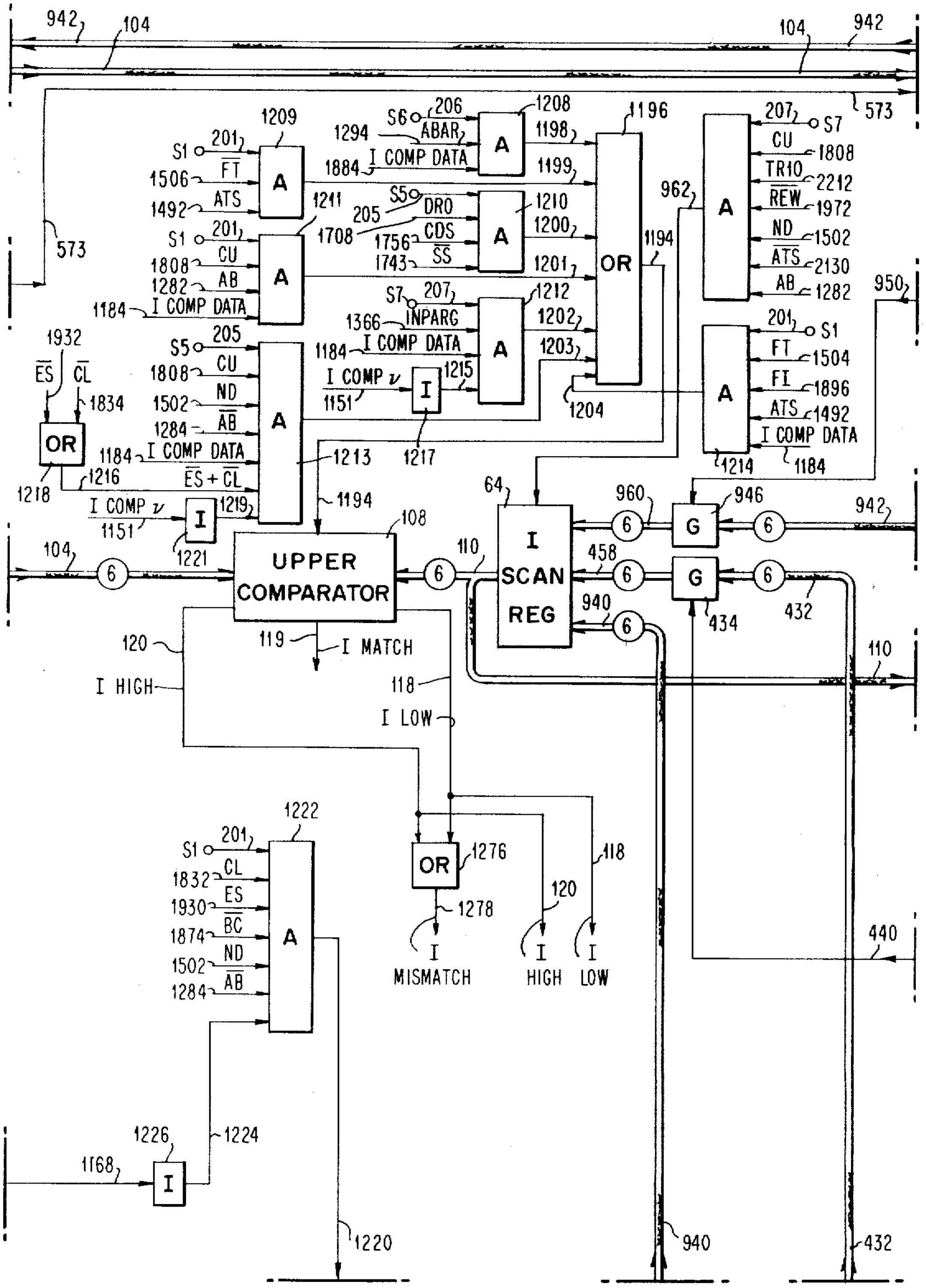
Figure 8:
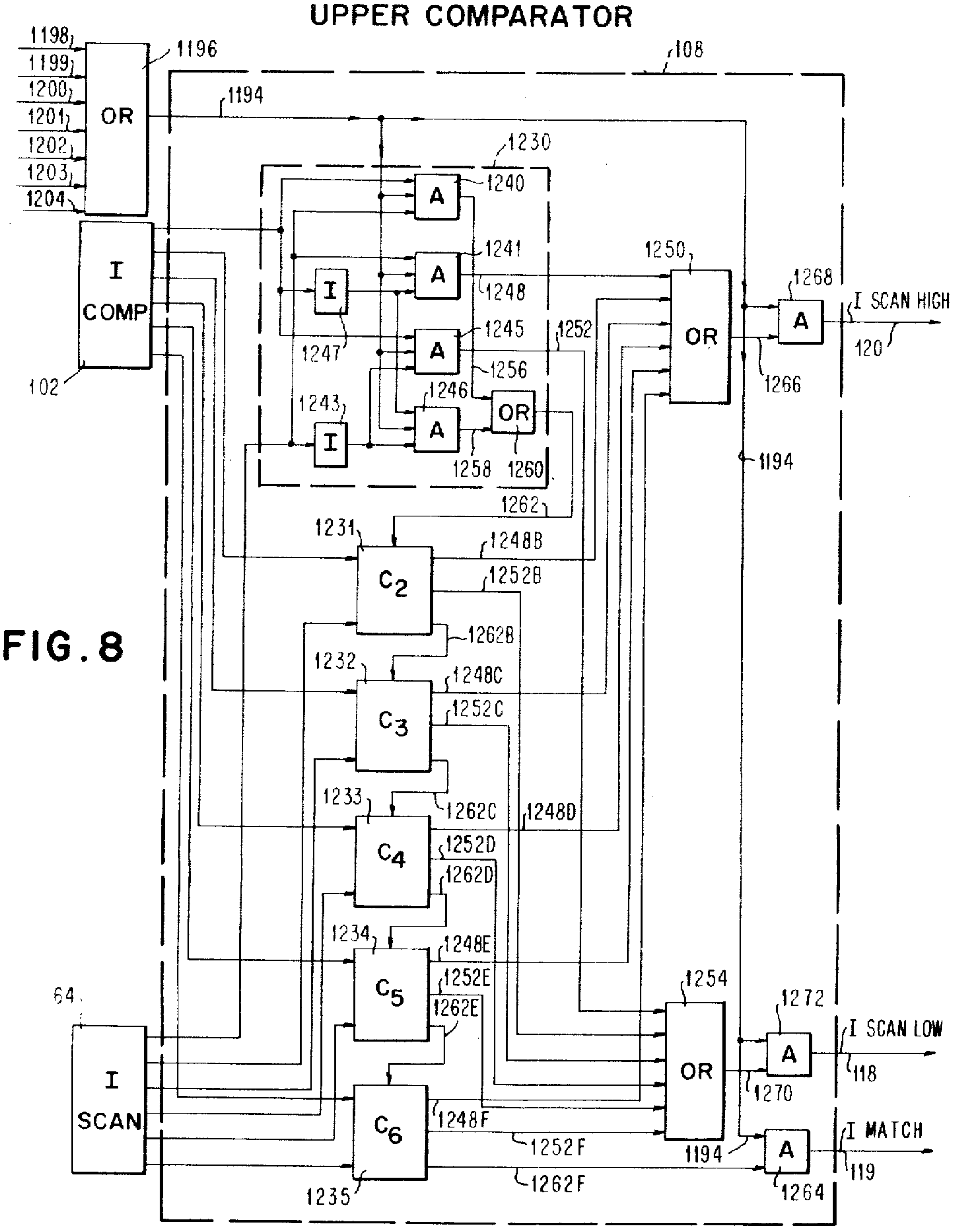

FIG. 8 is a block diagram of a compare circuit of the type shown in FIGS. 1 and 7C.

GENERAL DESCRIPTION

Referring now to FIG. 1, it is seen that the circuit includes a core memory 10 which is divided into four portions 12–15. Core memory 10 is of a standard variety which is energized by a read pulse causing the data word stored at an indicated address to be read out followed by a write pulse which ordinarily causes the information read out to be restored in the memory. New information is read into a desired address in the memory by applying it to the memory (during the write portion of the energize cycle) in place of the information read out. In the following discussion, it will be assumed that each memory word in core memory 10 contains six, six-bit bytes, for a total of 36 bits. Region 12 of core memory 10 is referred to as the directory. The format for each entry in this portion of the memory is shown in FIG. 4A. Directory 12 occupies the first sixty-four address positions in the core memory. From FIG. 4A, it can be seen that bits 5 through 17 of a directory entry indicate the table address in region 13 of memory 10 at which an integral search is to be started to determine if the input entry is stored on the drum. Bits 23–26 indicate the table address which is to be accessed in order to determine if the data for the desired address is stored on the drum during an absolute search. Bit 18 is also used only during an absolute search. A bit in this position means that the indicated track on the photostore has no entries on the drum and that the search should be started in the photostore.

Region 13 of core memory 10 may contain as many tables as there are dictionaries stored in the photostore. As indicated previously, the term dictionary is used here generically to mean any compilation of data. Each table contains an indentification of the entries which are stored on the drum and the drum address at which these entries are stored. FIG. 4B shows the format for the table entry used in an absolute search. Each of these table entries contains two core words, the first of which contains the core address of the next table entry in bits 5–17, the drum address for this entry in bits 22–35, and a marker bit in bit 0 which indicates that if the search is proceeded to this point, the desired entry is in the photostore. Bits 0–10 of the second word contain the photostore address which is to be matched on. FIG. 4C shows the table format for an integral entry. Each of these table entries contains several core words, the first of which is the same as the first word of an absolute table entry. The next few words contain the argument bits which are to be matched on. The last byte of the argument is the special character $\tau$. As will be seen later, this character is always used to end an argument whether it be on the table or the photostore. The last word of the table entry contains in bits 5–17, the address of the first word of the argument, and in bits 21–26 the address of a photostore track where a search to find a track with an entry giving a better match on the input should be commenced.

Input data is stored in region 14 of memory 10 and output data in region 15. In addition to the four regions shown, core memory 10 also contains a prefix region, the format and function of which will be described later.

Address information is applied to memory 10 through lines 18 from memory address register (MAR) 20. Data is transferred into and out of memory 10 through lines 22 and memory data register (MDR) 24. Input bus 26 forms a second input to MDR24. Output bus 28 from MDR24 is applied to the central processing unit (not shown). Input bus 26 and output bus 28 are applied through OR gate 27 to form data bus 29. Selected portions of data bus 29 are applied as inputs to mark detector 30, table index register (TIR) 32, input index register (IIR) 34, function index register (FIR) 36, photostore address register (PAR) 38, TSCAN register 40, drum address register (DAR) 42, OR gate 44, ISCAN register 64, and ICOMP register 102. The other inputs to OR gate 44 are output lines 50, 52, 54, and 56 from TIR32, IIR34, FIR36, and PAR38 respectively. Output line 58 from OR gate 44 is connected as the information input to MAR20. The other inputs to ISCAN register 64 are output lines 56 and 60 from PAR38 and DAR42 respectively. Wherever, as with ISCAN register 64, more than one set of inputs is applied to a register, it is assumed that the register contains suitable circuitry for performing an internal ORing function on these inputs.

In addition to core memory 10, the system of FIG. 1 also includes a photostore disk 66 and a magnetic drum 68. The photographic storage disk is of a type wherein information is stored in concentric rings with a 0 bit being represented by a dark spot followed by a light spot and a 1 bit represented by a light spot followed by a dark spot. Details of such a photographic storage disk are given in Rome Air Development Center Report RADC–TR59–110 "Final Report on Computer Set AN/GSQ–16 (XW–1) volume I, The Photoscopic Memory System," June 20, 1959. Drum 68 is of a type having a read-write head for each track. Track, and therefore head, selection is under control of output line 60 from DAR42. Each track is divided into sectors with a mark being provided on a special sector mark track at the beginning of each sector. The head sensing the sector mark track applies signals through lines 70 to drum sector counter 72. Output information from either photostore 66 or drum 68 is applied through either line 73 or line 75 to scan register 74. The storage device which is applying information to scan register 74 at any given time is determined by gating and control circuitry 76 (control line not shown). Circuitry 76 also controls the transfer of information between the various registers and storage devices shown and performs various arithmetic operations. Details of this circuitry will be shown and described later. Gating and control circuit 76 generates output signals on line 78 and 80 to cause photostore 66 to advance-track or back-track respectively. This circuit also generates a remember-early warning output signal on line 82 and an end-of-operation signal on line 84.

Output line 86 from scan register 74 is connected as a second input to ICOMP register 102 and as the input to TCOMP register 88. Output line 107 from ICOMP register 102 is connected as the information input to photostore track counter (PTC) 90. The count in photostore track counter 90 is incremented or decremented by signals applied to output line 92 from control and gating circuit 76. The remaining inputs to ICOMP register 102 are output lines 94, 96, and 98 from DSC72, TCOMP88 and PTC90 respectively. The contents of ICOMP102 are applied through lines 104 to control character detector 106, upper compare circuit 108, and MDR24. The various control characters which are detected by circuit 106 and their significance will be described later. The other inputs to upper compare circuit 108 are output lines 110 from ISCAN register 64. The inputs to lower compare circuit 112 are output lines 96 and 114 from TCOMP register 88 and TSCAN register 40 respectively. Control character output lines 116 from detector circuit 106, ISCAN low, equal, and ISCAN high output lines 118–120 respectively from upper compare circuit 108, and TSCAN low, equal, and TSCAN high output lines 123–125 respectively from lower compare circuit 112 are all connected as inputs to gating and control circuitry 76. The final input to gating and control circuitry 76 is output line 128 from mark detector 30.

GENERAL DESCRIPTION OF OPERATION

*Absolute search*

Figure 2:
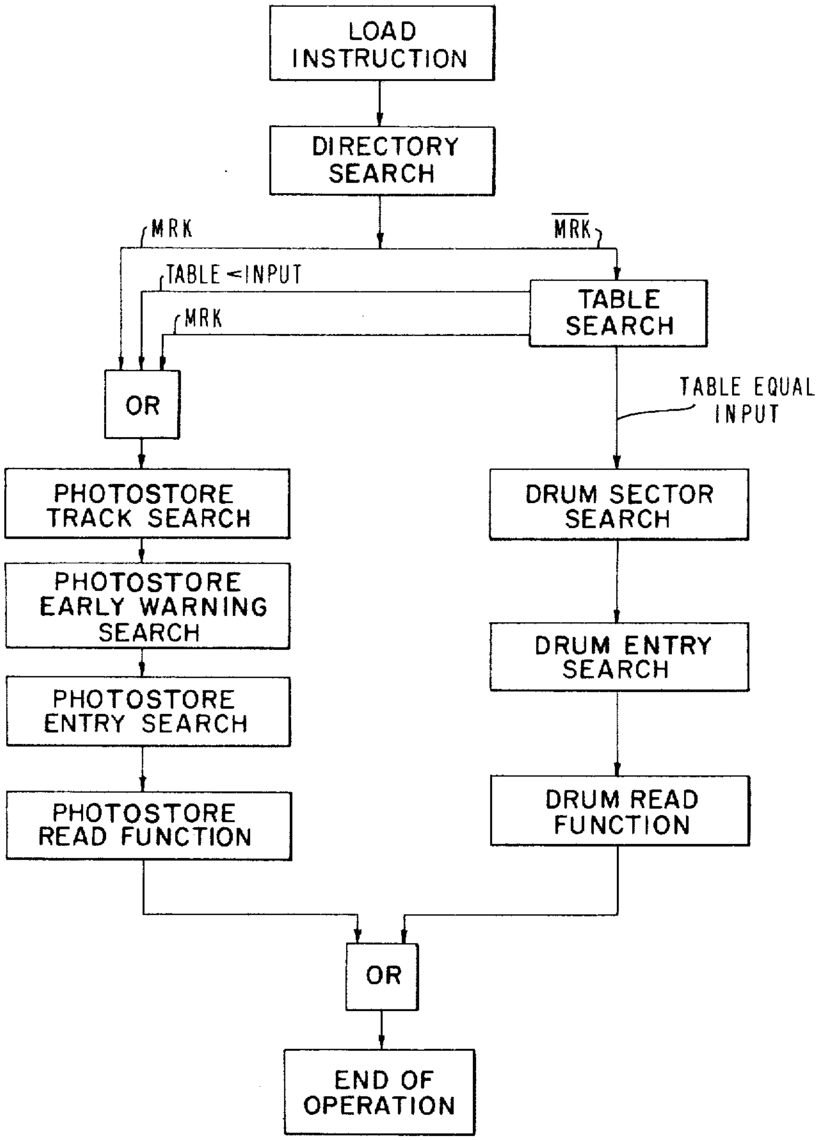
FIG. 2 is a flow diagram of the absolute (i.e. direct) search operation performed by the invention.

FIG. 2 is a flow diagram of the steps which are performed during an absolute search operation. Referring to FIG. 2 it is seen that the first step is to load the read record photostore absolute (RRPA) instruction. The format of the instruction for an absolute search is shown in FIG. 4D. This instruction is applied through input bus 26 (FIG. 1) and OR gate 27 to data bus 29. The presence of a signal on the RRPA line of the input bus causes the information on lines 0 through 12 of the bus to be gated into FIR36 and the information on lines 13 through 23 of the bus to be gated into PAR38.

From FIG. 2 it can be seen that when the instruction has been loaded, the next step is to perform a directory search. To perform the directory search, the first byte, the byte containing the track address, in PAR38 is applied through lines 56, OR gate 44, and lines 58 to MAR20. This causes the directory entry at this address, it being remembered that the directory covers the first sixty-four positions in core memory 10 which is the total number of positions which can be represented by a single 6 binary bit byte, to be read out through lines 22, MDR24, output bus 28, and OR gate 27 to bus 29. Since the circuit is performing an absolute search at this time, the signals on line 23–35 of bus 29 are gated into TIR32. Line 18 is applied to mark detector 30 to determine if there are any entries on the drum for the track in question.

From FIG. 2 it can be seen that if mark detector 30 detects a mark on line 18 at this time, the circuit proceeds directly to a photostore track search. However, if a mark is not detected at this time, the circuit proceeds to perform a table search. The address in TIR32 at this time is the address at which the first entry of the type shown in FIG. 4B for the particular photostore track in question is normally stored. During table search, the address in TIR32 is applied through lines 50, OR gate 44 and lines 58, to MAR20 to cause the first word of this entry to be read out. When this word is read out, the information as to the address of the next table entry contained on lines 5–17 is restored in TIR32 and the drum address contained on lines 22–35 is applied to DAR42. Line 0 is applied to mark detector 30 and the result of this detection stored in circuitry 76. The circuit then loads the second word of the table entry, the photostore address in the table, into ICOMP register 102 and applies the desired photostore address contained in PAR38 through lines 56 to ISCAN64. A comparison is then performed in compare circuit 108 to determine if these two quantities are equal. If they are equal, the desired entry is on the drum and the circuit proceeds to perform a drum sector search. If the table entry is higher than the entry contained in PAR at this time, the circuit loads the address of the next table entry contained in TIR into MAR and proceeds to look at this table entry to determine if it is equal to the address contained in PAR. If the contents of PAR are greater than that of the table entry being looked at, this means, since table entries are stored in descending order, that the entry for the data address stored in PAR is not on the drum and that a photostore track search should be commenced. A photostore track search is also commenced after the comparison if a mark was detected in the 0-bit position of the first table entry word.

Regardless of how the circuit determines that a photostore track search should be initiated, the first step is to determine what track the photostore read head (not shown) is presently positioned over. This is accomplished by applying the output from photostore 66 through line 73, scan register 74, lines 86, ICOMP register 102 and lines 104 to PTC90. FIGS. 5A and 5B show the format of a photostore entry which is used to supply this track address information. The coding for the α1–α2 characters is such that this character combination is uniquely decipherable, it not being possible for any other two bytes or portions thereof to be mistaken for this 2-byte combination. Therefore, the detection of an α1–α2 character combination may be used to detect the beginning of a photostore entry and for synchronizing purposes. The detection of the special character φ in the argument of a table entry means that what follows is a track number followed by a record address. The special character τ is used to designate the end of the argument portion of a table entry and the beginning of the function portion. Therefore, it is only the byte following the detection of the φ character, the track address byte, which is transferred into PIC90. The desired photostore track address contained in PAR38 is applied through lines 56 to ISCAN register 62. The scanned track address applied to ICOMP register 102 and the desired track address applied to ISCAN register 64 are then compared in upper comparator 108 and the resulting output signal on lines 118–120 applied to gating and control circuitry 76. An output signal on line 118 indicating that the track address is too low causes an output signal on advance-track line 78 to photostore 76. Conversely, an output signal on line 120 indicates that the photostore read head (not shown) is positioned over too high a track and causes gating and control circuitry 76 to generate a back-track signal on line 80. Each time an advance-track or back-track signal is applied to photostore 66, a signal is applied through line 92 to cause an appropriate incrementing or decrementing of PTC90. After each such incrementing or decrementing, the contents of PTC90 are applied through lines 98 to ICOMP register 102 and are compared with the desired track address then stored in ISCAN64. An output signal on the line 118 or 120 causes the appropriate stepping signal to be applied to a line 78 or 80 and an appropriate alteration in the count in PTC90. When the track count in PTC90 is found to be equal to the track address in PAR38, an output signal is generated on line 119 from upper compare circuit 108 causing outputs from the control circuit which result in the track address on photostore 66 again being sampled and in this address being applied through lines 73, scan register 74, and lines 86 to ICOMP register 102. A compare operation is then performed between this track address and the desired track address contained in ISCAN64. If these two counts are equal, the desired track has been located, and the circuit proceeds to the photostore remember-early-warning search step.

It will be remembered from previous discussion that one of the features of the system is that the buffer may communicate with the CPU during times when a search is being performed and that sufficient time is provided for the CPU to get out of the buffer before a desired entry is found. In order to provide this capability, there are actually two table entries for each bit of function data stored on the photostore. The first entry is of the form shown in FIG. 5B and is referred to as the early-warning entry. It contains the α1–α2 synchronizing characters followed by the character φ indicating that the bytes to follow are address bytes. The track address byte is an ordinary 6-bit byte. However, due to the number of records which ordinarily appear on a track, only five bits are required to represent the record address. Therefore, the highest order bit of the record address is always blank. A 1 bit in this bit position of the record byte in a photostore entry indicates that this is an early-warning entry. This is indicated by the character R′ in FIG. 5B. It is seen that this entry has no function data following the τ, the α1–α2 being the synchronizing initial characters for the next table entry. The early-warning entry is positioned a fixed number of degrees advanced from the normal absolute table entry (FIG. 5A) so that after the early warning entry is detected, a known period of time elapses before the desired table entry is located. This is the period of time that the CPU has to get out of core memory 10.

Physically, during the early-warning search operation, the track and record address in PAR38 are repeatedly applied in succession to ISCAN64, and a 1 bit is forced into the highest order position of the record byte each time it is applied to ISCAN. Photostore entries are applied in succession through lines 73, scan register 74, and lines 86 to ICOMP register 102. As each photostore address is applied to ICOMP102, it is compared with the address stored in ISCAN64. When a match is detected in upper comparator 108, this means, since the 1 bit has been focred into the highest order position of the record byte, that the desired early-warning entry has been located. Gating and control circuit 76 therefore generates an output signal on line 82.

The circuit is then ready to begin the photostore entry search step. The correct photostore address is applied through line 56 to ISCAN64 and the addresses from the photostore again applied to ICOMP102. This time, when a match is found, it means that the desired entry has been found and that the desired function data is to follow. The remaining bytes applied to ICOMP are therefore transmitted through lines 104 to MDR24 and from MDR24 through lines 22 to the address positions in output region 15 of buffer 10 starting with the address stored in FIR36. When the α1–α2 characters at the end of the function portion of the table entry are detected, gating and control circuitry 76 generates an end of operation signal on line 84. In due course, the information in output region 15 is transferred through output bus 28 to the CPU (not shown).

Referring again to FIG. 2, it is seen that if, during table search, a table entry is found with an address matching that in PAR38, the circuit proceeds to perform a drum sector search. It will be remembered that prior to the comparing to determine if the table entry is one matching the address stored in PAR, the drum address at which the function for that particular table entry is stored was transferred into DAR42. Drum sector counter 72 is a continuously running counter which is reset each time an index mark is detected and incremented each time a sector mark is detected. During the drum sector search step, the contents of DSC72 are applied through line 94 to ICOMP register 102 and the sector portion of the drum address stored in DAR42 is applied through some of the lines 60 to ISCAN register 64. These quantities are compared in upper compare circuit 108 and, if a mismatch is detected, the circuit waits until the drum sector counter is again incremented and performs another comparison. Successive comparisons are performed until the count in drum sector counter 72 equals the sector address in DAR42.

At this time, the circuit proceeds to the drum entry search operation, which is in effect a verify and synchronize operation. Referring to FIGS. 6A and 6B, it can be seen that a drum entry may be either verified or unverified. An unverified drum entry contains no argument characters, whereas a verified drum entry contains between the α2 character and the τ character, a byte indicating its sector. There may be no more than a single entry in a sector, but an entry may run over several sectors. During the entry search operation, the track address portion of the drum address contained in DAR42 is applied through some of the lines 60 to drum 68 to cause the read head for the proper track on the drum to be selected. The α1–α2 characters are then detected by the circuit, and the desired sector address is applied by DAR42 to ISCAN64. If a verified entry is being looked at, the sector byte following the α2 character is applied by scan register 74 to ICOMP register 102 and a comparison performed. A mismatch at this time causes an error indication to be given to the CPU and terminates the read operation. Alternative steps which may be performed at this time will be described later. When a $\tau$ character coming out of the photostore is detected, either directly after the $\alpha2$ character for a nonverified entry or after a match for a verified entry, the circuit causes the subsequent function entries applied by drum 68 through lines 75 to scan register 74 to be applied through ICOMP register 102 and lines 104 to MDR24. These function entries are stored in output region 15 starting at the address stored in FIR36. The detection of the $\alpha1$–$\alpha2$ characters at the end of the function indicate that the read operation has been completed and cause gating and control circuitry 76 to generate an end of operation signal on line 84. The contents of the output region are later transferred in a conventional manner through MDR24 and output bus 28 to the CPU (not shown).

*Integral search operation*

Figure 3:
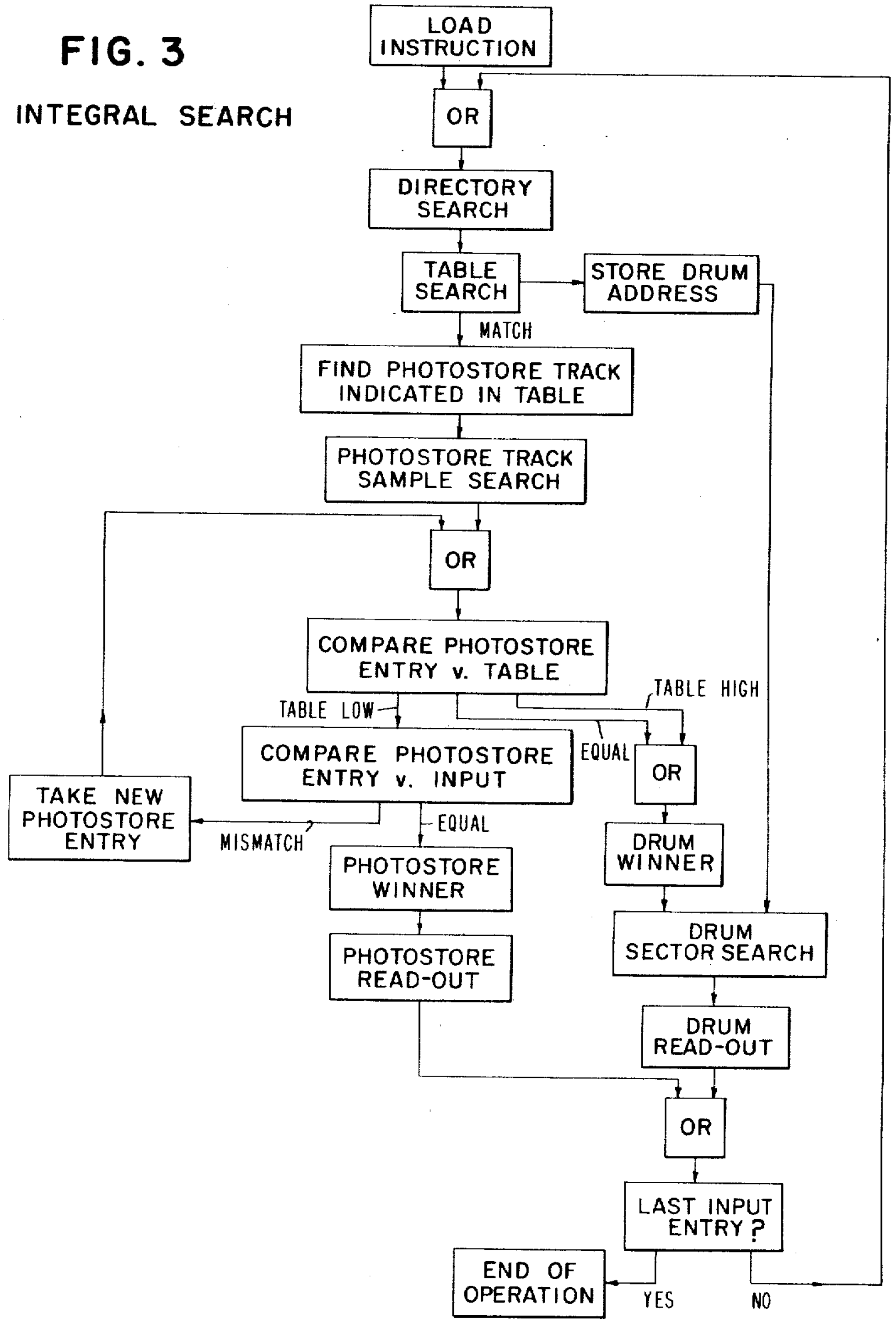
FIG. 3 is a flow diagram of the integral search operation performed by the invention.

Referring now to FIG. 3, it is seen that the first step in an integral search operation is to load the input instruction. The format for this input instruction is shown in FIG. 4E. The input instruction is applied through input bus 26 and OR gate 27 to bus 29. The presence of a bit on the RRPI line, indicating an integral operation, causes the bits on lines 0–12 of bus 29 to be stored in FIR36 and the bits on lines 13–28 to be stored in IIR34. The address thus stored in IIR is the address at which the first byte of the input entry in input region 14 of memory 10 is stored.

When the load instruction step has been completed, the circuit proceeds to the directory search operation. During the directory search operation, the address in IIR34, which is the address at which the first word of the input data is stored, is applied through line 52 and OR gate 44 to MAR20 causing the contents of this address to be applied through MDR24, output bus 28 and OR gate 27 to bus 29. The first byte of this word is then applied through OR gate 44 to MAR20 to cause the reading out of the appropriate entry in directory 12. Since the circuit is now performing an integral search, bits 5–17 of the directory word are applied to bus 29 to TIR32. The proper table address at which to begin searching for a matching table entry is in this manner determined. It should be noted that there is no provision of a mark bit during an integral directory search to indicate that there is no entry in the table having a first byte which is the same as that applied to the directory. The reason for this is that there is always at least one entry in the table for each possible first byte which can occur on an input entry. If there is no entry on drum 68, and therefore no other table entry starting with this byte, there will at least be an entry which has only this byte to indicate where in the photostore a track search for track containing a matching entry should be begun.

During an integral search, the circuit always proceeds from a directory search operation to a table search operation. The first operation in a table search is to apply the address in TIR32 through lines 50 and OR gates 44 to MAR20 causing the first word of a table entry of the type shown in FIG. 4C to be read out onto bus 29. If a mark is detected in the 0-bit position of the first word of this entry, mark detector 30 generates an output signal on line 128 which is applied to gating and control circuit 76 to tell the circuit that, even though a match be had on this entry causing the circuit to proceed to the next step, there is no corresponding function entry on the drum. Such a situation usually occurs only for a break point entry of the type previously described. The address of the next table contained on lines 5–17 are stored in TIR32 and the drum address of the entry contained on lines 22–35 is stored in DAR42. For an entry with a bit in the 0-bit position, the drum address is meaningless. The circuit then takes the first byte of the second word of the table entry and stores it in ICOMP register 102 and takes the first byte of the input word from the address indicated by IIR register 34 and stores it in ISCAN register 64. A comparison is then performed in upper comparator 108 between these two bytes. If they are equal, the second byte of the first table word is compared with the second byte of the first input word and so on until either a mismatch occurs or a $\tau$ character is detected in ICOMP indicating the end of the table entry argument. When a mismatch occurs, the table address for the next table entry contained in TIR32 is applied to MAR and the above described sequence of operation is repeated for a new table entry. When a $\tau$ character is detected in ICOMP, gating and control circuitry 76 causes the address at which the first word of the table entry argument is stored in memory 10, which address is located in bits 5–17 of the last word of the table entry to be stored in TIR32 and the photostore track address at which a track search is to be begun for a better match contained in bits 21–26 of the last word of the table entry to be stored in PAR38. A prefixing capability and the ability to skip certain entries in the input stream which give the table search added flexibility have not been considered at this point but will be discussed in detail later.

From FIG. 3, it can be seen that when a matching table entry is found, the next step in the operation is to find the photostore track indicated in the table. This is performed in the same manner as a track search during the absolute search operation. Therefore, the present photostore track address is stored in PTC90 and is compared against the desired track position stored in PAR38. Depending on whether a low or a high signal is generated on output line 118 or 120 from compare circuit 108, a signal is either applied to advance-track line 78 or back-track line 80 causing a suitable stepping of photostore 66, and a signal is applied to line 92 to cause a corresponding incrementing or decrementing of PTC90. After each track step, the count in PTC90 is compared against the desired track address in PAR38. When the count in PTC90 is equal to the track address in PAR38, a signal is generated causing the track address to again be read from photostore 66 and compared with the track address in PAR38. If compare circuit 108 generates an equal output signal on line 119 at this time, the find-photostore-track operation is finished and the circuit proceeds to the photostore track sample search operation shown in FIG. 3.

To understand what happens during this photostore track sample search, it must be understood that entries for a given dictionary on the photostore disk are stored in systematic order in order of decreasing magnitude. Also, longer entries are stored before shorter entries. Therefore, assuming that entries are stored in alphabetical order, a train of entries might look like "man," "manage," "management," "mane," "man-of-war," "manpower." Since an input entry such as management would also match on man and manage, it is necessary that a search start at the highest possible entry that it could match on and proceed down. However, since there is a large number of entries on each track, it is inefficient to perform an entry by entry search for a desired matching entry on more than one track and, since it is difficult to know the exact track on which the desired entry is stored, the table gives a photostore track number which is believed to be less than that on which the desired entry is stored. For example, with the word sequence previously stated, the track given might be the last track on which entries starting with the letter L are stored or possibly the first track on which entries beginning with the letter M are stored. At this point, it is well to point out that even if the track number given by the table is not of the type indicated, so long as the track number is in the proper dictionary, the proper track on which to begin an entry search will still be located during the track sample search. The search is therefore absolutely convergent and the degree of care used in determining the track number to be placed in the table affects only the speed of retrieval, not the accuracy thereof.

During the track sample search operation, the bytes of argument information of the type shown, for example, in FIG. 5C, are applied through scan register 74 to ICOMP register 102 and the input data stored at the address indicated in IIR is applied through MDR24 to ISCAN register 64. A comparison is then performed in upper compare circuit 108. If the photostore track address given by the table is a proper one, this comparison should indicate that the photostore is positioned on too low a track. Gating and control circuitry 76 therefore generates an output signal on advance track line 78. The circuit then tries a new comparison to determine if the entry being looked at is greater than the input entry. This sequence of operations is repeated until an entry is found which is greater than the input entry. When this occurs, the photostore track sample search is completed and the circuit is ready to begin the next operation. If, for some reason, the table makes a mistake so that the track number stored in PAR is too high, the initial comparison indicates this, resulting in an output signal on line 80 causing a back-track operation of the photostore. Successive comparisons and back-trackings occur until an entry is found which is less than the input. The circuit then proceeds to find the first track having an entry higher than that of the input in the same manner as that previously described when the track address supplied by the photostore was correct. If, during the track sample search, a matching entry is found, it is treated the same as if it were a low entry. The reason for this is that a match might be had on an entry like man or manage during this search when the entry sought is management.

Once the proper track to begin an entry search has been located, the circuit proceeds to the "compare photostore entry v. table" step. During this step, argument characters from the photostore are applied through lines 73, scan register 74, and lines 86 to TCOMP register 88. At the same time, the address in TIR32, which is now the address at which the first word of the matched-on table argument is stored, is applied to MAR20 causing the first byte of this word to be read out onto bus 29. This byte is stored in TSCAN register 40. A comparison is then made between the photostore entry argument byte and the table entry argument byte in lower compare circuit 112. If these characters match, succeeding bytes from the table and the photostore are applied to TSCAN register 40 and TCOMP register 88 respectively until either a $\tau$ character in TCOMP or a mismatch is detected. If $\tau$ characters appear in TSCAN and TCOMP at the same time indicating that the two arguments are the same, then, from FIG. 3, it is seen that the drum is the winner and a drum read-out operation is performed in a manner similar to that previously described. Likewise, if a mismatch occurs with the table entry being higher than the photostore entry, or if a $\tau$ character is detected in the photostore entry before a $\tau$ character is detected in the table entry, the drum is again the winner and a drum read-out operation is performed. However, if during the table search, gating and control circuit 76 had received an indication that there was a marker bit in the 0-bit position of the first table entry word, the drum winner indication is inhibited, even if one of the conditions for causing it occurs, and the circuit proceeds to find the best entry on the photostore.

If a mismatch occurs with the table entry being found to be lower than the photostore entry or if a $\tau$ character is detected in the table entry before a $\tau$ character is detected in the photostore entry, a further test must be performed to be sure that the photostore entry is one which matches the input entry. To accomplish this, the character from the photostore on which the mismatch occurred is transferred from TCOMP88 to ICOMP102. At the same time that matches were being obtained in lower comparator 112, the address of the input entry, starting with the first byte indicated by IIR register 34, were being up-dated by control circuitry 76. When the mismatch occurs, the input byte corresponding to the table byte on which the mismatch occurred is transferred through lines 29 to ISCAN64. Therefore, the comparison picks up in upper comparator 108 where it left off in lower comparator 112. Again the comparison continues with successive bytes being applied to upper compare circuit 108 until either a $\tau$ character is detected in ICOMP102 or until a mismatch occurs. If a mismatch occurs, comparison is stopped and the circuit waits until the next $\alpha 1$–$\alpha 2$ character combination is detected in photostore 66. A new compare photostore entry v. table operation is then commenced. If a $\tau$ character is detected in ICOMP during a compare photostore entry v. input operation, this is interpreted to mean that the photostore is the winner and a photostore read-out operation is commenced.

As before, if the drum is the winner, a drum sector search and a drum verify operation are performed. The drum read-out and photostore read-out operations are both substantially the same as for an absolute search and involves applying the address in FIR36 to MAR20 and applying the function bits applied by scan register 74 to ICOMP102 through line 104 and MDR24 to output region 15 starting at the address indicated by FIR36. With either a photostore winner or drum winner operation, the last address in input region 14 on which a match was had is then transferred into IIR34 so that the next search operation may begin at this point. If the next to the last character of the function is not a $\phi$ as shown in FIG. 5E, then the entry is not the last entry in the input region and the circuit proceeds back to the directory search step starting with the byte at the address now stored in IIR34. If the function read out is of the form shown in FIG. 5E, this signifies that all the data in the input region has been read out and that the integral search is complete. Gating and control circuitry 76 therefore generates an output signal on line 84.

DETAILED CIRCUIT DESCRIPTION

Figure 7D:
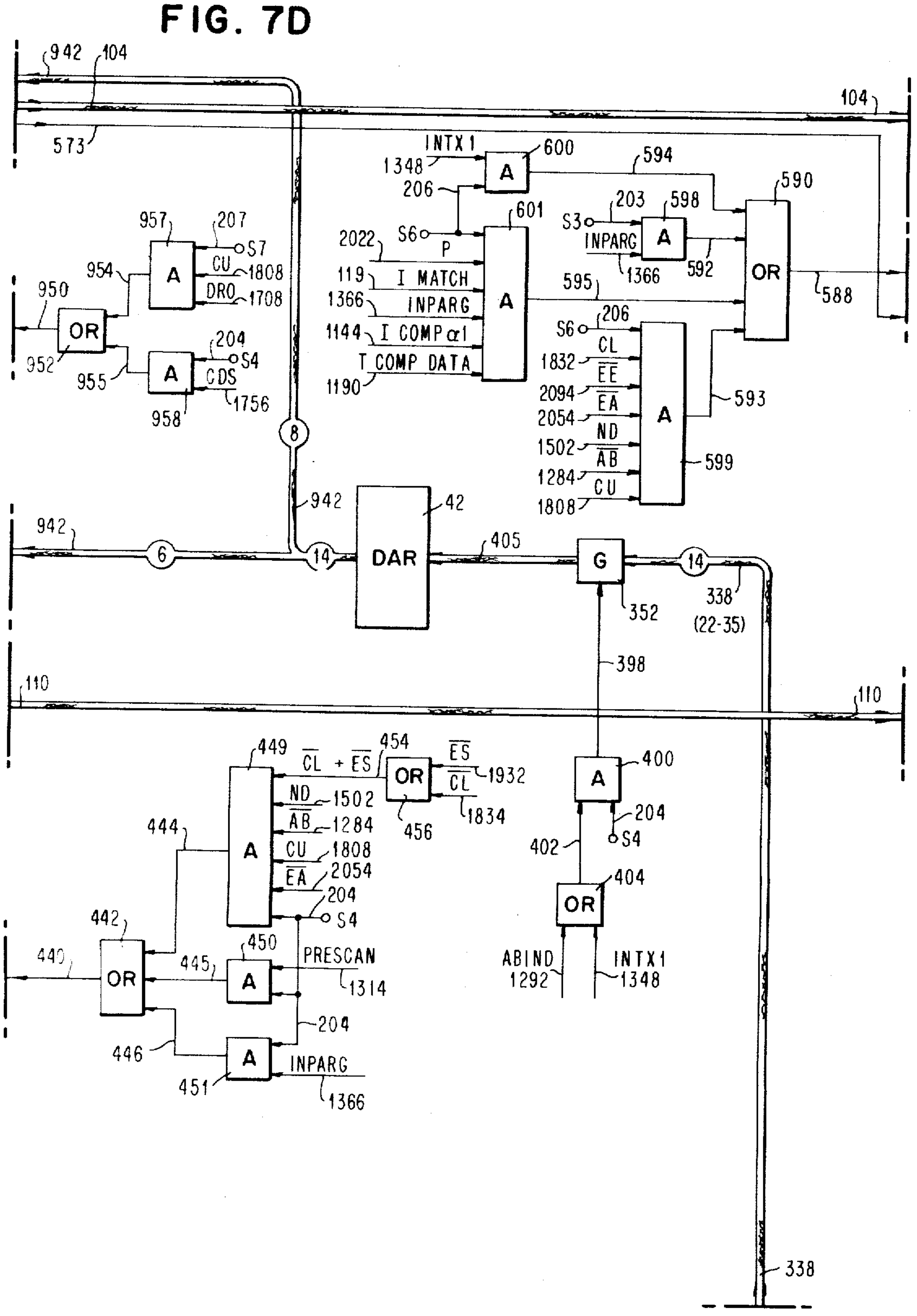
Figure 7E:
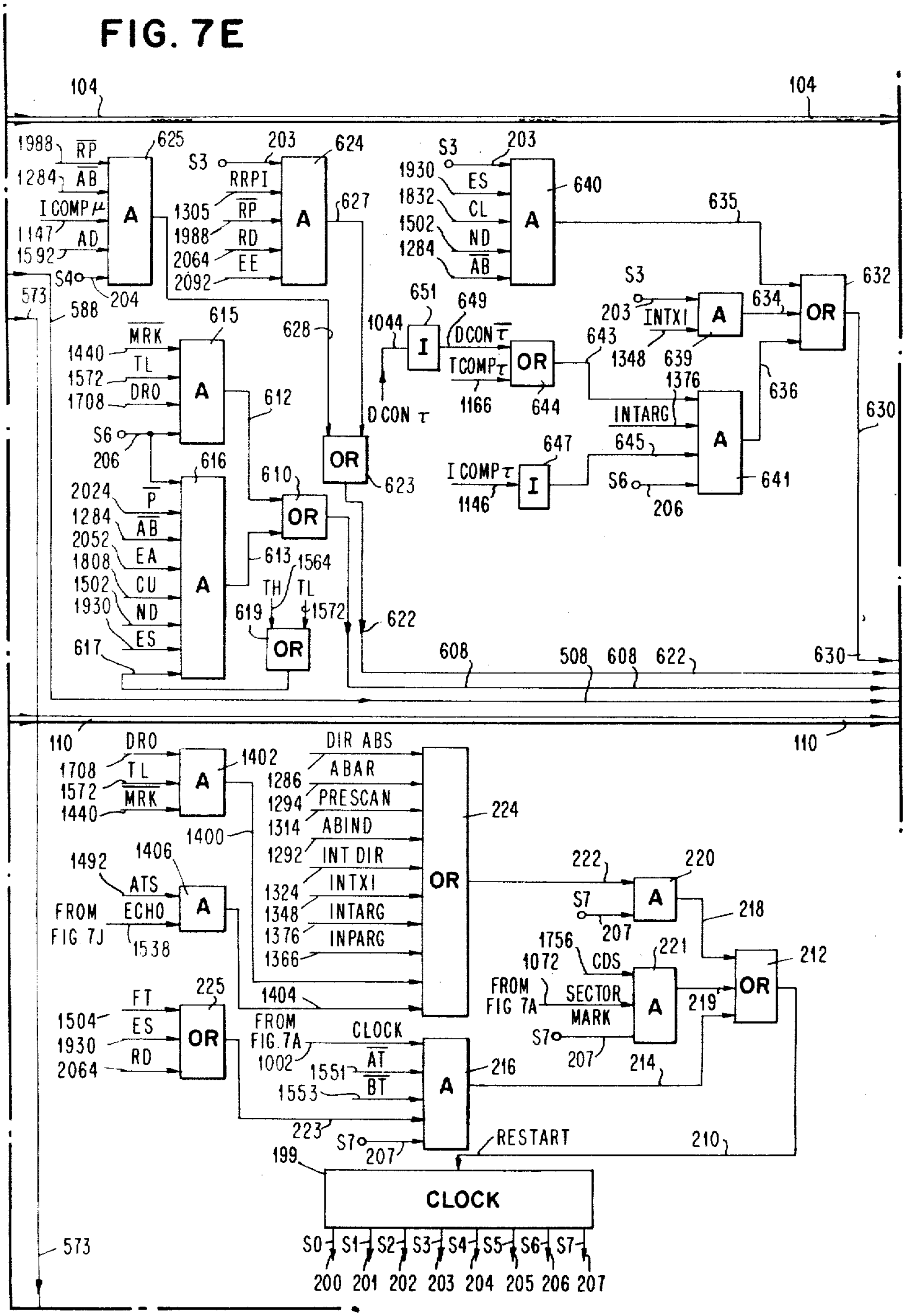
Figure 7F:
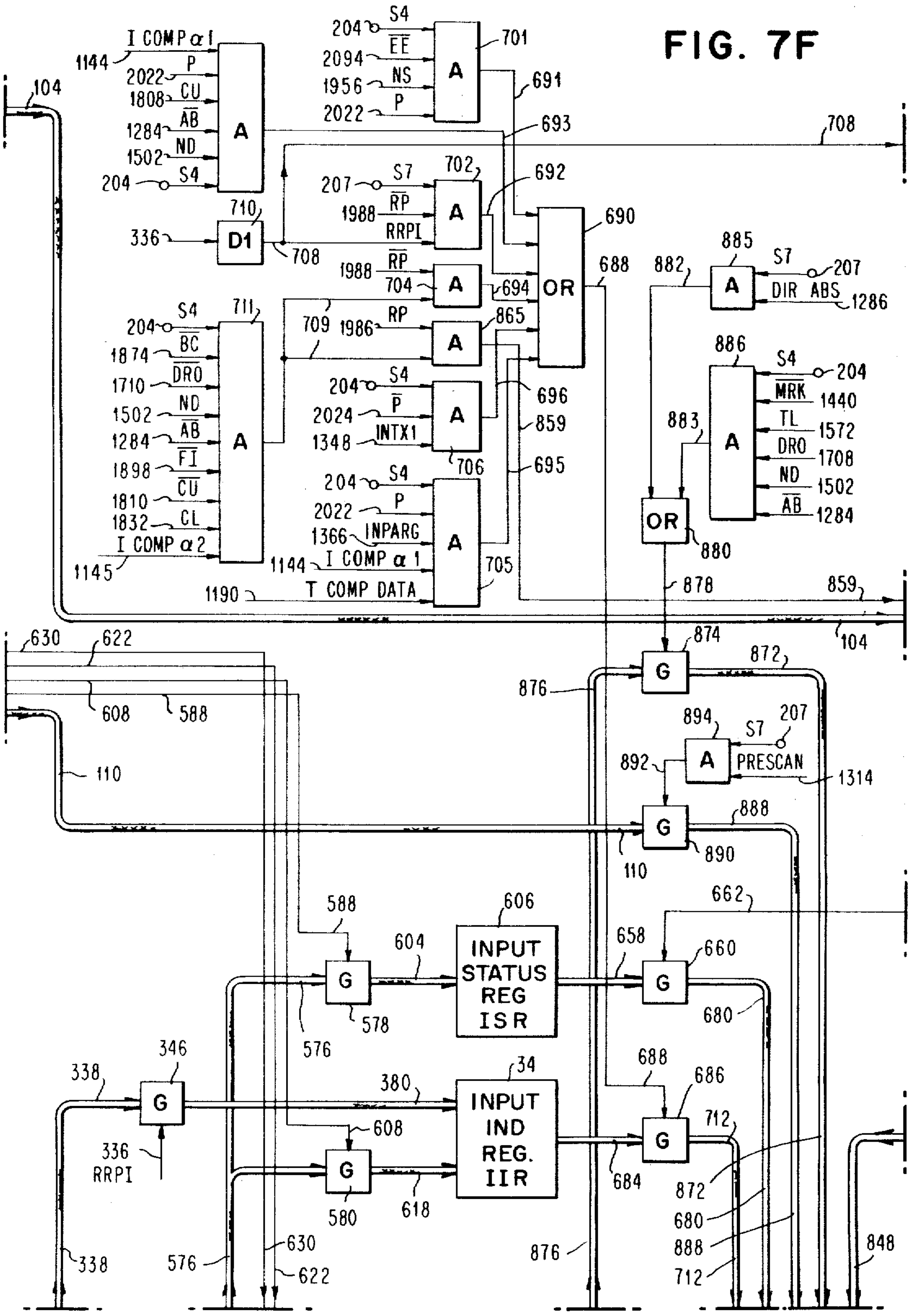
Figure 7G:
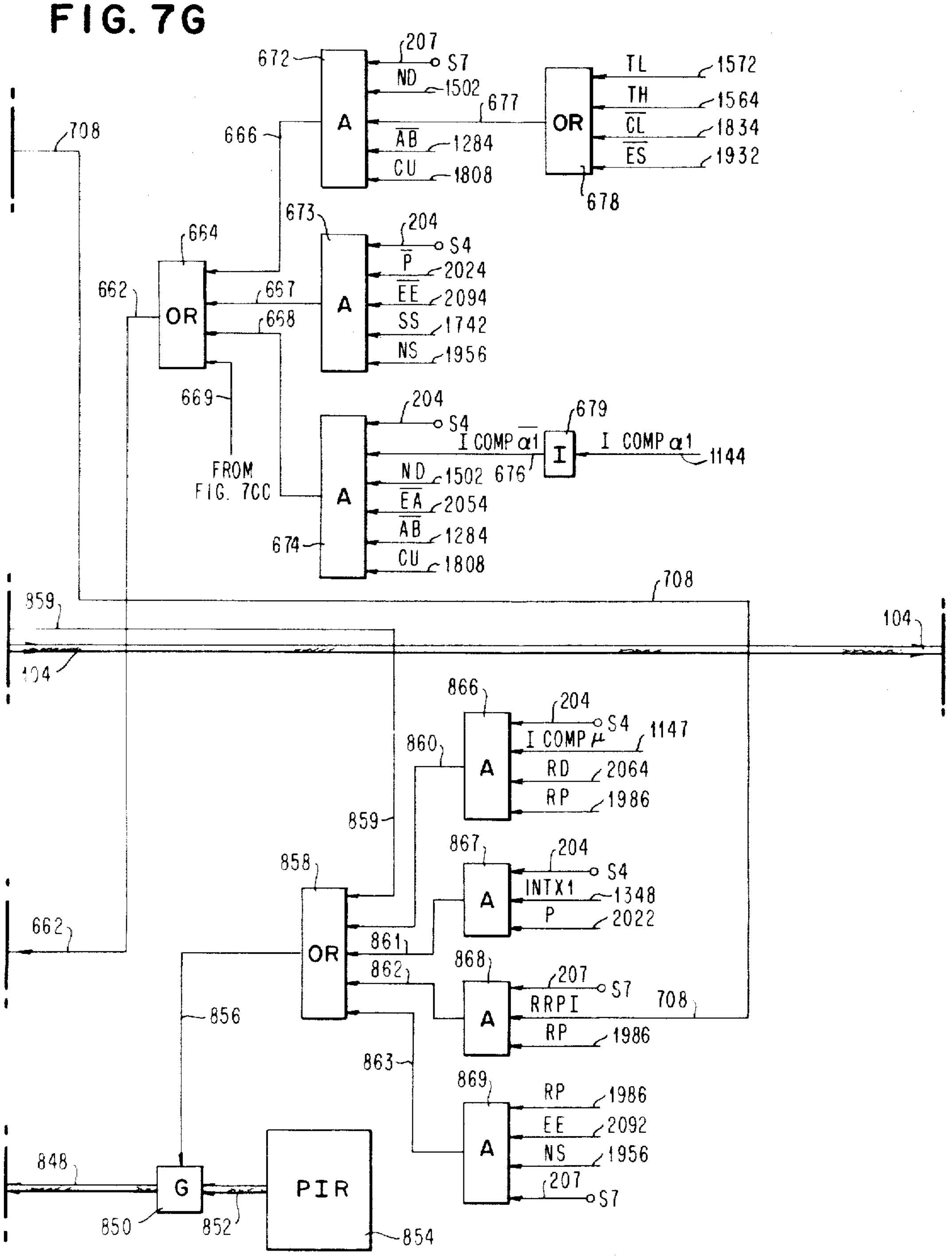
Figure 7H:
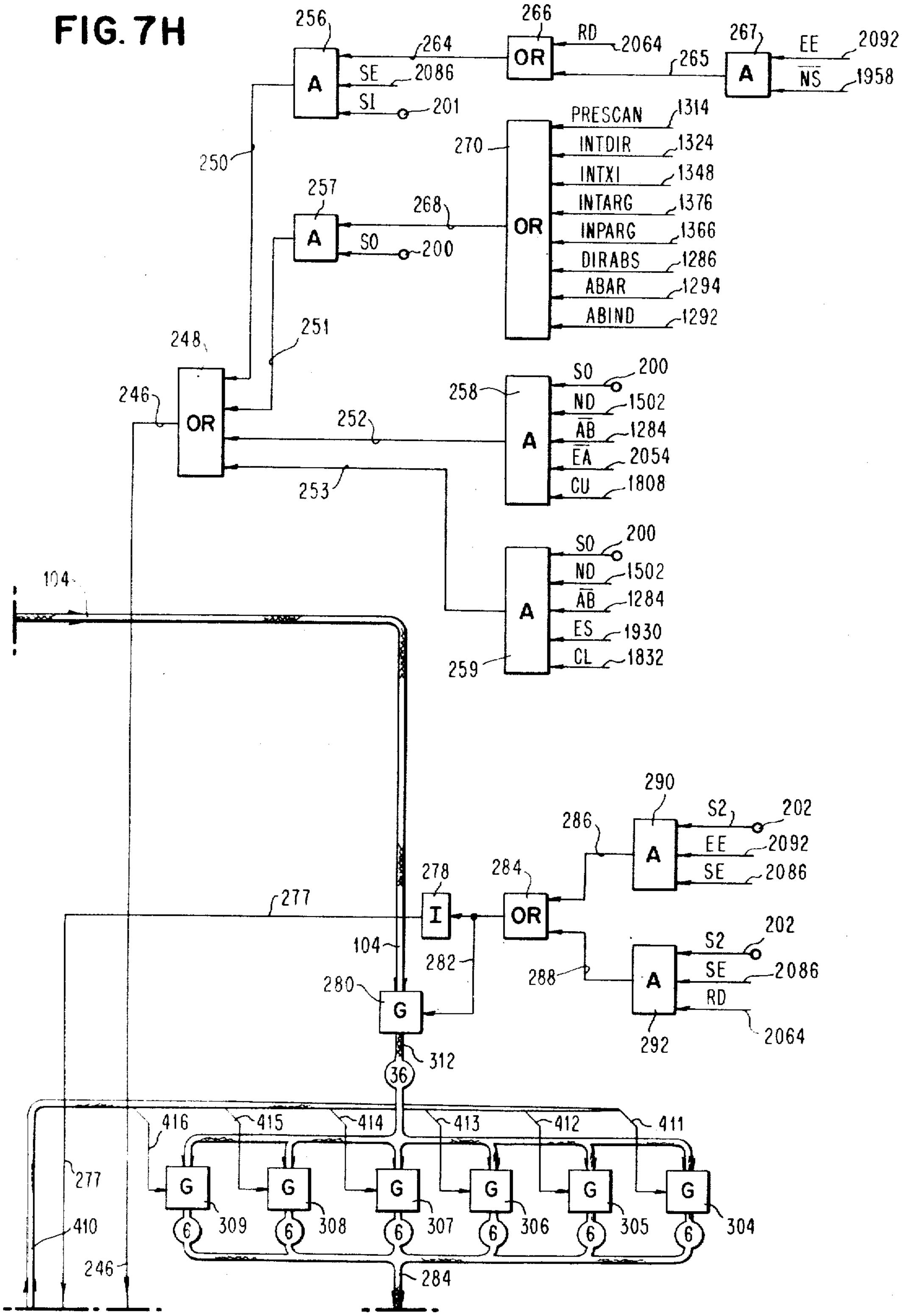
Figure 7I:
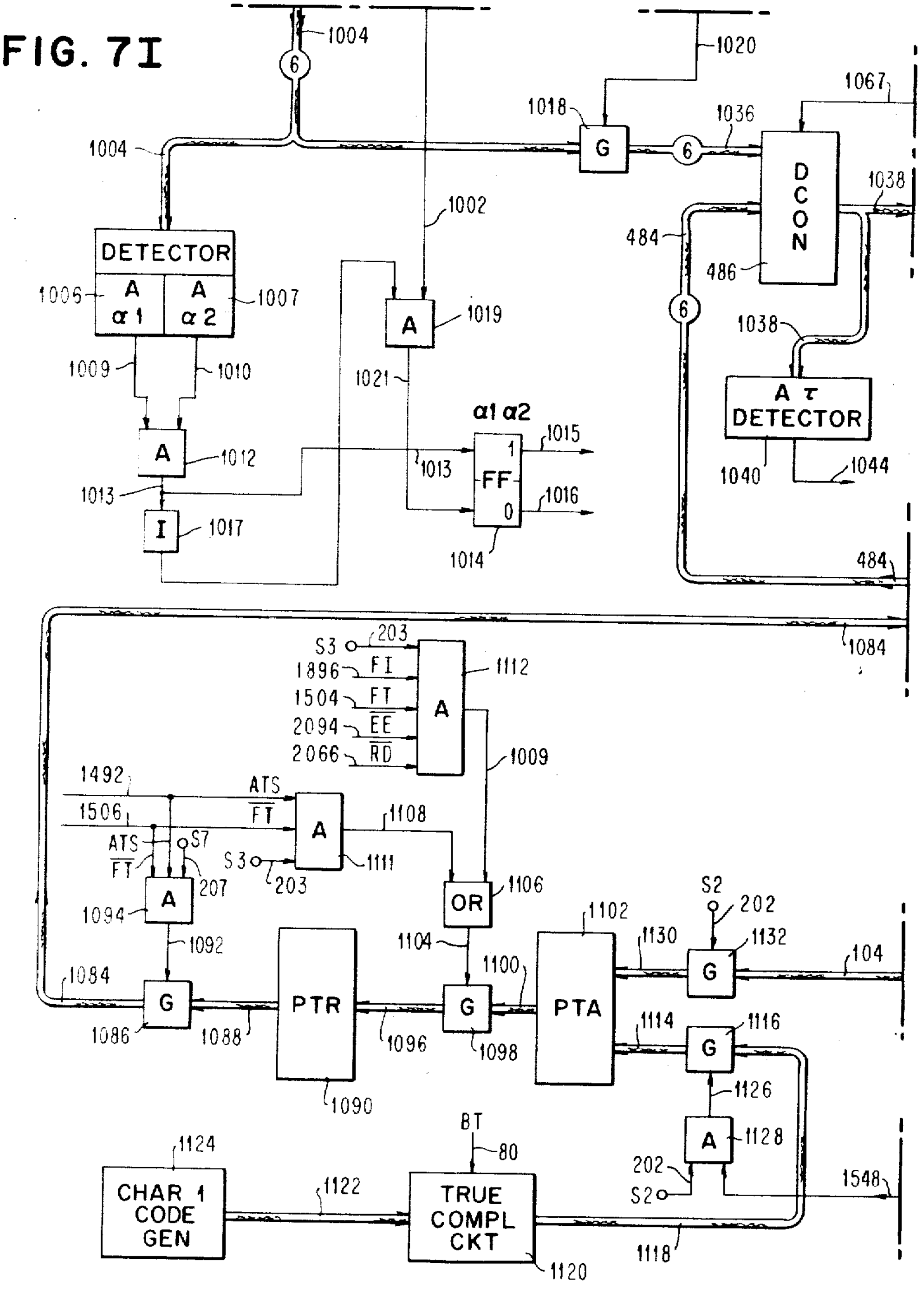
Figure 7J:
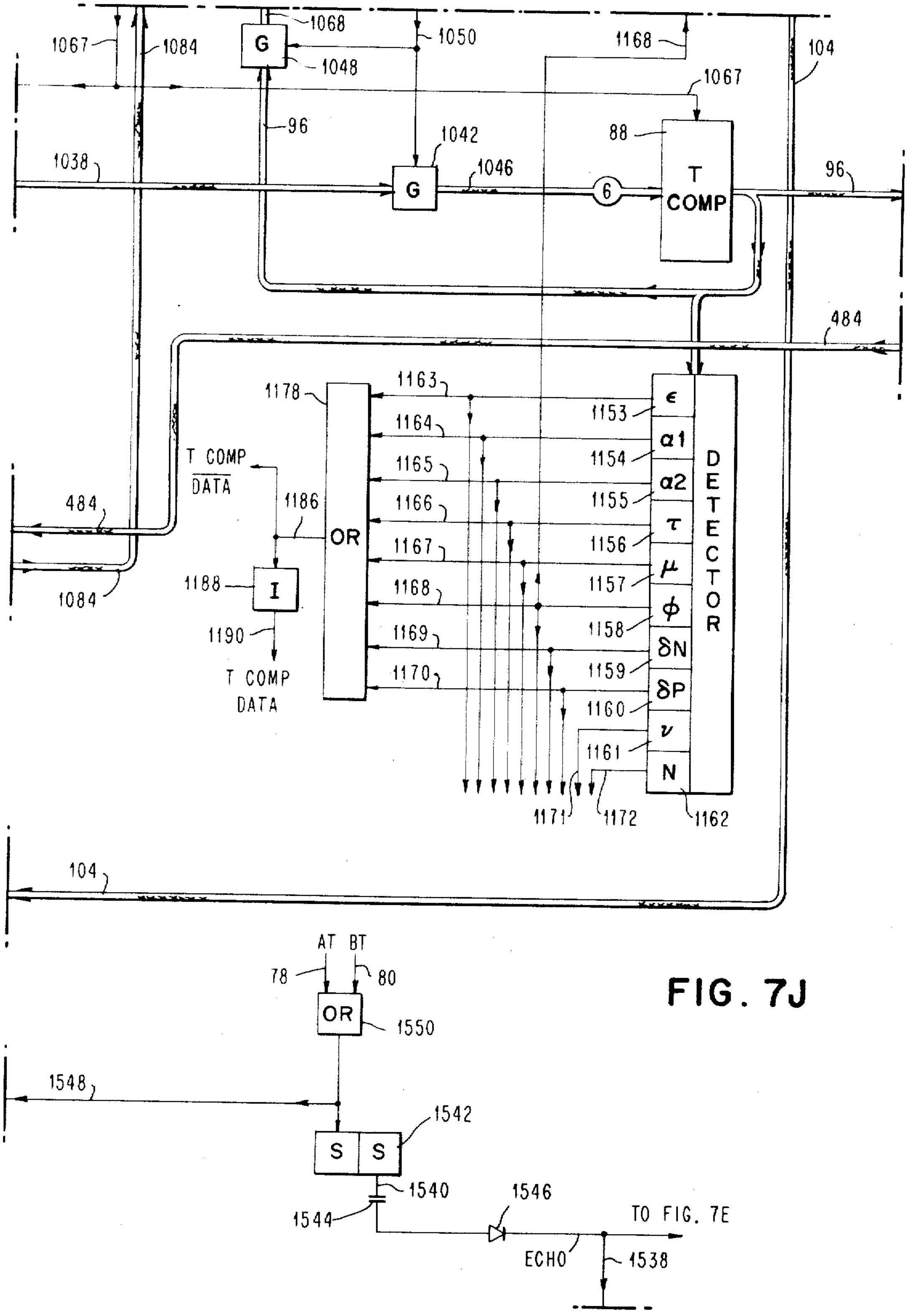
Figure 7K:
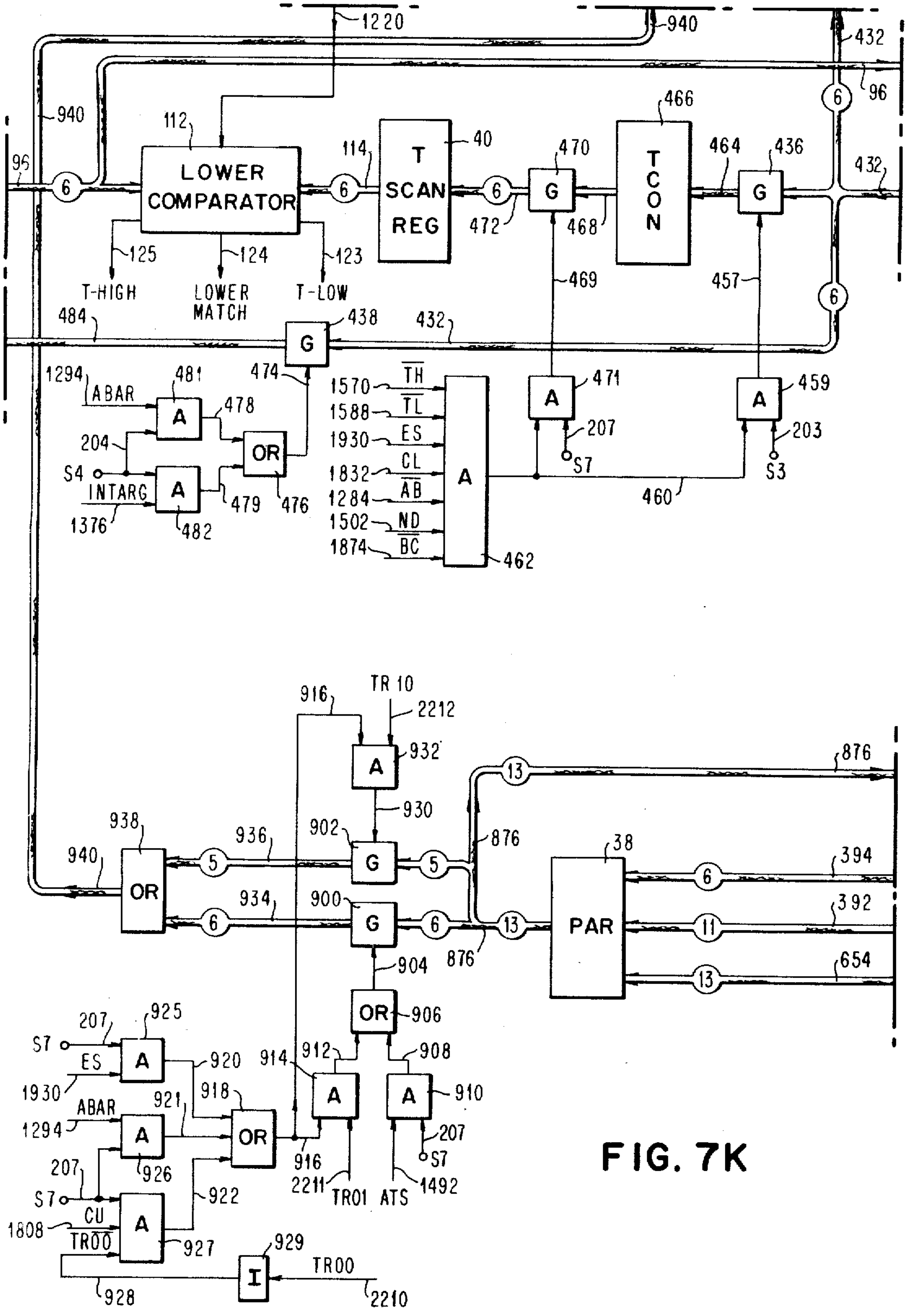
Figure 7L:
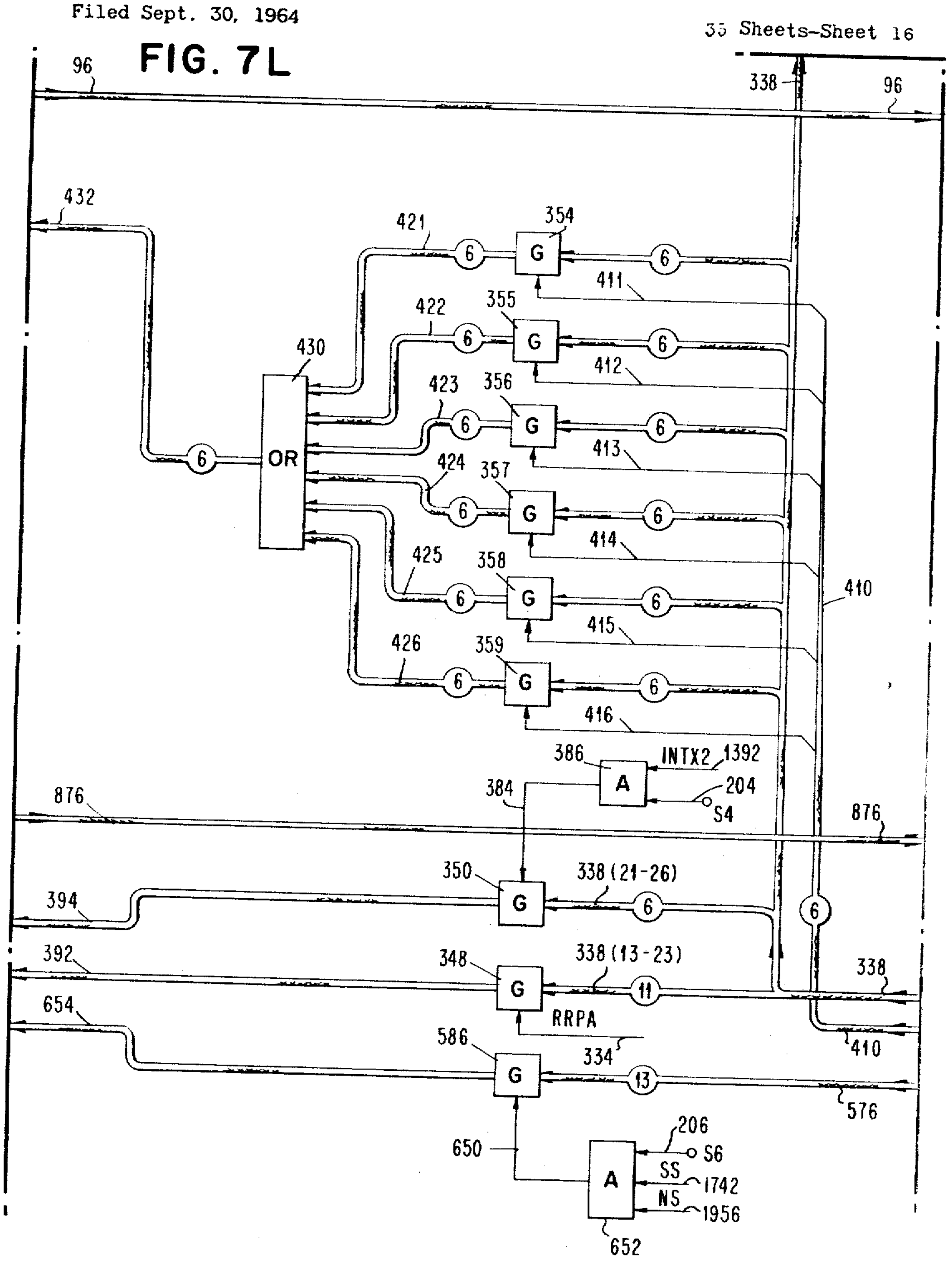

Referring to FIG. 7E, it is seen that the circuit of the preferred embodiment of this invention includes a clock 199 having eight output lines 200–207. The clock pulses applied to lines 200–207 are designated as S0–S7 respectively. Clock 199 is restarted by a signal applied to output line 210 from OR gate 212. Once started, clock 199 applies signals in succession to lines 200–207 and continues to apply a signal to line 207 until it is again restarted. The inputs to OR gate 212 are output line 214 from AND gate 216, output line 218 from AND gate 220, and output line 219 from AND gate 221. One input to AND gates 216, 220, and 22 is S7 line 207. The other input to AND gate 220 is output line 222 from OR gate 224. One input to AND gate 216 is output line 223 from OR gate 225. Some of the inputs to AND gates 216 and 221 and OR gates 224 and 225 will be described later in the specification. These are the ones which are physically connected to an element or which bear a "from FIG. 7XX" legend. The remaining inputs are described in the appendix which begins in column 63. This appendix is arranged in alphabetical order by the letters identifying the element generating the signals which serves as the inputs. This manner of describing inputs to elements will be followed throughout the specification. Referring now to FIG. 7Q, it is seen that the circuit includes a core memory 10 having five regions 12–16. In this instance, and wherever possible in the remainder of the description, like reference numerals have been used to designate like elements in FIGS. 1 and 7A–7EE. The directory region 12, table region 13, input region 14, and output region 15 of core memory 10 have been previously described. By way of review, the format for the directory region 12 is shown in FIG. 4A, the format for the absolute portion of the table region is shown in FIG. 4B, and the format for the integral portion of the table region is shown in FIG. 4C. Prefix region 16 was not previously described. To understand the purpose and function of this region, it should be understood that in most dictionaries it is not feasible to store all possible forms in which a word may appear. Therefore, the dictionary generally stores the roots of most words and also various prefixes and suffixes. A match may, for example, be had on a root and an indication is required that what has been found is a root so that the subsequent match can be had on the suffix. One way of accomplishing this is to include certain characters in the function of the root which are stored in prefix region 16 of core memory 10. The format of an entry having such a function is shown in FIG. 5D. When a search is begun on the suffix, a match must first be had on the prefix characters. This indicates that what is to follow is a suffix. Having matched on these prefix characters, the circuit then proceeds to match on the suffix characters of the word (i.e. the characters not previously matched on). A better understanding of the mechanics of the prefix search will be gained from the description of its operation to follow later.

There is a drive line 230 energized by a driver 232 (FIG. 7P) for each address position in core memory 10. The driver 232, which is energized at any given time, is determined by output lines 234 from memory address register (MAR) 20. MAR20 applies signals to lines 234 to energize a driver 232 only when signals are applied to it from accumulator 236 through lines 238, gate 240, and all but the lower order three lines of the lines 242. The low order three lines of the lines 242 are connected to byte register and decoder 244. The conditioning input to gate 240 is memory select output line 246 from OR gate 248 (FIG. 7H). The inputs to OR gate 248 are output lines 250–253 from AND gates 256–259 respectively. One input to AND gate 256 is S2 line 202, and the second input to this AND gate is output line 264 from OR gate 266. One input to OR gate 266 is output line 265 from AND gate 267. One input to AND gate 257 is S0 line 200 and the second input to this AND gate is output line 268 from OR gate 270. One input to AND gates 258 and 259 is S0 line 200.

As indicated previously, each word in core memory 10 contains 36 bits. The 36 sense lines 272 from core memory 10 (FIG. 7Q) are divided into six groups of six lines each with each group containing the lines for one byte of the memory word. Each group of lines 272 is connected as the information inputs to a gate 274A–274F. The conditioning inputs to gates 274A–274F are output lines 275A–275F from OR gates 276A–276F respectively. One input to OR gates 276A–276F is output line 277 from inverter 278 (FIG. 7A). The other input to OR gates 276A–276F are output lines 279A–279F respectively. The lines 279A–279F are the complement outputs from the decoder portion of circuit 244. At any given time a signal will appear on all the lines 279 except the one corresponding to the value stored in circuit 244. The output lines from gates 274A–274F combine to form bus 282 which is connected as one set of inputs to memory data register (MDR) 24. A second set of inputs to MDR24 are the 36 lines of input bus 26.

The final set of inputs to MDR24 are the thirty six lines of bus 284. Bus 284 is formed by the six output lines each from gates 304–309. The conditioning inputs to gates 304–309 are lines 411–416 of bus 410 from circuit 244. A signal appears on the line 411–416 corresponding to the value stored in circuit 244. The information inputs to all of the gates 304–309 are the six output lines 312 from gate 280. The information inputs to gate 280 are output lines 104 from ICOMP register 102 (FIG. 7B). The conditioning input to gate 280 is output line 282 from OR gate 284. Line 282 is also connected as the input to inverter 278. The inputs to OR gate 284 are output lines 286 and 288 from AND gates 290 and 292 respectively. One input to AND gates 290 and 292 is S2 line 202.

Output lines 296 from MDR24 are connected as the energizing inputs to inhibit drivers 318 and as one set of inputs to OR gates 302. The lines 296 are also connected as the output bus to apply data to the CPU (not shown). Output lines 320 from inhibit drivers 318 are connected as the information inputs to core memory 10.

The other set of inputs to OR gates 302 is output lines 326 from gate 328. The information inputs to gate 328 are lines 0–28 of input data bus 26. The conditioning input to gate 328 is output line 330 from OR gate 332. The inputs to OR gate 332 are RRPA line 334 and RRPI line 336 from the CPU (not shown). A signal is applied to RRPA line 334 when a read record absolute (RRPA) instruction is applied to the system and a signal is applied to RRPI line 336 when a read record integral instruction (RRPI) is applied to the system.

The 36 output lines 338 from OR gate 302 divide with the 13 lines 5–17 being applied as the information inputs to gates 340 (FIG. 7N), the 13 lines 23–35 being connected as the information inputs to gates 342, the 13 lines designated 0–12 being connected as the information inputs to gate 344, the 16 lines designated 13–28 being connected as the information inputs to gates 346 (FIG. 7F), the 11 lines designated 13–23 being connected as the information inputs to gates 348 (FIG. 7L), the 6 lines designated 21–26 being connected as the information inputs to gate 350, the 14 lines designated 22–35 being connected as the information inputs to gate 352 (FIG. 7D) and the 6 lines each designated 0–5, 6–11, 12–17, 18–23, 24–29, and 30–35 being connected as the information inputs to gates 354–359 (FIG. 7L) respectively. The conditioning inputs to gates 340 (FIG. 7N) and 342 are output line 364 from AND gate 365 and output line 368 from AND gate 369 respectively. One input to AND gates 365 and 369 is S4 line 204. The other input to AND gate 365 is output line 372 from OR gate 374. Output lines 376 and 377 from gates 340 and 342 respectively are connected as the two sets of inputs to table index register (TIR) 32. As indicated previously, when two sets of inputs are applied to a register, it is assumed that it contains circuitry for performing the required internal ORing function. The conditioning input to gate 344 is the beforementioned output line 330 from OR gate 332 (FIG. 7Q) and the conditioning input to gate 346 is the beforementioned RRPI line 336. Output lines 378 and 380 from gates 344 and 346 respectively are connected as one set of inputs each to function index register (FIR) 36 and input index register (NR) 34.

The conditioning input to gate 348 (FIG. 7L) is RRPA line 334, and the conditioning input to gate 350 is output line 384 from AND gate 386. One input to AND gate 386 is S4 line 204. Output lines 392 and 394 from gates 348 and 350 respectively are connected as two sets of inputs to photostore address register (PAR) 38.

The conditioning input to gates 352 (FIG. 7D) is output line 398 from AND gate 400. The inputs to AND gate 400 are S4 line 204 and output line 402 from OR gate 404. Finally, the conditioning inputs to gates 354–359 (FIG. 7L) are individual lines 411–416 from byte register and decoder 244 (FIG. 7P). The cable containing these lines is designated 410. Depending on the 3-bit combination stored in byte register 244, the decoder contained therein generates an output signal on one of its six output lines 411–416. Two of the possible bit combinations in register 244 are not used. Output lines 421–426 from gates 354–359 respectively are connected as the inputs to OR gates 430. Output lines 432 from OR gates 430 are connected as the information inputs to gates 434 (FIG. 7C), 436 (FIG. 7K), and 438. The conditioning input to gate 434 is output line 440 from OR gate 442 (FIG. 7D). The inputs to OR gate 442 are output lines 444–446 from AND gates 449–451 respectively. One input to AND gates 449–451 is S4 line 204. A second input to AND gate 449 is output line 454 from OR gate 456. Output lines 458 from gate 434 are connected as one set of inputs to ISCAN register 64.

The conditioning input to gate 436 (FIG. 7K) is output line 457 from AND gate 459. One input to AND gate 459 is S3 line 203. Output lines 464 from gate 436 are connected as the inputs to TCON register 466. Output lines 468 from TCON register 466 are connected as the information inputs to gate 470. The conditioning input to gate 470 is output line 469 from AND gate 471. One input to AND gate 471 is S7 line 207. The second input to AND gates 459 and 471 is output line 460 from AND gate 462. Output lines 472 from gate 470 are connected as the input to TSCAN register 40. TCON register 466 and TSCAN register 40 are both of a type register known as a shift all. The inputs to these registers merely condition these registers to store a character. The actual storage of the byte applied to the inputs of these registers is effected when a pulse is applied to the register in a manner not shown at each transition of clock 199. The inputs to these and other shift cells such as accumulator 236, ISCAN register 64, ICOMP register 102 and TCOMP register 88 are therefore often referred to as conditioning inputs. While it is not always so stated, it is to be understood that whenever an input is applied to such a register at, for example, S4 time, the byte is not actually stored in the register until the next transition in clock 199 (i.e. for example, at the transition between S4 and S5 time). Output lines 114 from TSCAN register 40 are connected as one set of inputs to lower compare circuit 112. The circuitry in lower compare circuit 112 is described later.

The conditioning input to gate 438 (FIG. 7K) is output line 474 from OR gate 476. The inputs to OR gate 476 are output lines 478 and 479 from AND gates 481 and 482 respectively. One input to AND gates 481 and 482 is S3 line 203. Output lines 484 from gate 438 are connected as one set of inputs to DCON486 (FIG. 7I). DCON register 486 is also a shift cell of the type previously described.

Figure 7M:
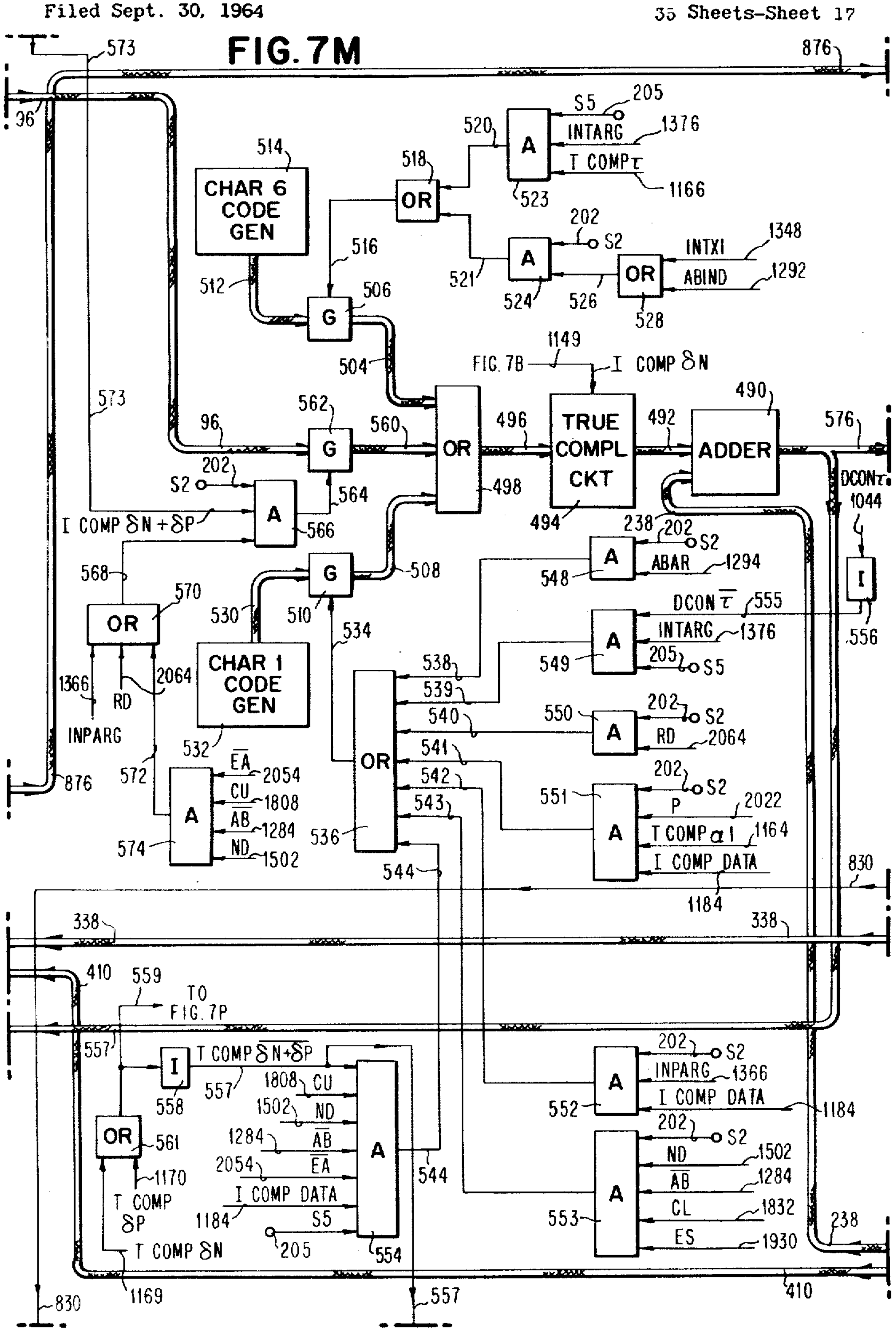

Referring now to FIG. 7M, it is seen that output lines 238 from accumulator 236 are also connected as one set of inputs to adder 490. The other set of inputs to adder 490 is output lines 492 from true complement circuit 494. True complement circuit 494 is a bank of exclusive OR gates which ordinarily passes signals applied to it on output lines 496 from OR gates 498 without any change, but which causes the bits applied to it through lines 496 to be complemented before being applied to output lines 492 when a signal appears on output line 1149 from ICOMP δN detector AND gate 1139 (FIG. 7B). Two sets of inputs to OR gates 498 are output lines 504 from gate 506 and output lines 508 from gate 510. The information inputs to gate 506 are output lines 512 from character 6 code generator 514. Character 6 code generator 514 continuously applies the code for the numeral 6 to lines 512. The conditioning input to gate 506 is output line 516 from OR gate 518. Line 516 is also known as the force 6 line. The inputs to OR gate 518 are output lines 520 and 521 from AND gates 523 and 524 respectively. One input to AND gate 523 is S5 line 205. The inputs to AND gates 524 are S2 line 202 and output line 526 from OR gate 528.

The information inputs to gate 510 are output lines 530 from character 1 code generator 532. Character 1 code generator 532 continuously applies the code for the numeral 1 to lines 530. The conditioning input to gate 510 is output line 534 from OR gate 536. The inputs to OR gate 536 are output lines 538–544 from AND gates 548–554 respectively. One input to AND gates 548, 550, 551, 552, and 553 is S2 line 202, while one input to AND gates 549 and 554 is S5 line 205. Second inputs to AND gates 549 and 554 are outputs line 555 from inverter 556 and output line 557 from inverter 558 respectively. The input to inverter 558 is output line 559 from OR gate 561.

The final set of inputs to OR gate 498 are output lines 560 from gate 562. The information inputs to gate 562 are output lines 96 from TCOMP register 88 (FIG. 7D). The conditioning input to gate 562 is output line 564 from AND gate 566. One input to AND gate 566 is S2 line 202 and a second input to this AND gate is output line 568 from OR gate 570. One input to OR gate 570 is output line 572 from AND gate 574. A second input to AND gate 566 is output line 573 from OR gate 575 (FIG. 7B).

Output lines 576 from adder 490 are connected as the information inputs to gates 578 (FIG. 7F), 580, 582 (FIG. 7N), 584, and 586 (FIG. 7L). The conditioning input to gate 578 (FIG. 7F) is output line 588 from OR gate 590 (FIG. 7D). The inputs to OR gate 590 are output lines 592–595 from AND gates 598–601. One input to AND gate 598 is S3 line 203. One input to AND gates 599–601 is S6 line 206. Output lines 604 from gate 578 are connected as the inputs to input status register (ISR) 606.

The conditioning input to gate 580 (FIG. 7F) is output line 608 from OR gate 610 (FIG. 7E). The inputs to OR gate 610 are output lines 612 and 613 from AND gates 615 and 616 respectively. One input to AND gates 615 and 616 is S6 line 206. A second input to AND gate 616 is output line 517 from OR gate 619. Output lines 618 from gate 580 are connected as the other set of inputs to input index register (IIR) 34.

The conditioning input to gate 582 (FIG. 7N) is output line 622 from OR gate 623. The inputs to OR gate 623 are output lines 627 and 628, from AND gates 624 (FIG. 7E) and 625 respectively. One input to AND gate 624 is S3 line 203 and one input to AND gate 625 is S4 line 204. Output lines 626 from gate 582 are connected as the other set of inputs to function index register (FIR) 36.

The conditioning input to gate 584 is output line 630 from OR gate 632 (FIG. 7E). The inputs to OR gate 632 are output lines 634–636 from AND gate 639–641. One input to AND gates 639 and 640 is S3 line 203. Three inputs to AND gate 641 are S6 line 206, output line 643 from OR gate 644 and output line 645 from inverter 647. One input to OR gate 644 is output line 649 from inverter 651. Output lines 646 from gate 584 are connected as the inputs to table status register (TSR) 648.

The conditioning input to gate 586 (FIG. 7L) is output line 650 from AND gate 652. One input to AND gate 652 is S6 line 206. Output lines 654 from gate 586 are connected as the final set of inputs to photostore address register (PAR) 38.

Output lines 658 from ISR606 (FIG. 7F) are connected as the information inputs to gate 660. The conditioning input to gate 660 is output line 662 from OR gate 664 (FIG. 7G). The inputs to OR gate 664 are output lines 666–669 from AND gates 672–675 (FIG. 7CC for AND gate 675) respectively. One input to AND gates 672 and 675 is S7 line 207. One input to AND gates 673 and 674 is S4 line 204. A second input to AND gate 672 is output line 677 from OR gate 678. A second input to AND gate 674 is output line 676 from inverter 679. Two other inputs to AND gate 675 (FIG. 7CC) are output line 681 from OR gate 683 and beforementioned line 557. An input to OR gate 683 is output line 689 from AND gate 697. Output lines 680 from gate 660 are connected as one set of inputs to OR gate 682 (FIG. 7P).

Output lines 684 from IIR34 (FIG. 7F) are connected as the information inputs to gate 686. The conditioning input to gate 686 is output line 688 from OR gate 690. The inputs to OR gate 690 are output lines 691–696 from AND gates 701–706 respectively. One input to AND gates 701, 703, 705, and 706 is S4 line 204. One input to AND gate 702 is S7 line 207. A second input to AND gate 702 is output line 708 from delay line 710. The input to delay 710 is RRPI line 336. One input to AND gate 704 is output line 709 from AND gate 711. One input to AND gate 711 is S4 line 204. Output lines 712 from gate 686 are connected as a second set of inputs to OR gates 682.

Output lines 714 from FIR36 (FIG. 7N) are connected as the information inputs to gate 716. The conditioning input to gate 716 is output line 718 from AND gate 726. One input to AND gate 726 is S4 line 204. A second input to AND gate 726 is output line 727 from inverter 729. Output lines 728 from gate 716 are connected as another set of inputs to OR gates 682.

Output lines 730 from TSR648 are connected as the information inputs to gate 732. The conditioning input to gates 732 is output line 734 from OR gate 736 (FIG. 7P). The inputs to OR gate 736 are output lines 738–740 from AND gates 743–745 respectively and output line 747 from OR gate 748. The inputs to OR gate 748 are output line 750 from AND gate 752 (FIG. 7CC) and output line 754 from AND gate 756. Two inputs to AND gate 752 are 57 line 207 and output line 753 from inverter 755. Two inputs to AND gate 756 are 57 line 207 and output line 758 from OR gate 760. One input to AND gates 743–745 (FIG. 7P) is also S7 line 207. Two other inputs to AND gate 743 are output lines 768 and 770 from OR gates 772 and 774 respectively. One input to OR gate 774 is output line 776 from inverter 778 and the other input is beforementioned output line 559 from OR gate 561 (FIG. 7M). The input to inverter 778 is beforementioned output line 681 from OR gate 683. One input to OR gate 772 is output line 779 from inverter 781. Output lines 784 from gate 732 are connected as another set of inputs to OR gate 682.

Figure 7N:
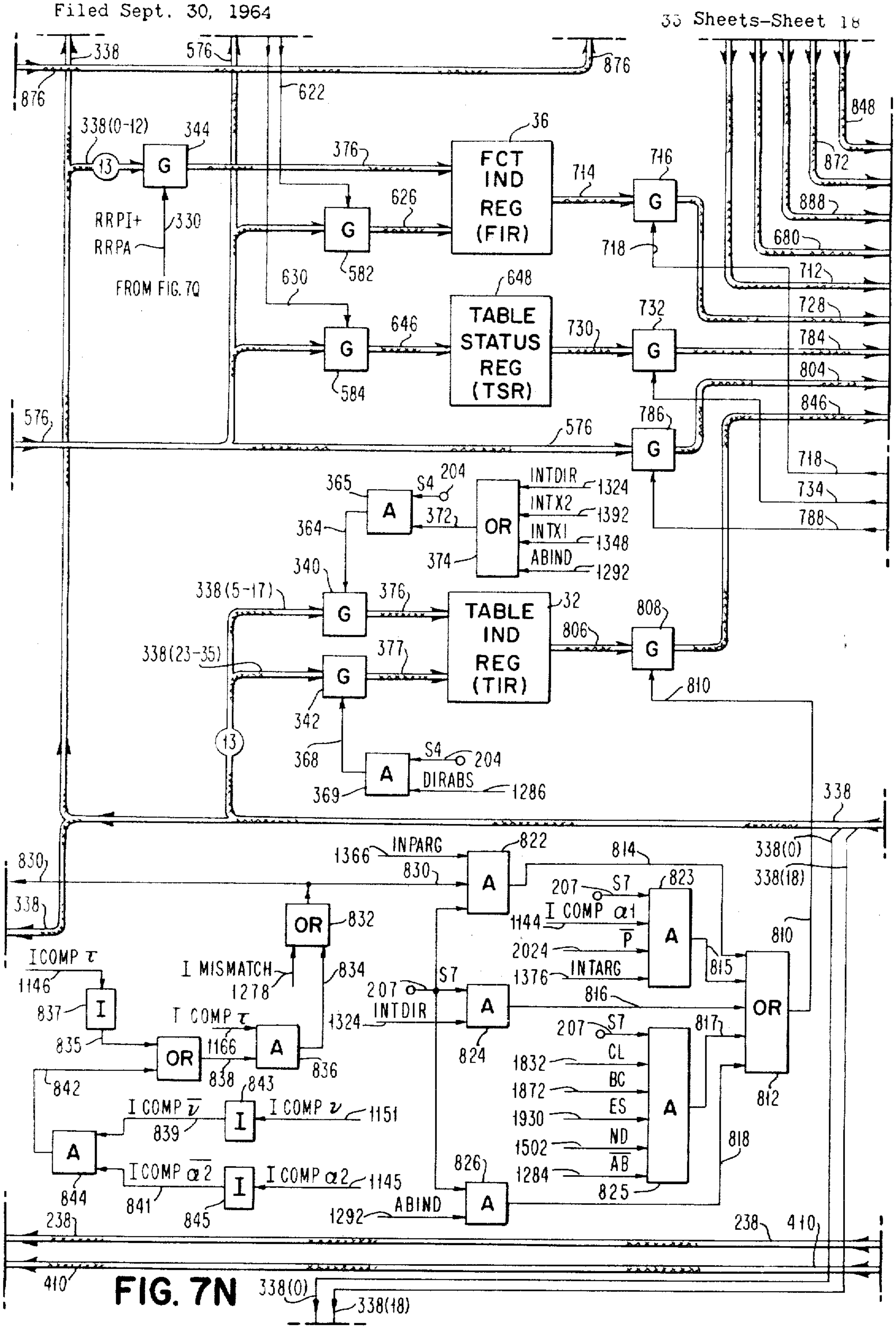
Figure 7P:
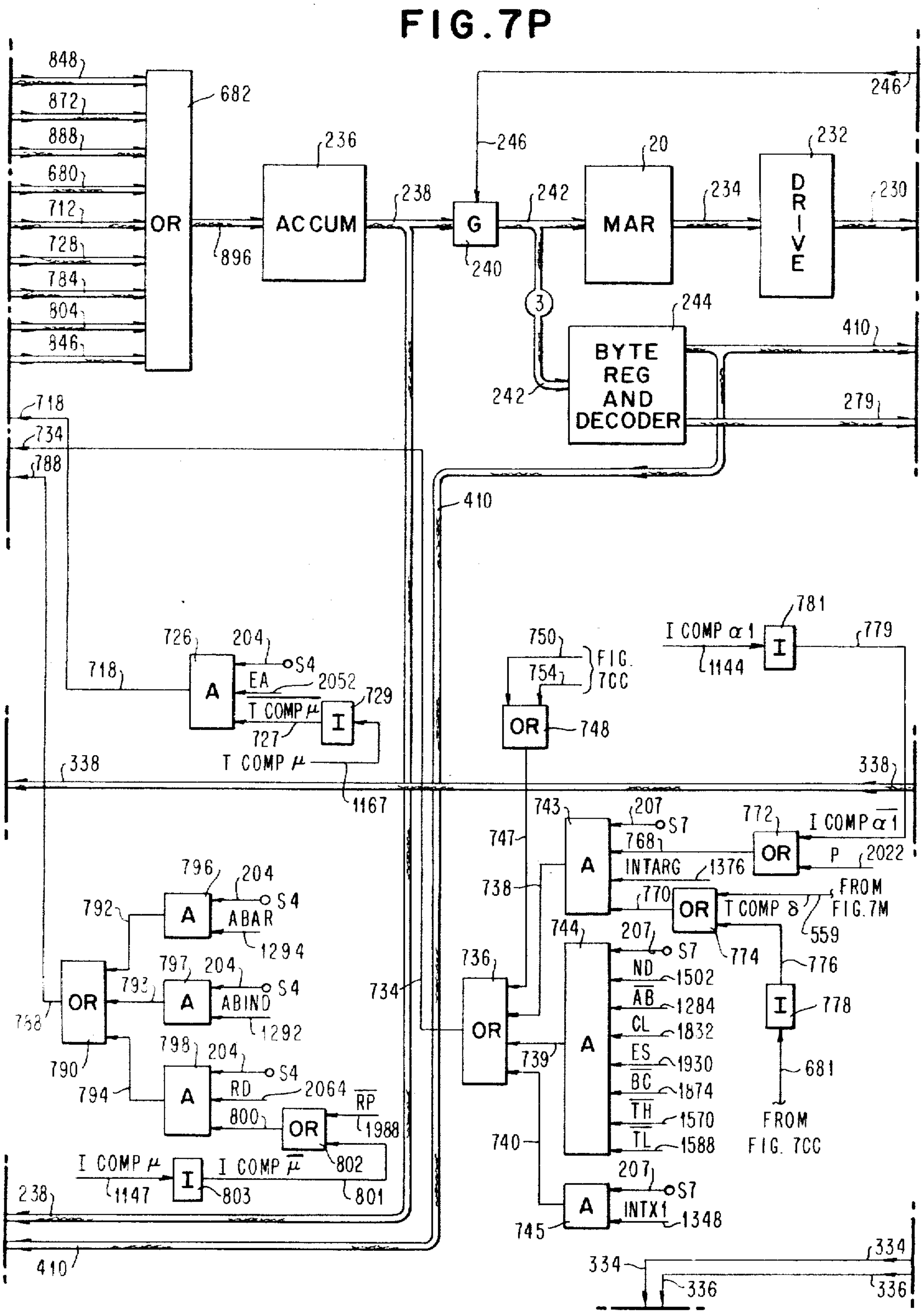
Figure 7Q:
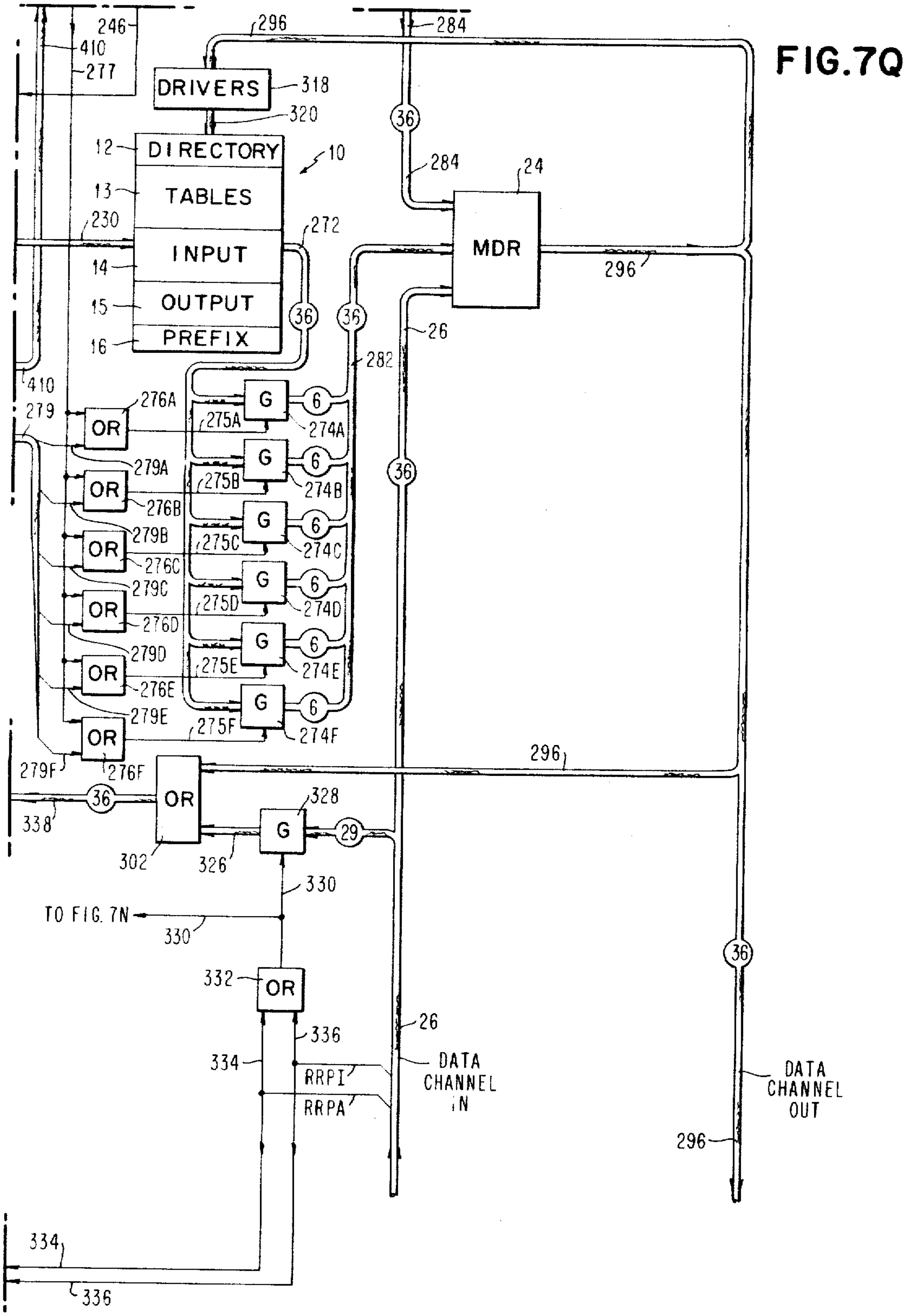

Output lines 576 from adder 490 are also connected as the information inputs to gate 786 (FIG. 7N). The conditioning input to gate 786 is output line 788 from OR gate 790. The inputs to OR gate 790 are output lines 792–794 from AND gates 796–798 respectively. One input to AND gates 796–798 is S4 line 204. A second input to AND gate 798 is output line 800 from OR gate 802. One input to OR gate 802 is output line 801 from inverter 803. Output lines 804 from gate 786 are connected as another set of inputs to OR gate 682.

Output lines 806 from TIR32 are connected as the information inputs to gate 808. The conditioning input to gate 808 is output line 810 from OR gate 812. The inputs to OR gate 812 are output lines 814–818 from AND gates 822–826 respectively. One input to AND gates 822–826 is S7 line 207. A second input to AND gate 822 is output line 830 from OR gate 832. One input to OR gate 832 is output line 834 from AND gate 836. One input to AND gate 836 is output line 838 from OR gate 840. The inputs to OR gate 840 are output line 842 from AND gate 844 and output line 835 from inverter 837. The inputs to AND gate 844 are output lines 839 and 841 from inverters 843 and 845 respectively. Output lines 846 from gate 808 are connected as another set of inputs to OR gates 682.

Another set of inputs to OR gates 682 is output lines 848 from gate 850 (FIG. 7G). The information inputs to gate 850 are output lines 852 from prefix index register (PIR) 854. Register 854 is preset to the first address in prefix region 16 of core memory 10. The conditioning input to gate 850 is output line 856 from OR gate 858. The inputs to OR gate 858 are output lines 859–863 from AND gates 865–869. One input to AND gates 866 and 867 is S4 line 204. One input to AND gates 868 and 869 is S7 line 207. One input to AND gate 865 (FIG. 7F) is beforementioned output line 709 from AND gate 711. A second input to AND gate 868 is beforementioned output line 708 from delay 710 (FIG. 7F).

Another set of inputs to OR gates 682 are output lines 872 from gate 874. The information inputs to gate 874 are all 13 of the output lines 876 from PAR38 (FIG. 7K). The conditioning input to gate 874 is output line 878 from OR gate 880. The inputs to OR gate 880 are lines 882 and 883 from AND gates 885 and 886 respectively. One input to AND gate 885 is S7 line 207 and one input to AND gate 886 is S4 line 204.

The final set of inputs to OR gates 682 is output lines 888 from gate 890 (FIG. 7F). The information inputs to gate 890 are output lines 110 from ISCAN register 64 (FIG. 7C). The conditioning input to gate 890 is output line 892 from AND gate 894. One input to AND gate 894 is S7 line 207.

Output lines 896 from OR gate 682 are connected as the input to accumulator 236. Accumulator 236 is a shift cell of the type previously described.

The higher order six lines of the output lines 876 from PAR38 (FIG. 7K) which lines contain the track address, are connected as the information inputs to gate 900. The next five lines of the lines 876 which lines contain the entry (record) address on the photostore are connected as the information inputs to gate 902. The conditioning input to gate 900 is output line 904 from OR gate 906. The inputs to OR gate 906 are output line 908 from AND gate 910 and output line 912 from AND gate 914. One input to AND gate 910 is S7 line 207 and one input to AND gate 914 is output line 916 from OR gate 918. The inputs to OR gate 918 are output lines 920–922 from AND gates 925–927 respectively. One input to AND gates 925–927 is S7 line 207. The second input to AND gate 927 is output line 928 from inverter 929.

The conditioning input to gate 902 is output line 930 from AND gate 932. One input to AND gate 932 is the beforementioned output line 916 from OR gate 918. Output lines 934 and 936 from gates 900 and 902 respectively are connected as the two sets of inputs to OR gates 938. Output lines 940 from OR gates 938 are connected as the second set of inputs to ISCAN register 64 (FIG. 7C).

The higher order eight output lines 942 from DAR42 (FIG. 7D), which lines contain the drum track address, are connected as the inputs to table address register (TAR)944 (FIG. 7B) and the lower order six of the lines 942 are connected as the information inputs to gates 946. A signal on one of the output lines 948 from TAR944 indicates which heads on magnetic drum 68 are to be energized at any given time. TAR therefore, performs both a storing and a decoding function. The conditioning input to gate 946 (FIG. 7C) is output line 950 from OR gate 952 (FIG. 7D). The inputs to OR gate 952 are output lines 954 and 955 from AND gates 957 and 958 respectively. One input to AND gate 957 is S7 line 207 and one input to AND gate 958 is S4 line 204. Output lines 960 from gate 946 form the final set of inputs to ISCAN register 64. A bit is conditioned to be inserted into the highest order position of ISCAN register 64 by a signal on output line 962 from AND gate 964. One input to AND gate 964 is S7 line 207. ISCAN register 64 is a shift cell of the type previously described. Output lines 110 from ISCAN register 64 are connected as one set of the inputs to upper compare circuit 108.

Referring now to FIG. 7A, it is seen that photostore 66 has a data output line 968 to which information is applied a bit at a time and which line is applied as one input to AND gate 970 and a clock output line 972 which is applied as one input to AND gate 974. Since, as we indicated previously, each bit of data is represented by both a dark spot and a light spot on the photostore disc, output line 980 from AND gate 970 is connected to apply the true portion (which may arbitrarily be designated as the first or the second half of the representation for a bit) to one portion of SCAN register 74 and the complement of the bit to the other portion of the SCAN register. Scan register 74 is made up of two, two-byte shift registers. Output line 982 from AND gate 974 is connected as one input to OR gate 984.

In order to get a true and complement output from magnetic drum 68, two tracks are recorded for each bit of data stored on the drum, one track having the true representation of the data and the other track having the complement representation. These tracks are on opposite sides of the drum. The energizing of a head by a line 948 causes the two tracks for the true and the complement to be simultaneously energized. The true representation of a given bit of data appears on true output line 986 from the drum and the complement on complement output line 987. These outputs are combined in circuit 989 so as to appear on output line 990 in the same form as the output from photostore 66. Line 990 is connected as one input to AND gate 992. Output line 994 from AND gate 992 applies the true and complement form of the input data to the proper portions of SCAN registers 74. Drum 68 also has a clock track which continuously applies clock pulses through line 996 to AND gate 998. Output line 1000 from AND gate 998 is connected as the other input to OR gate 984. Output line 1002 from OR gate 984 is the memory clock line of the circuit. It is applied as an additional input to SCAN register 74 and as one input to AND gate 216 (FIG. 7E).

While it is not an essential part of the invention, SCAN register 74 may be designed to have the capacity to perform a parity check on both the true and complement version of the input applied to it and to pass to output lines 1004 from the SCAN register the one which has proper parity. This utilizes the inherent redundancy of the photostore disc to obtain a degree of error correction and therefore a higher reliability of the output. If this error checking function is not to be performed, then only the true version of the output need be stored in SCAN register 74. Since bits are applied serially to SCAN register 74, each section thereof is in effect a twelve-bit shift register. Lines 1004 are connected as the inputs to $\alpha 1$ and $\alpha 2$ detector AND gates 1006 and 1007. $\alpha 1$ detector AND gate 1006 generates an output signal on line 1009 when the special character $\alpha 1$ is stored in SCAN register 74, and $\alpha 2$ detector 1007 generates an output signal on line 1010 when an $\alpha 2$ character is stored in SCAN register 74. Lines 1009 and 1010 are connected as the inputs to AND gate 1012. Output line 1013 from AND gate 1012 is connected to the 1 side input of $\alpha 1$–$\alpha 2$ trigger 1014 and through inverter 1017 as one input to AND gate 1019. The other input to AND gate 1019 is clock output line 1002 from OR gate 984 (FIG. 7A). Output line 1021 from AND gate 1019 is connected to the 0 side input of the $\alpha 1$–$\alpha 2$ trigger. Line 1015 is the output from the 1 side of the $\alpha 1$–$\alpha 2$ trigger and line 1016 is the output from the 0 side of this trigger.

Lines 1004 are also connected as the information inputs to gate 1018. The conditioning input to gate 1018 is output line 1020 from AND gate 1022 (FIG. 7A). One input to AND gate 1022 is output lines 1024 from OR gate 1026. The inputs to OR gate 1026 are output lines 1028–1030 from AND gates 1032–1034 respectively. One input to AND gates 1032–1034 is S7 line 207. Output lines 1036 from gate 1018 are connected as the other set of inputs to DCON register 486.

Output lines 1038 from DCON register 486 are connected as the inputs to $\tau$ detector AND gate 1040 and as the information inputs to gate 1042 (FIG. 7J). $\tau$ detector AND gate 1040 generates an output signal on line 1044 when the special character $\tau$ is stored in DCON register 486. Output lines 1046 from gate 1042 are connected as the conditioning inputs to TCOMP register 88. In addition to connections already mentioned, output lines 96 from TCOMP register 88 are connected as one set of inputs to lower compare circuit 112 and as the information inputs to gate 1048. The conditioning input to gates 1042 and 1048 is output line 1050 from OR gate 1052 (FIG. 7B). The inputs to OR gate 1052 are output lines 1054–1058 from AND gates 1061–1065 respectively. One input to AND gates 1061–1065 is S7 line 207. Output lines 1068 from gate 1048 are connected as another set of inputs to ICOMP register 102. TCOMP register 88 and ICOMP register 102 are both shift cells of the type previously described. The reset input to ICOMP register 102, TCOMP register 88, and DCON register 486 is output line 1067 from OR gate 1069 (FIG. 7B). A signal on line 1067 sets the special character $\epsilon$ into these registers. The inputs to OR gate 1069 are output lines 1071 and 1073 from AND gates 1075 and 1077 respectively. One input to AND gates 1075 and 1077 is S0 line 200.

Referring again to FIG. 7A, it is seen that output line 1070 from magnetic drum 68 is connected as the reset input to drum sector counter (DSC) 72. A signal appears on line 1070 once for each complete revolution of magnetic drum 68. The advance input to DSC72 is output line 1072 from magnetic drum 68. This line is connected to the sense head for the sector track on the drum. A signal appears on this line each time a sector mark passes under this head. DSC72 therefore indicates the sector position of the drum at any given time. Output lines 1074 from DSC72 are connected as the information inputs to gate 1076 (FIG. 7B). The conditioning input to gate 1076 is output line 1078 from AND gate 1080 (FIG. 7A). One input to AND gate 1080 is S3 line 203. Output lines 1082 from gate 1076 are connected as another set of inputs to ICOMP register 102.

The final set of inputs to ICOMP register 102 are output lines 1084 from gate 1086 (FIG. 7I). The information inputs to gate 1086 are output lines 1088 from photostore track register (PTR) 1090. The function of this register will be apparent later. The conditioning input to gate 1086 is output line 1092 from AND gate 1094. One input to AND gate 1094 is S7 line 207.

The input to PTR1090 is output line 1096 from gate 1098. The information input to gate 1098 is output lines 1100 from photostore track adder (PTA) 1102. The function of PTA1102 will be apparent later. The conditioning input to gate 1098 is output line 1104 from OR gate 1106. The inputs to OR gate 1106 are output lines 1108 and 1109 from AND gates 1111 and 1112 respectively. One input to AND gates 1111 and 1112 is S3 line 203.

One set of inputs to PTA1102 is output lines 1114 from gate 1116. The information input to gate 1116 is output lines 1118 from true-complement circuit 1120. True complement circuit 1120 ordinarily passes the character applied to it through lines 1122 from character 1 code generator 1124 in uncomplemented form. The complement causing condition for the circuit will be described later. Generator 1124 continuously applies the code for the numeral 1 to lines 1122. The conditioning input to gate 1116 is output line 1126 from AND gate 1128. One input to AND gate 1128 is S2 line 202.

The other set of inputs to PTA1102 is output lines 1130 from gate 1132. The information inputs to gate 1132 are output lines 104 from ICOMP register 102 (FIG. 7B). The conditioning input to gate 1132 is S2 line 202.

Output lines 104 from ICOMP register 102 are also connected as the other set of inputs to upper compare circuit 108 and as the inputs to detector AND gates 1133–1142. AND gate 1133 generates an output signal on line 1143 when the special character $\epsilon$ is stored in ICOMP register 102. The $\epsilon$ character is the character to which registers are reset. AND gate 1134 generates an output signal on line 1144 when the special character $\alpha 1$ is stored in ICOMP register 102. The $\alpha 1$ character is used as part of the character combination which begins (or ends) an entry. As may be seen from FIG. 5D, it is also used to indicate the end of the prefix portion of an entry argument. AND gate 1135 generates an output signal on line 1145 when the special character $\alpha 2$ is stored in ICOMP register 102. The $\alpha 2$ character is the other character in the character combination which begins (or ends) an entry. AND gate 1136 generates an output signal on line 1146 when the $\tau$ character is stored in the ICOMP register. The $\tau$ character is used to indicate the end of an entry argument and the beginning of an entry function for entries having a function. AND gate 1137 generates an output signal on line 1147 when the $\mu$ character is stored in the ICOMP register. As may be seen from FIG. 5D, the $\mu$ character is used to indicate the end of function characters and the beginning of prefix characters in an entry function. AND gate 1138 generates an output signal on line 1148 when the $\phi$ character is stored in the ICOMP register. As may be seen from FIGS. 5A, 5B, and 5E, the $\phi$ character is used to perform two different functions. When it appears in an entry argument, it indicates that what follows is a track and record address. When it appears in an entry function, it means that the entry is the last of a chain. AND gate 1139 generates an output signal on line 1149 when the δN character is stored in the ICOMP register and AND gate 1140 generates an output signal on line 1150 when the δP character is stored in the ICOMP register. The δN and δP characters are computer instructions which are interpreted to mean that the numeral character following them is to be subtracted or added, respectively, from or to the contents of the accumulator. AND gate 1141 generates an output signal on line 1151 when the ν character is stored in the ICOMP register. The ν character is a universal character which the circuit causes to match on any other character. AND gate 1142 generates an output signal on line 1152 when the code for a numeral is stored in ICOMP register 102. Output lines 96 from TCOMP register 88 are connected to a bank of detector AND gates 1153–1162 which are identical to, and perform the same function as the AND gates 1133–1142. AND gates 1153–1161 generating output signals on lines 1163–1172 respectively when the special characters associated therewith appear in TCOMP register 88. Output lines 1143–1150 are connected as the inputs to OR gate 1176 and lines 1163–1170 are connected as the inputs to OR gate 1178. Output line 1180 from OR gate 1176 is connected through inverter 1182 to ICOMP data line 1184. Similarly, output line 1186 from OR gate 1178 is connected through inverter 1188 to TCOMP data line 1190. Lines 1180 and 1186 are the ICOMP data and TCOMP data lines respectively.

The information inputs to upper compare circuit 108 and lower compare circuit 112 have already been described. The compare condition input to upper comparator 108 is output line 1194 from OR gate 1196 (FIG. 7C). The inputs to OR gate 1196 are output lines 1198–1204 from AND gates 1208–1214 respectively. One input to AND gate 1208 is S6 line 206. One input to AND gates 1209, 1211 and 1214 is S1 line 201. One input to AND gates 1210 and 1213 is S5 line 205. One input to AND gate 1212 is S7 line 207. Two additional inputs to AND gate 1213 are output line 1216 from OR gate 1218 and output line 1219 from inverter 1221. A second input to AND gate 1212 is output line 1215 from inverter 1217.

The compare condition input to lower compare circuit 112 is output line 1220 from AND gate 1222 (FIG. 7C). One input to AND gate 1222 is S1 line 201. A second input to AND gate 1222 is output line 1224 from inverter 1226.

Referring now to FIG. 8, it is seen that upper compare circuit 108 includes six individual compare circuits designated 1230–1235. Since each of these circuits is identical, only circuit 1230 is shown in detail. The most significant bit in ISCAN register 64 and ICOMP register 102 are each applied to compare circuit 1230 with successively less significant bits in each of the registers being applied to compare circuits 1231–1235. Referring to compare circuit 1230, it is seen that the most significant bit in ISCAN register 64 is applied directly to AND gates 1240 and 1241 and through inverter 1243 as one input to AND gates 1245 and 1246. Similarly, the output line from the most significant bit of ICOMP register 102 is applied directly to AND gates 1240 and 1245 and through inverter 1247 as one input to AND gates 1241 and 1246. The final input to AND gates 1240, 1241, 1245, and 1246 is the compare condition output line 1194 from OR gate 1196. If there is a bit in the compared position of the ISCAN register and no bit in the corresponding position of the ICOMP register, AND gate 1241 generates an output signal on line 1248A which is connected as one input to OR gate 1250. Similarly, if ICOMP register has a 1 bit and ISCAN register a 0 bit in the highest order position AND gate 1245 generates an output signal on line 1252A which is applied as one input to OR gate 1254. If both registers have a bit in the compared bit position, AND gate 1240 generates an output signal on line 1256 and if both registers have a 0 in the compared position, AND gate 1246 generates an output signal on line 1258. Lines 1256 and 1258 are applied as the inputs to equal-OR gate 1260. Output line 1262A from compare circuit 1230 is applied as the compare condition input to compare circuit 1231. It performs the same function and is connected in the same manner as the compare condition line 1194 performs for compare circuit 1230. Each of the compare circuits 1231–1235 also has an ISCAN high output line 1248B–1248F and an ISCAN low output line 1252B–1252F. The lines 1248 are connected as the inputs to OR gate 1250 and the lines 1252 as the inputs to OR gate 1254. Each compare circuit 1231–1235 also has an equal output line 1262B–1262F with each of the lines 1262B–1262E being connected as the compare condition input to the succeeding compare circuit. Equal output line 1262F from compare circuit 1235 is connected as one of the inputs to AND gate 1264. Output line 1266 from OR gate 1250 is connected as one input to AND gate 1268 and output line 1270 from OR gate 1254 is connected as one input to AND gate 1272. Compare condition line 1194 is connected as the other input to AND gates 1264, 1268, and 1272. ISCAN low line 118, IMATCH line 119, and ISCAN high line 120 are the output lines from AND gates 1272, 1264, and 1268 respectively.

Lower compare circuit 112 is identical to upper compare circuit 108, the only difference being that compare condition line 1220 is substituted for compare condition line 1194 and the inputs are from TCOMP register 88 and TSCAN register 40 rather than from the ICOMP and ISCAN registers.

ISCAN low output line 118 and ISCAN high output line 120 are connected as the inputs to OR gate 1276 (FIG. 7C). The output from OR gate 1276 is the upper comparator mismatch (or I MISMATCH line) 1278.

RRPA line 334 from the CPU (not shown) is also connected as the input to the 1 side of AB trigger 1278 (FIG. 7X) and DIRABS trigger 1280. The 1 side of a trigger will also be referred to sometimes as the ON side and the 0 side as the OFF side. Line 1282 is the output line from the ON side of AB trigger 1278 and line 1284 is the output line from the OFF side of this trigger. AB trigger 1278 is on when an absolute search is being performed. Line 1286 is the output line from the ON side of DIRABS trigger 1280. DIRABS trigger 1280 is in its 1 state when a directory search is being performed during a search absolute operation. During the table search portion of a search absolute operation, either ABIND trigger 1288 (FIG. 7EE) or ABAR trigger 1290 is in its ON state. Line 1292 is the output line from the ON side of ABIND trigger 1288 and line 1294 is the output line from the 1 side of ABAR trigger 1290. Line 1296 is the output line from the 0 side of ABAR trigger 1290.

RRPI input line 336 is connected as the 1 side input to RRPI trigger 1298 (FIG. 7X) and through delay 1300 (FIG. 7V) and line 1302 as one input to OR gate 1304. Line 1305 is the output line from the 1 side of RRPI trigger 1298. The other input to OR gate 1304 is output line 1306 from AND gate 1308. One input to AND gate 1308 is S7 line 207. Output line 1310 from OR gate 1304 is connected as the input to the 1 side of PRESCAN trigger 1312. Output line 1314 from the ON side of PRESCAN trigger 1312 is connected as one input to AND gate 1316. The other input to AND gate 1316 is S7 line 207. Output line 1320 from AND gate 1316 is connected as the input to the 1 side INTDIR trigger 1322. Output line 1324 from the ON side of trigger 1322 is connected, among other places, as one input to AND gates 1326 and 1328. The other input to AND gate 1326 is S7 line 207. Output line 1330 from AND gate 1326 is connected as the reset input to PRESCAN trigger 1312.

Output line 1332 from AND gate 1328 is connected as one input to OR gate 1334, the other input to this OR gate being output lines 1336 and 1338 from AND gates 1340 and 1342 respectively. The other input to AND gate 1328 and one input to AND gates 1340 and 1342 is S7 line 207. Output line 1344 from OR gate 1334 is connected as the input to the 1 side of INTX1 trigger 1346.

Output line 1348 from the ON side of INTX1 trigger 1346 is conected as one input to AND gates 1350 and 1352, as one input to OR gate 1354, and to other points in the circuit as indicated in the appendix. The other input to AND gate 1350 is S7 line 207. Output line 1356 from AND gate 1350 is connected to the 0 side input of INTDIR trigger 1322. The other input to AND gate 1352 (FIG. 7CC) is S7 line 207. Output line 1358 from AND gate 1352 is connected as one input to OR gate 1360, the other input to this OR gate being beforementioned output line 750 from AND gate 752. Output line 1362 from OR gate 1360 is connected to the 1 side input of INTARG trigger 1364. The other input to OR gate 1354 is output line 1366 from the ON side of INPARG trigger 1368. Output line 1370 from OR gate 1354 is connected as one input to AND gate 1372, the other input to this AND gate being S7 line 207. Output line 1374 from AND gate 1372 is connected as the reset input to INTDIR trigger 1364.

Output line 1376 from the ON side of INTARG trigger 1364 is connected as a second input to beforementioned AND gate 675, as one input to AND gate 1378, as one input to AND gate 1380, and as an input to other elements indicated in the appendix. The other input to AND gates 1378 and 1380 is S7 line 207. Output line 1382 from AND gate 1378 is connected as the 0 side input to INTX1 trigger 1346 and output line 1384 from AND gate 1380 is connected as one input to OR gate 1386. The other input to OR gate 1386 is output line 1388 from AND gate 1390. Output line 1392 from INTX2 trigger 1394 is connected as one input to AND gate 1390, AND gate 1396 (FIG. 7W), and other elements indicated in the appendix. The other input to AND gate 1390 is S7 line 207, and the other input to AND gate 1396 (FIG. 7W) is S6 line 206. Output line 1398 from OR gate 1386 is connected to the OFF side input of INPARG trigger 1368. Output line 754 from AND gate 756 is connected to the ON side input of INTX2 trigger 1394 and S7 line 207 is connected to the 0 side input of this trigger. Triggers 1312 (FIG. 7V), 1322, 1346, 1364 (FIG. 7CC), 1368, and 1394 are used during the directory and table search of an integral operation.

Referring again to FIG. 7E, it is seen that two of the inputs to OR gate 224 are output lines 1400 from AND gate 1402 and output line 1404 from AND gate 1406.

Figure 7R:
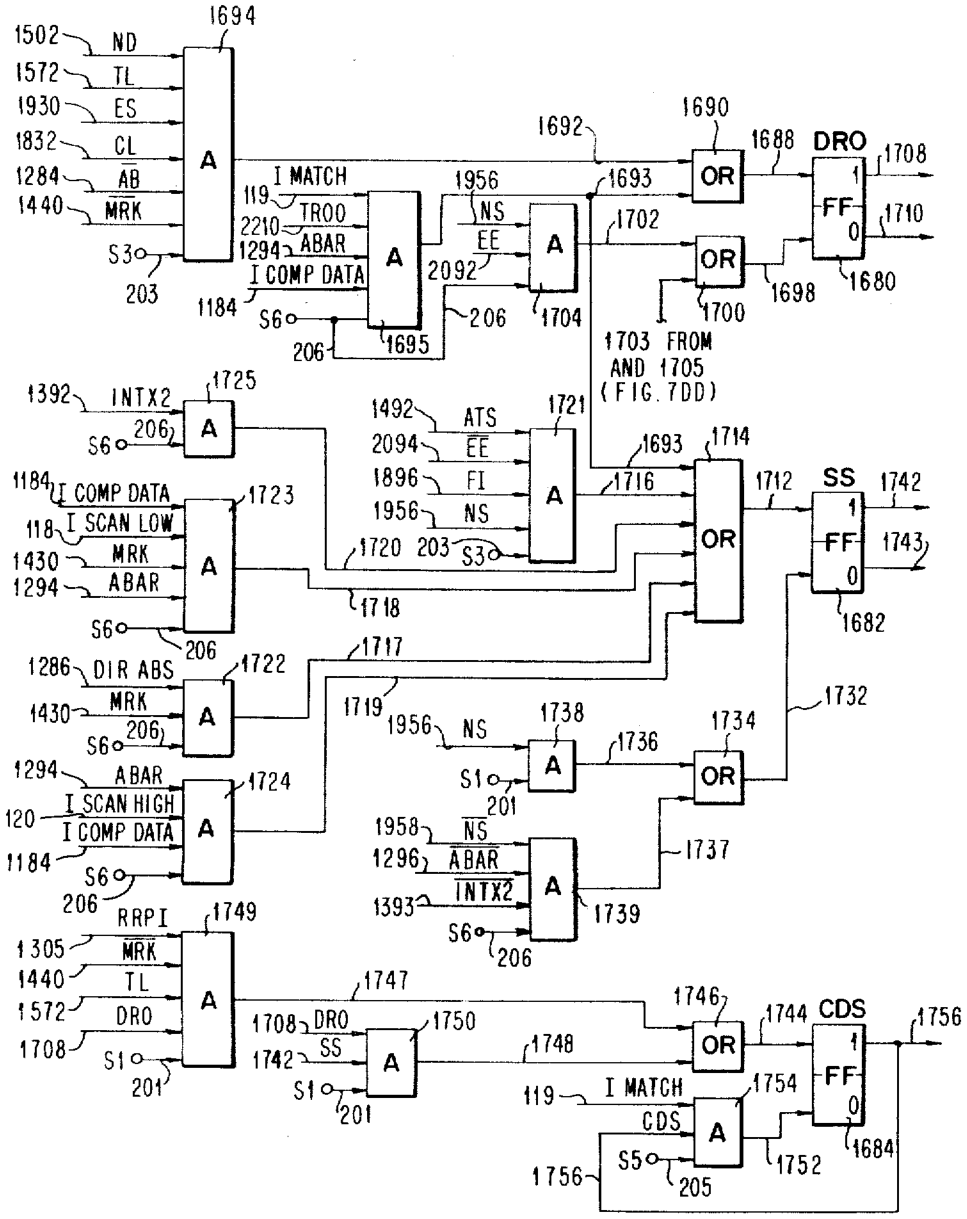
Figure 7S:
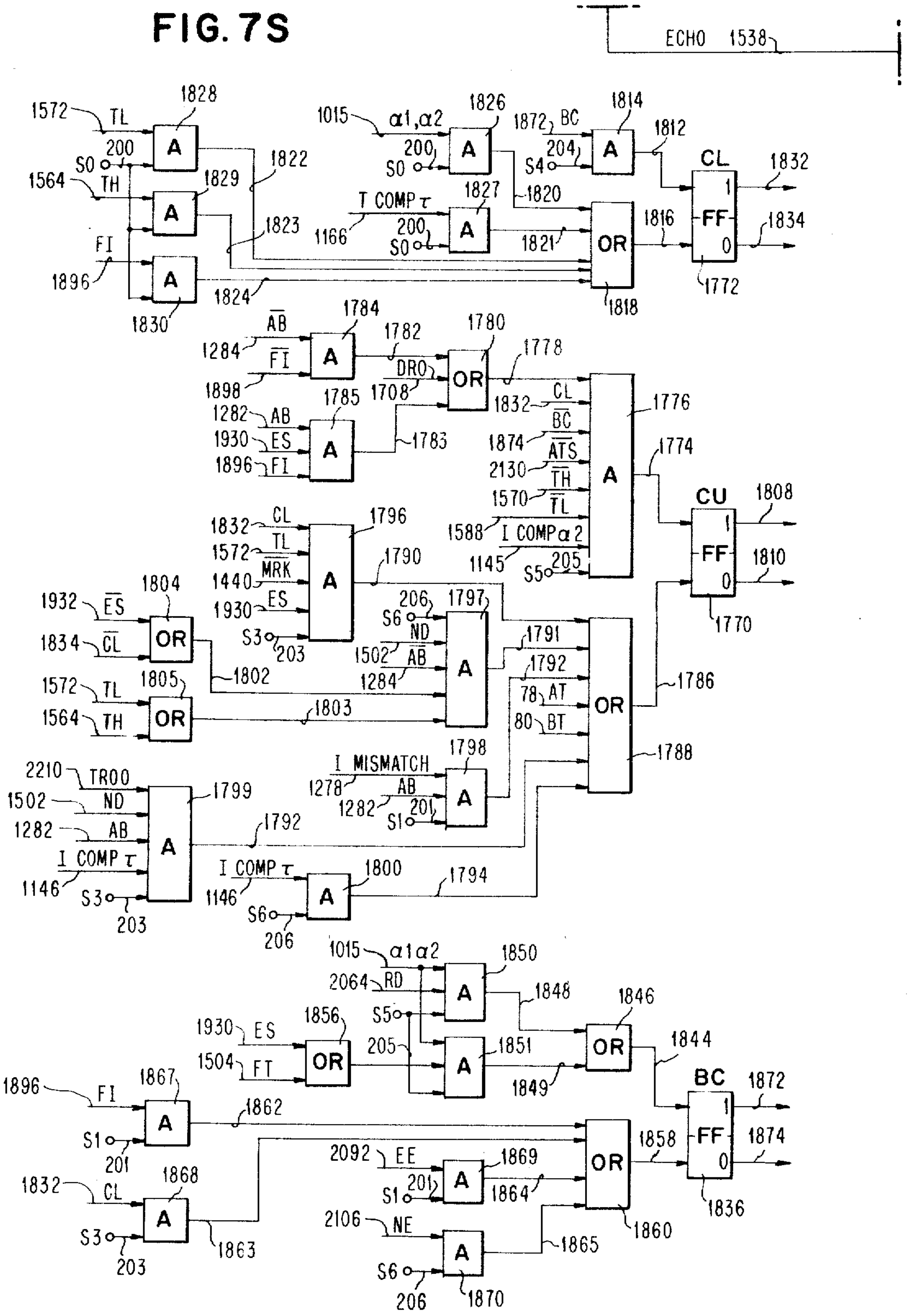
Figure 7T:
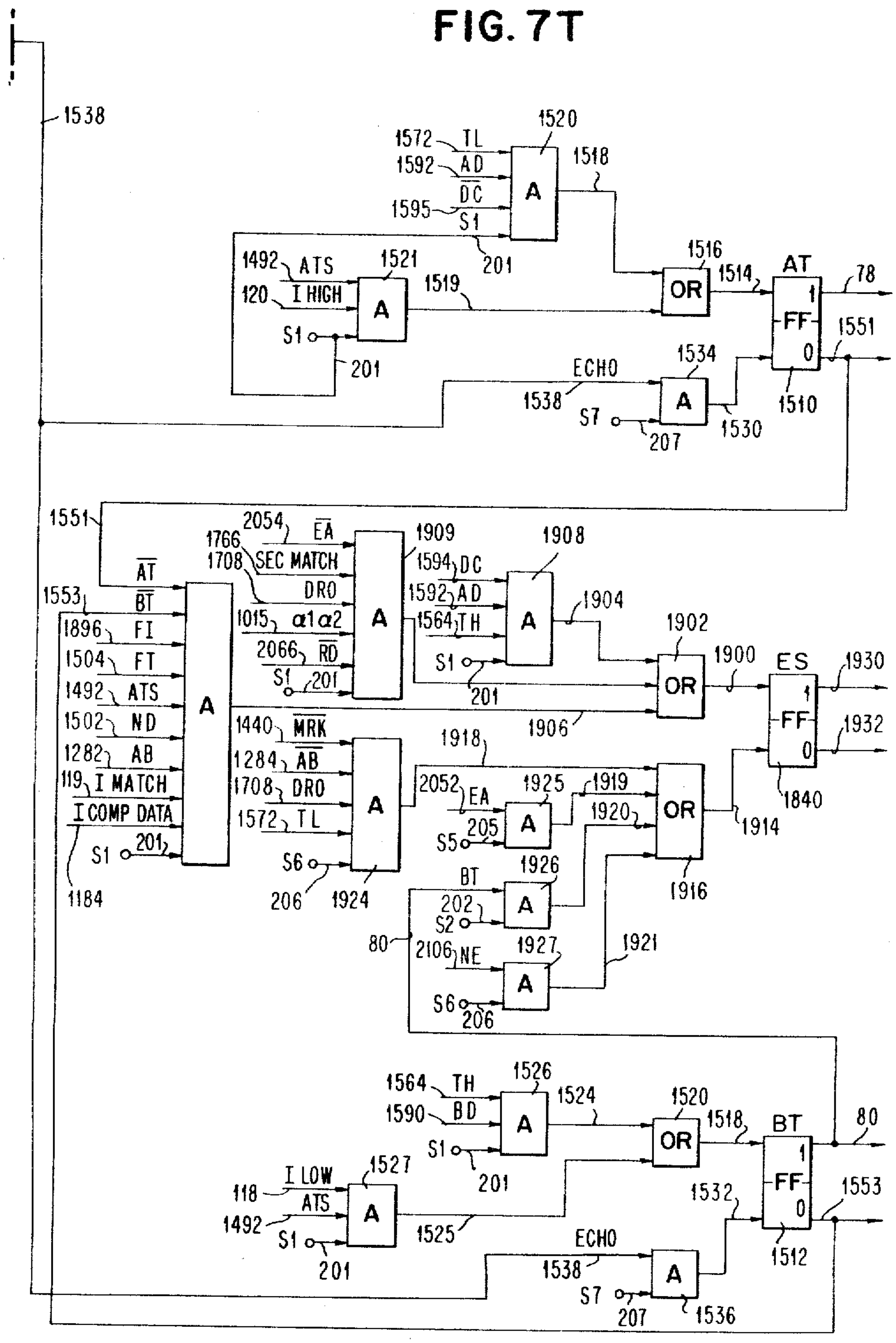
Figure 7U:
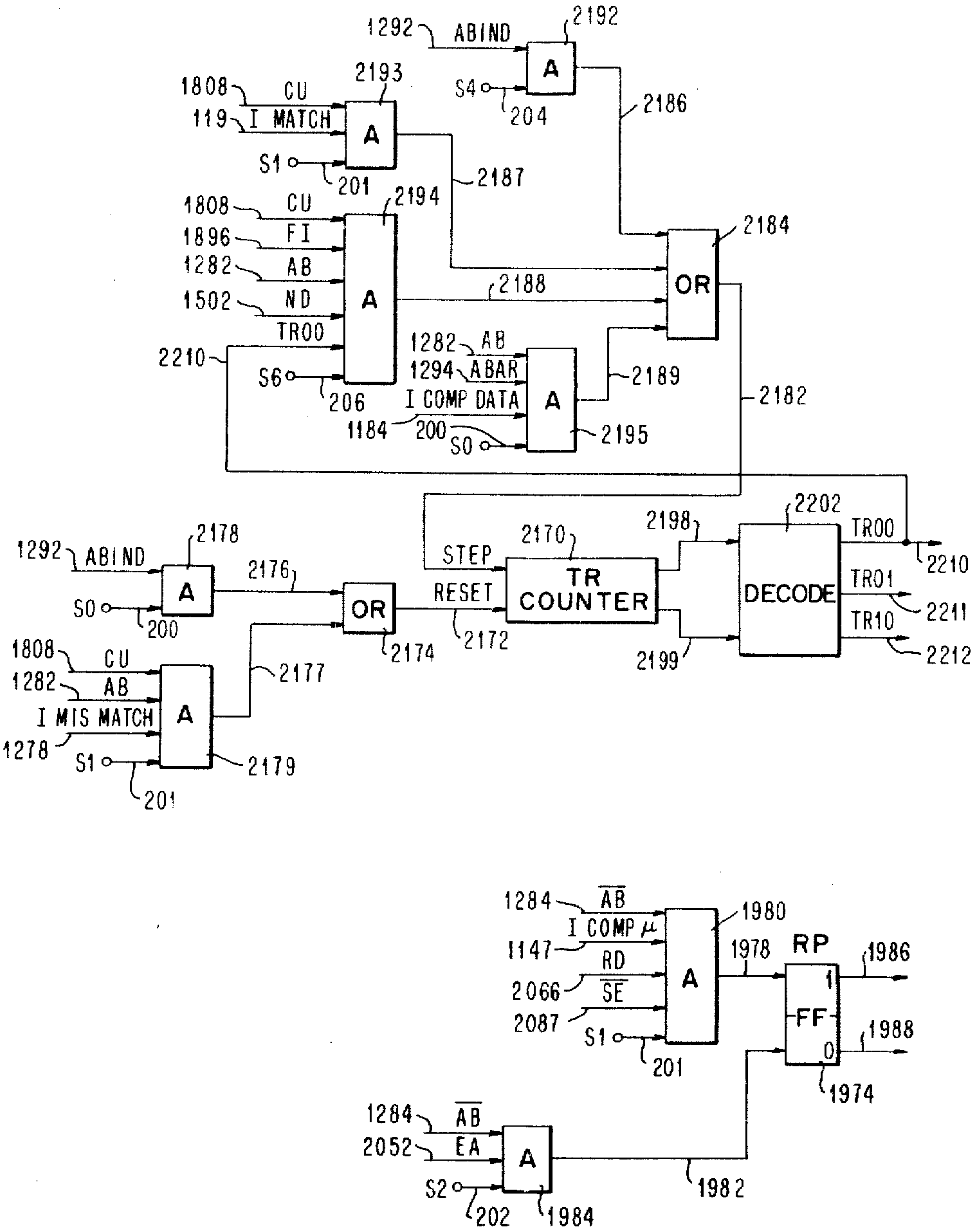
Figure 7V:
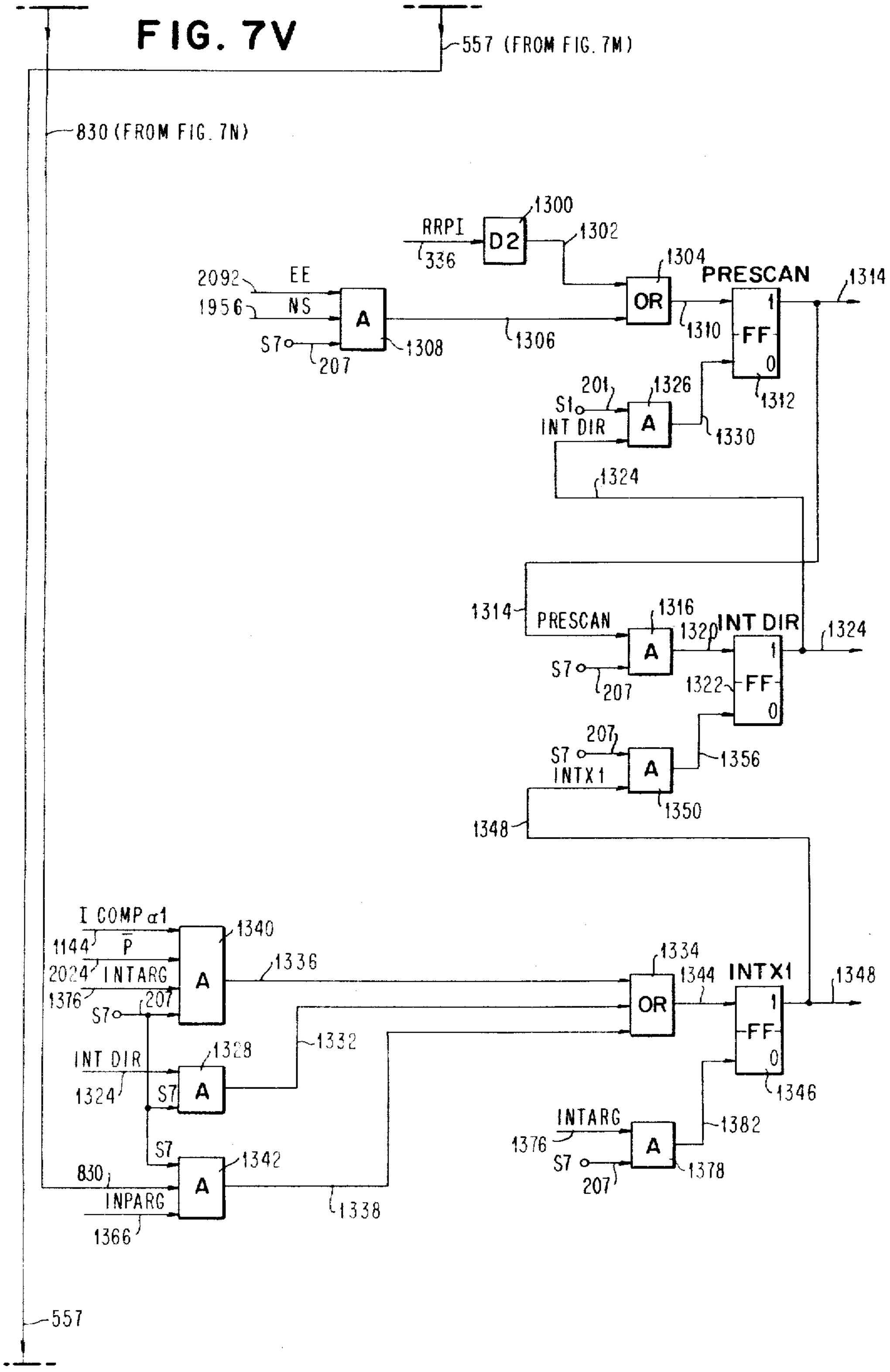
Figure 7W:
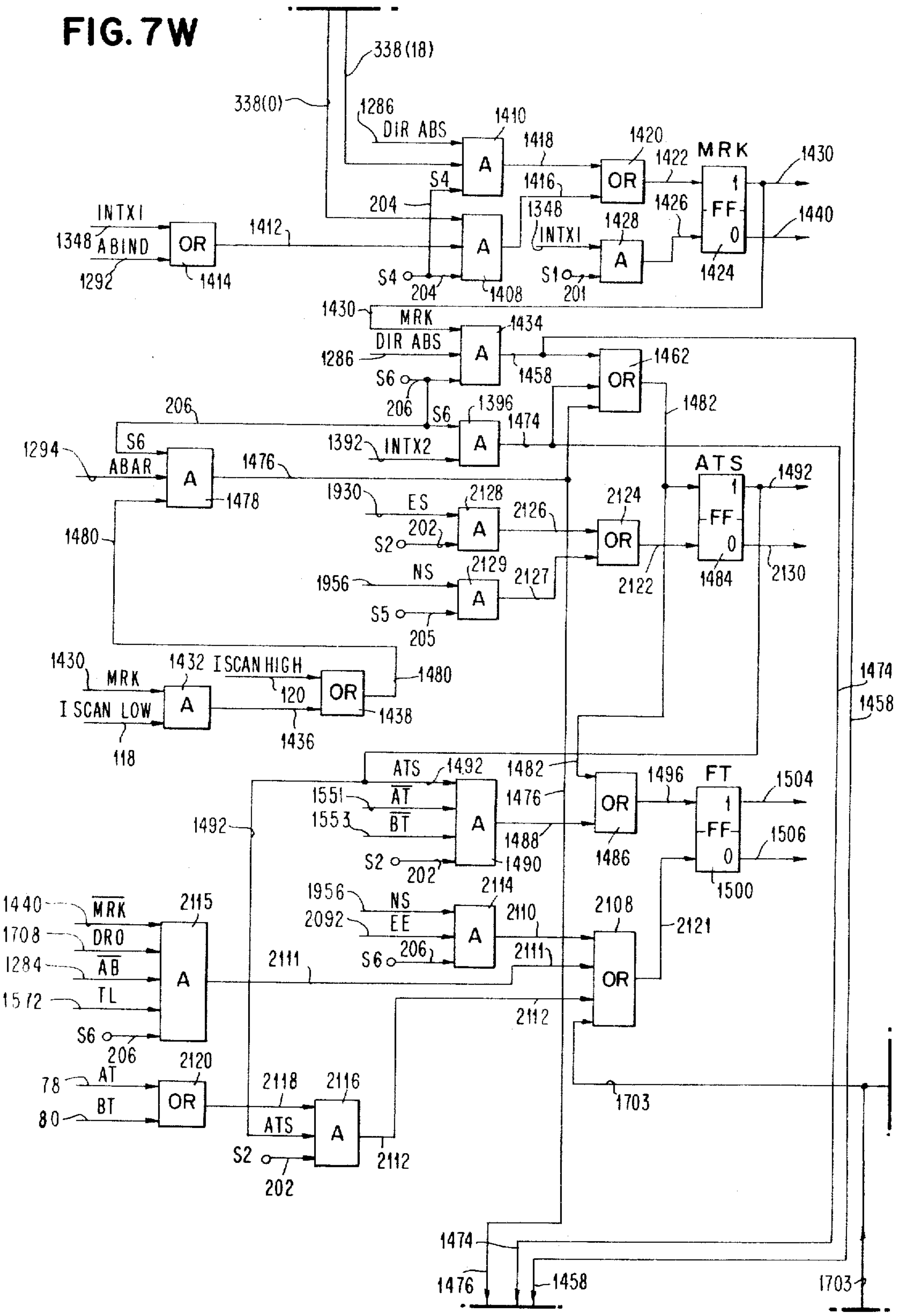
Figure 7X:
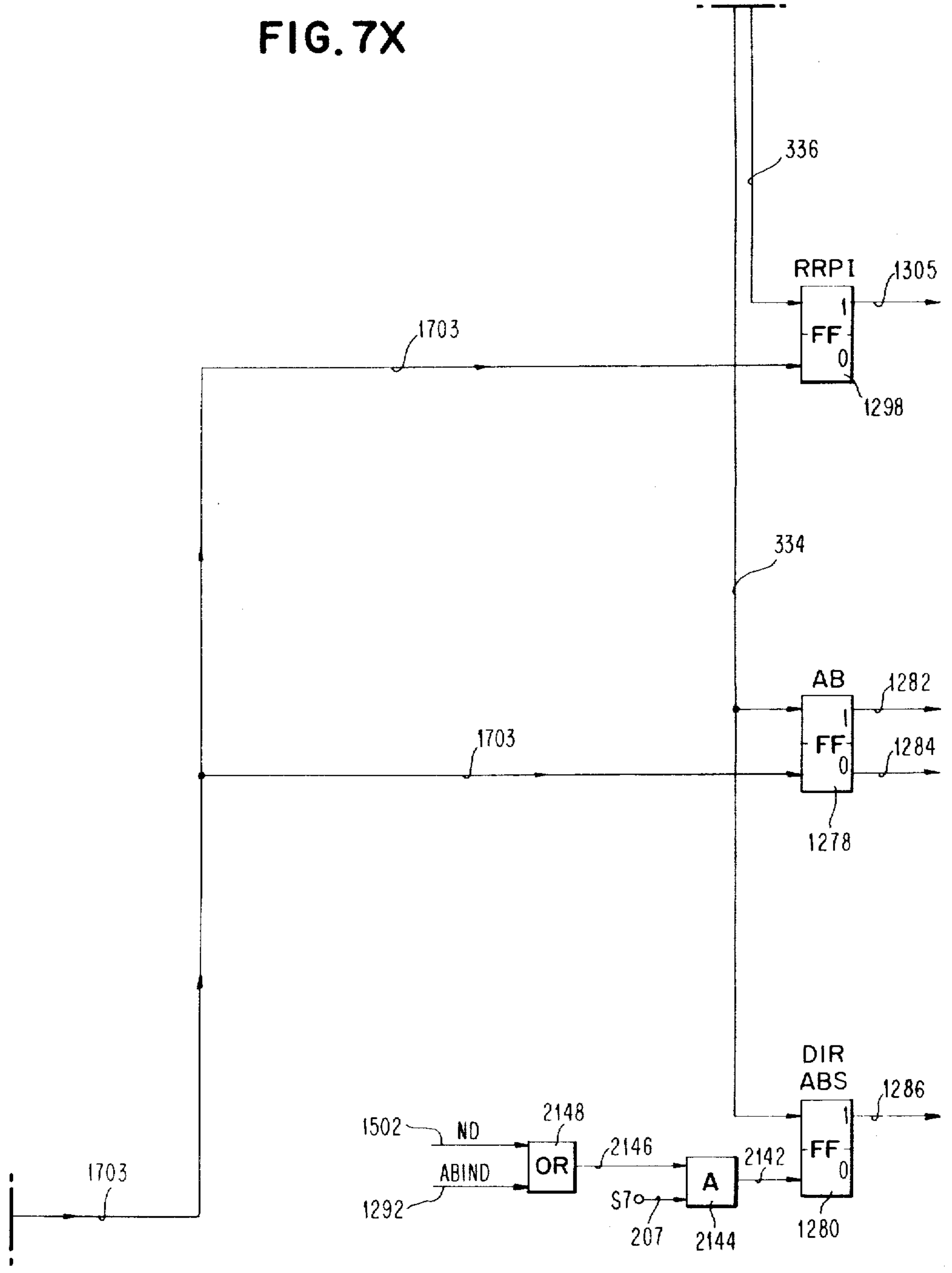

Referring now to FIG. 7W, it is seen that the 0 and the eighteenth of the lines 338 are connected as inputs to AND gates 1408 and 1410 respectively. A second input to AND gates 1408 and 1410 is S4 line 204. The final input to AND gate 1408 is output line 1412 from OR gate 1414 and the final input to AND gate 1410 is output line 1286 from the 1 side of DIRABS trigger 1280 (FIG. 7X). Output lines 1416 and 1418 from AND gates 1408 and 1410 respectively are connected as the inputs to OR gate 1420. Output line 1422 from OR gate 1420 is connected to the 1 side input of MARK trigger 1424. Output line 1426 from AND gate 1428 is connected to the 0 side input of trigger 1424. One input to AND gate 1428 is S1 line 201.

Output line 1430 from the 1 side of MARK trigger 1424 is connected, among other places, as one input to AND gates 1432 and 1434. Output line 1436 from AND gate 1432 is connected as one input to OR gate 1438.

Output line 1440 from the 0 side of MARK trigger 1424 is connected, among other places, as one input to AND gate 1442 (FIG. 7EE), the other input to this AND gate being output line 1444 from OR gate 1446. One input to OR gate 1446 is output line 1448 from AND gate 1450. The other input to OR gate 1446 is output line 1452 from AND gate 1454. One input to AND gates 1450 and 1454 is S6 line 206. Output line 1456 from AND gate 1442 is connected to the 1 side input of ABIND trigger 1288.

Another input to AND gate 1434 (FIG. 7W) is S6 line 206. Output line 1458 from AND gate 1434 is connected as one input to OR gates 1460 (FIG. 7EE), 1462 (FIG. 7W), and 1464 (FIG. 7DD). The other input to OR gate 1460 is output line 1466 from AND gate 1468. An input to AND gate 1468 is S7 line 207. Output line 1470 from OR gate 1460 is connected to the 0 side input of ABIND trigger 1288.

The other inputs to OR gate 1462 (FIG. 7W) is output line 1474 from beforementioned AND gate 1396 and output line 1476 from AND gate 1478. Two inputs to AND gate 1478 are S6 line 206 and output line 1480 from beforementioned OR gate 1438. Lines 1474 and 1476 are also connected as the other inputs to OR gate 1464 (FIG. 7DD). Output line 1482 from OR gate 1462 is connected to the 1 side input of ATS trigger 1484 and as one input to OR gate 1486. The other input to OR gate 1486 is output line 1488 from AND gate 1490. Two of the inputs to AND gate 1490 are S2 line 202 and output line 1492 from the 1 side of ATS trigger 1484. Output line 1494 from OR gate 1464 and 1496 from OR gate 1486 are connected as the inputs to the 1 side of no drum (ND) trigger 1498 and fountain track (FT) trigger 1500 respectively. The output line from the ON side of the ND trigger is line 1502 and the output line from the ON side of FT trigger 1500 is line 1504. The output line from the 0 side of the FT trigger is line 1506. MARK trigger 1424 indicates that there is no suitable entry on the drum and the ATS, FT, and ND triggers are used during a photostore search.

Referring now to FIG. 7T, it is seen that the advance-track line 78 for photostore disc 66 is in fact the output line from the 1 side of advance track (AT) trigger 1510. Back-track line 80 for photostore disc 66 is in fact the output line from the 1 side of back-track (BT) trigger 1512. The inputs to the 1 side of AT trigger 1510 and BT trigger 1512 are output line 1514 from OR gate 1516 and output line 1518 from OR gate 1520 respectively. The inputs to OR gate 1516 are output lines 1518 and 1519 from AND gates 1520 and 1521 respectively. The inputs to OR gate 1520 are output lines 1524 and 1525 from AND gates 1526 and 1527 respectively. One input to AND gates 1520, 1521, 1526, and 1527 is S1 line 201.

The inputs to the 0 side of the AT and BT triggers are output lines 1530 and 1532 from AND gates 1534 and 1536 respectively. One input to AND gate 1534 and 1536 is S7 line 207. The other input to these two AND gates is line 1538. Line 1538 is referred to as the ECHO line. Output line 1540 from the stable side of single-shot trigger 1542 (FIG. 7V) is applied through capacitor 1544 and positively biased diode 1546 to form the ECHO line 1538. Single-shot 1542 is switched to its unstable side by a signal applied to output line 1548 from OR gate 1550. The inputs to OR gate 1550 are output lines 78 and 80 from advance-track and back-track triggers 1510 and 1512 respectively. Line 1548 is also connected as the second input to AND gate 1128 (FIG. 7I). Back-track line 80 is connected as the complement input to true-complement circuit 1120. The output lines from the 0 side of AT trigger 1510 and BT trigger 1512 are lines 1551 and 1553 respectively.

Five other triggers are involved in the advance-track and back-track operation. These triggers are track-high (TH) trigger 1554 (FIG. 7Y), track-low (TL) trigger 1556, double-check (DC) trigger 1588 (FIG. 7AA), back direction (BD) trigger 1560 (FIG. 7Z), and advance direction (AD) trigger 1562. Output line 1564 from the 1 side of TH trigger 1554 (FIG. 7Y) is connected, among other places, as one input to AND gate 1566 (FIG. 7Z). Another input to AND gate 1566 is S1 line 201. Output line 1568 from AND gate 1566 is connected to the 1 side input of BD trigger 1560. The output line from the 0 side of TH trigger 1554 is line 1570.

Output line 1572 from the 1 side of TL trigger 1556 is connected, among other places, as one input to AND gate 1574 (FIG. 7Z). The other input to AND gate 1574 is S2 line 202. Output line 1578 from AND gate 1574 is connected as one input to AND gate 1580, the other input to this AND gate being output line 1582 from OR gate 1584. Output line 1586 from AND gate 1580 is connected to the 0 side input of back direction trigger 1560.

The output line from the 0 side of TL trigger 1556 is line 1588. The output line from the 1 side of BD trigger 1560 and AD 1562 is lines 1590 and 1592 respectively. The output line from the ON side of DC trigger 1558 is line 1594 and the output from the OFF side of this trigger is line 1595. The input to the 1 side of DC trigger 1558 is output line 1596 from OR gate 1598. The inputs to OR gate 1598 are lines 1600 and 1601 from AND gates 1602 and 1603 respectively. One input to AND gates 1602 and 1603 is S3 line 203. The input to the 0 side of DC trigger 1558 is output line 1604 from AND gate 1606. The inputs to AND gate 1606 are S2 line 202 and output line 1608 from OR gate 1610.

The input to the 1 side of advance direction trigger 1562 (FIG. 7Z) is output line 1614 from OR gate 1616. The inputs to OR gate 1616 are output line 1618 from AND gate 1620 and output line 1622 from AND gate 1624. One input to AND gate 1620 is S2 line 202 and one input to AND gate 1624 is S1 line 201. The input to the OFF side of AD trigger 1562 is output line 1626 from AND gate 1628. One input to AND gate 1628 is S2 line 202, and the second input to this AND gate is output line 1630 from OR gate 1632.

The input to the 1 side of TH trigger 1554 (FIG. 7Y) is output line 1634 from OR gate 1636. The inputs to OR gate 1636 are output lines 1638–1641 from AND gates 1644–1647 respectively. One input to AND gate 1645 is output line 1642 from inverter 1643. The input to the 0 side of TH trigger 1554 is output line 1649 from AND gate 1651. The inputs to AND gate 1651 are S4 line 204 and output line 1657 from OR gate 1659.

The input to the 1 side of TL trigger 1556 is output line 1654 from OR gate 1656. The inputs to OR gate 1656 are output lines 1657–1660 from AND gates 1661–1664. Two inputs to AND gate 1663 are S5 line 205 and output line 1665 from OR gate 1667. An input to OR gate 1667 is output line 1669 from AND gate 1671. An input to AND gate 1671 is output line 1673 from inverter 1675. Two inputs to AND gate 1661 are S5 line 205 and output line 1635 from OR gate 1677. One input to OR gate 1677 is output line 1678 from AND gate 1679. Two inputs to AND gate 1679 are output lines 1681 and 1685 from inverters 1683 and 1687 respectively. The input to the 0 side of TL trigger 1556 is output line 1666 from AND gate 1668. One input to AND gate 1668 is S4 line 204, and the second input to this AND gate is output line 1670 from OR gate 1672. One input to OR gate 1672 is output line 1674 from AND gate 1676.

Figure 7Y:
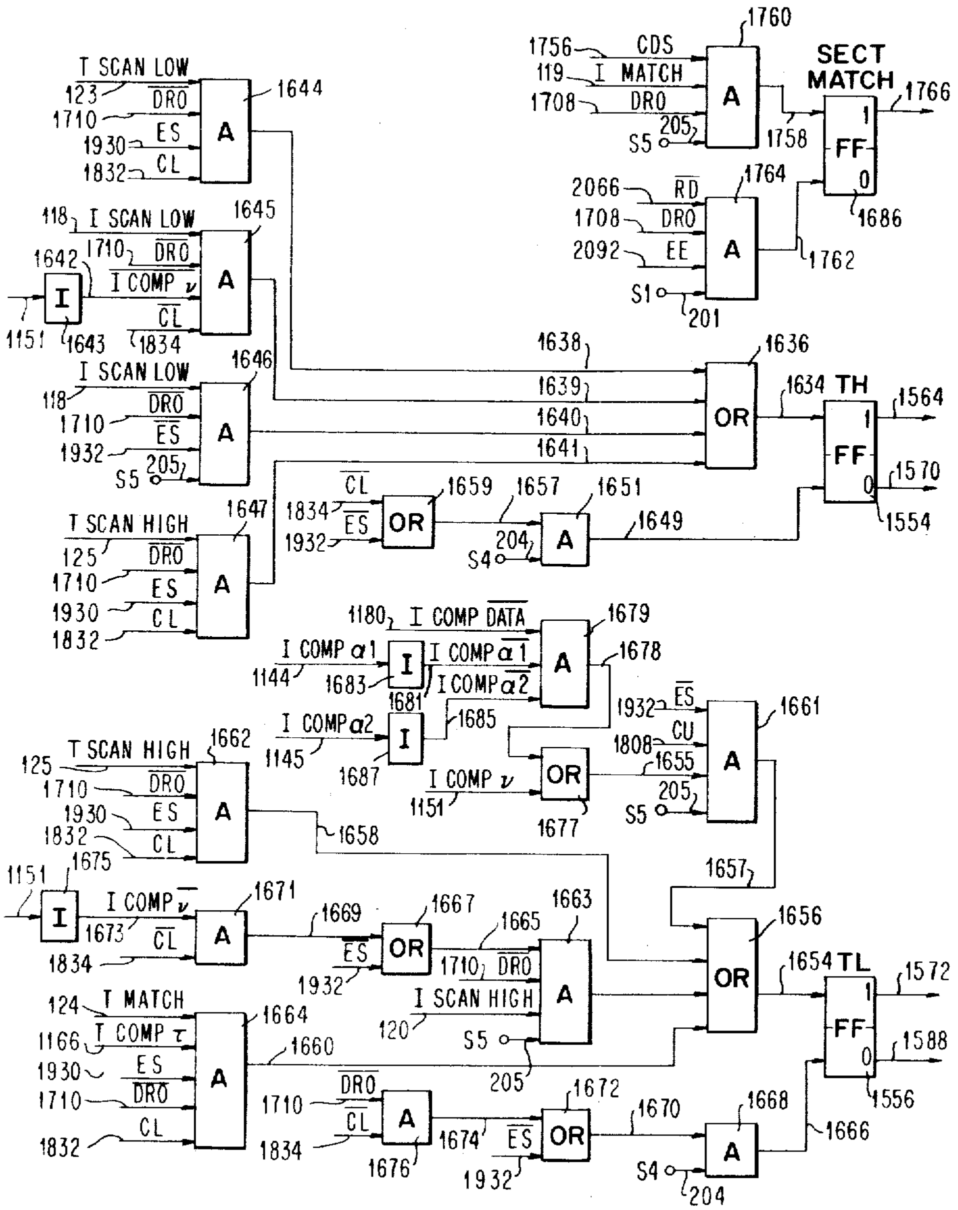
Figure 7Z:
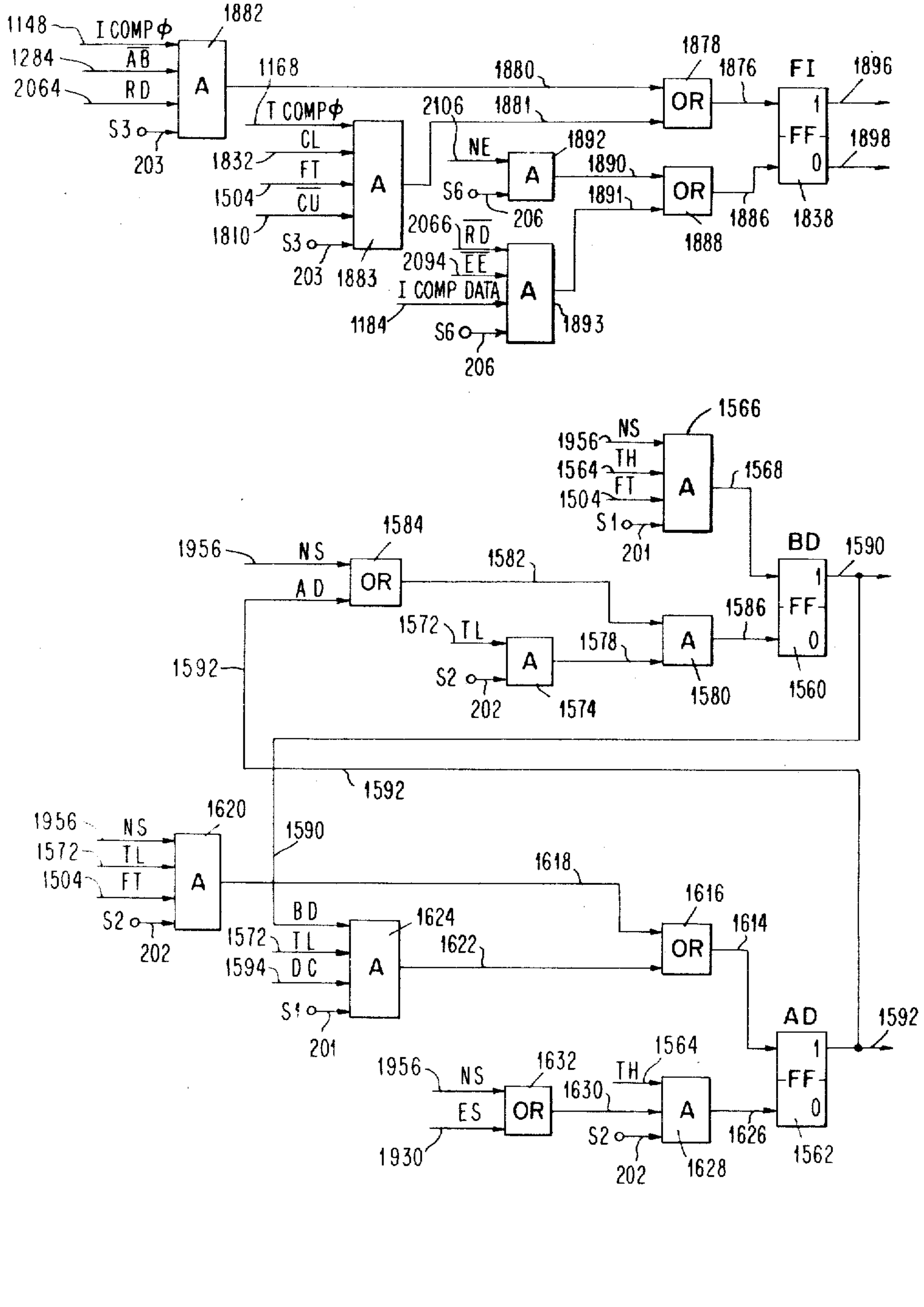
Figure 7A:
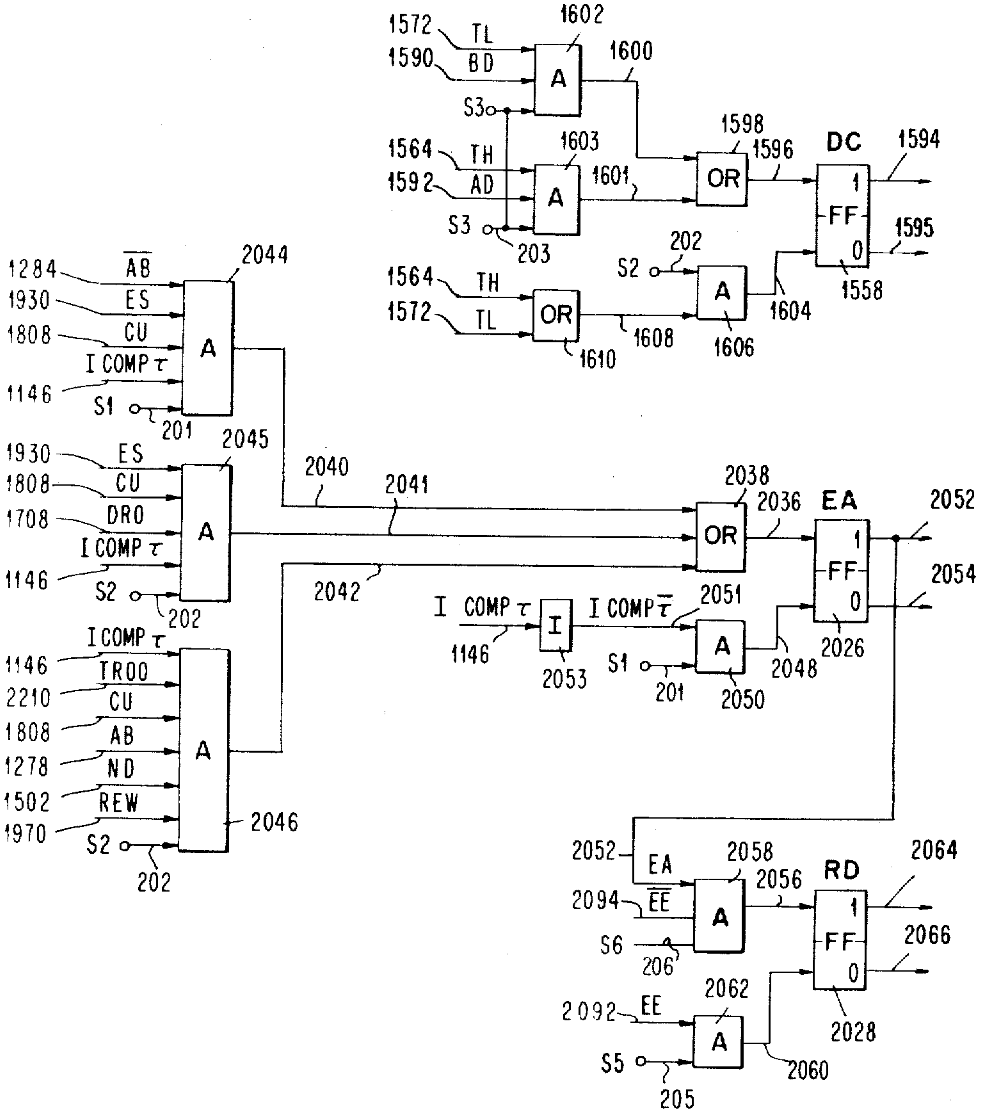
Figure 7B:
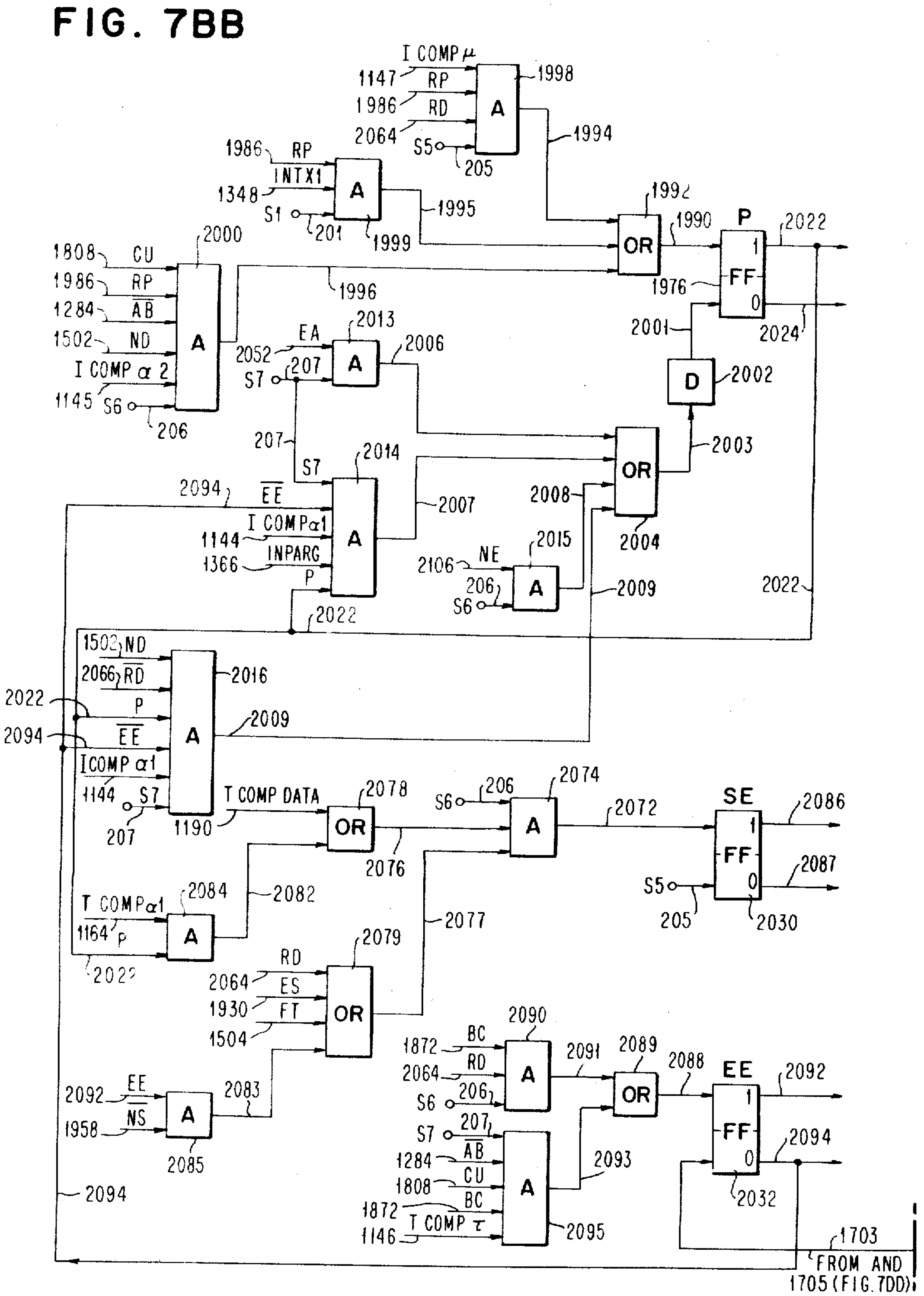
Figure 7C:
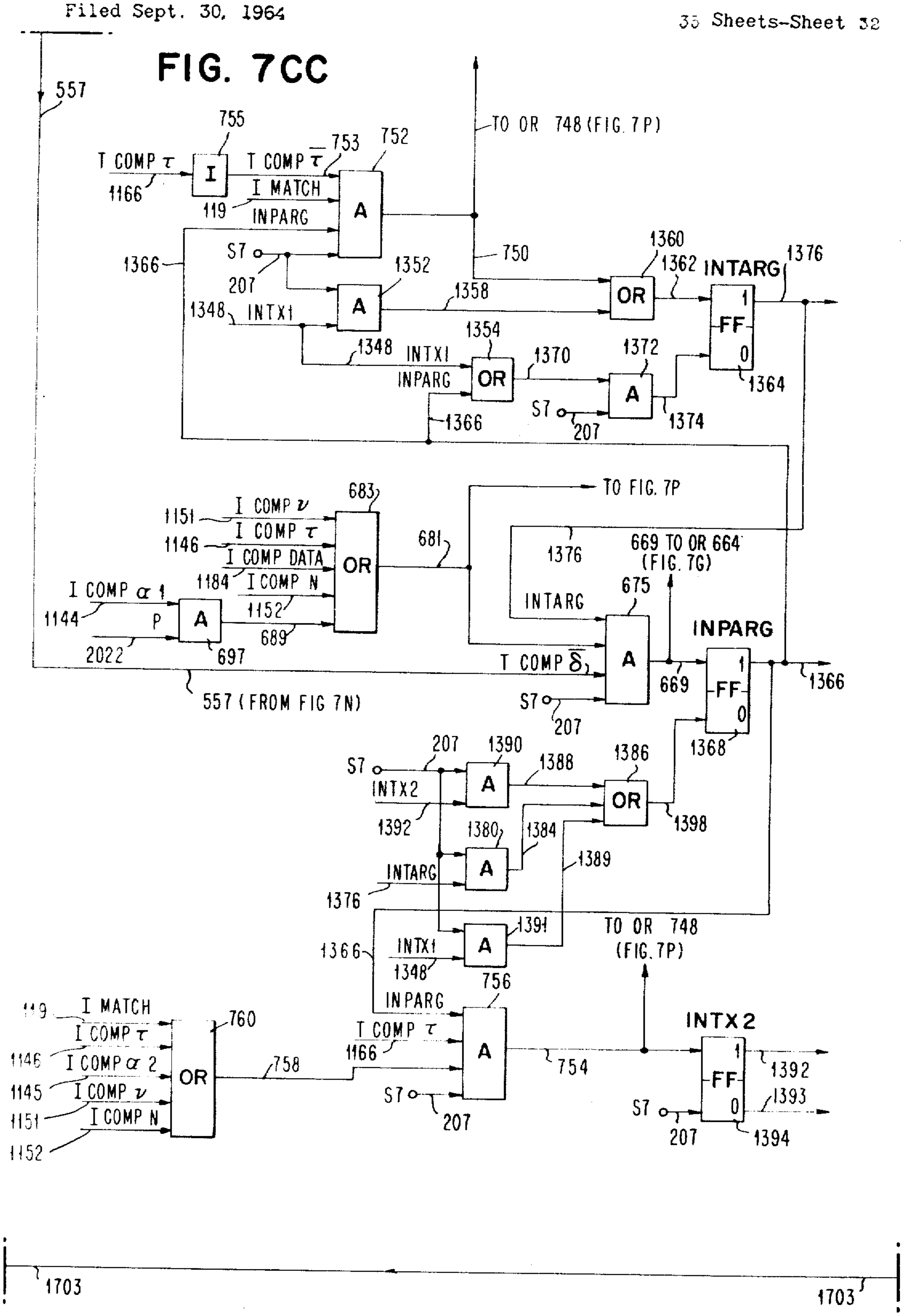
Figure 7D:
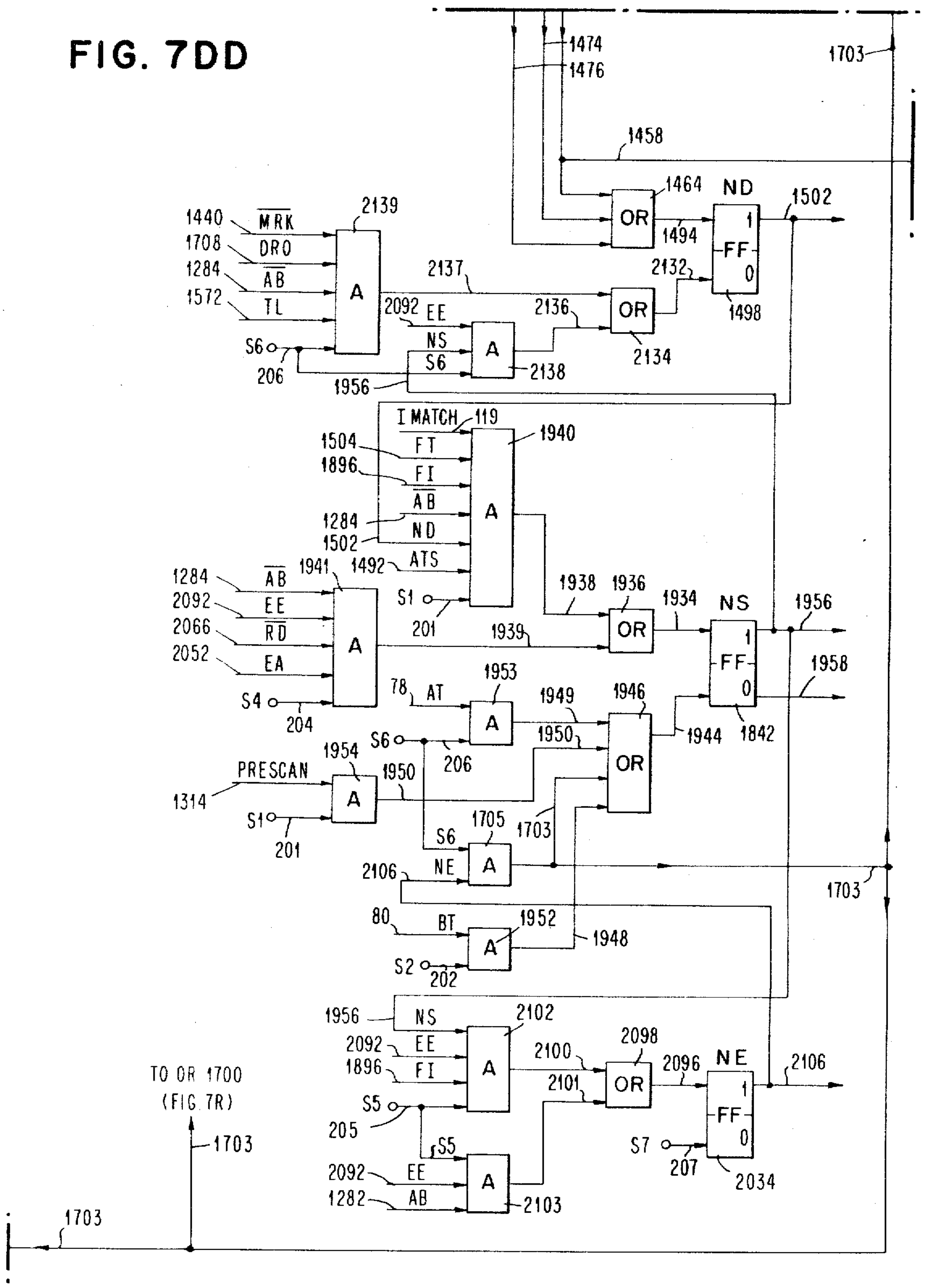
Figure 7E:
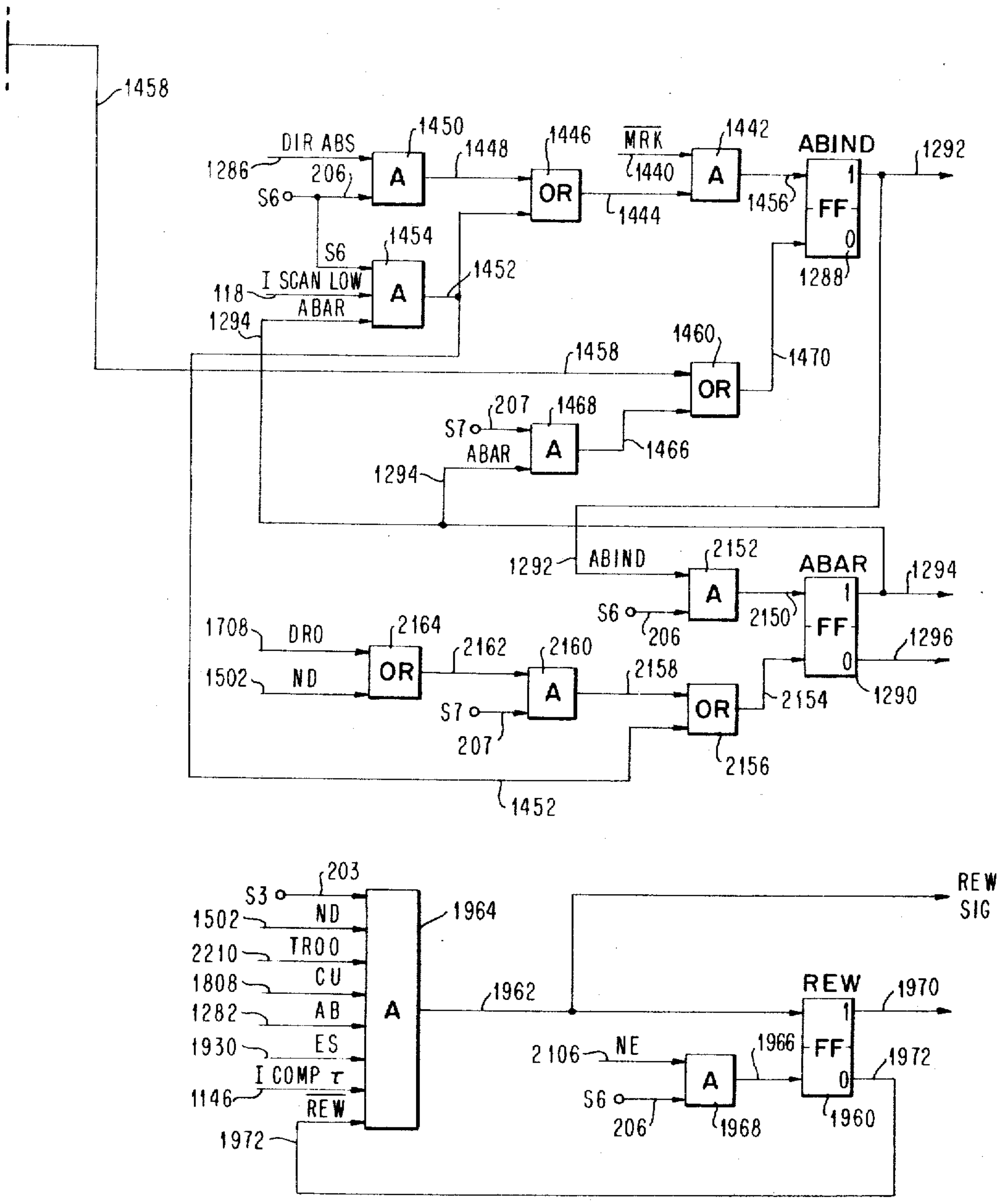

Four triggers which are used during a drum search and drum read-out operation are (DRO) trigger 1680 (FIG. 7R), sector search (SS) trigger 1682, compare drum sector (CDS) trigger 1684, and sector match (SECT MATCH) trigger 1686 (FIG. 7Y). The input to the 1 side of DRO trigger 1680 is output line 1688 from OR gate 1690. The inputs to OR gate 1690 are output lines 1692 and 1693 from AND gates 1694 and 1695 respectively. One input to AND gate 1694 is S3 line 203 and one input to AND gate 1695 is S6 line 206. The input to the 0 side of the DRO trigger 1680 is output line 1698 from OR gate 1700. The inputs to OR gate 1700 are output lines 1702 and 1703 from AND gates 1704 and 1705 (FIG. 7DD) respectively. One input to AND gates 1704 and 1705 is S6 line 206. Line 1708 is the output line from the 1 side of DRO trigger 1680 and line 1710 is the output line from the 0 side of this trigger.

The input to the 1 side of SS trigger 1682 is output line 1712 from OR gate 1714. The inputs to OR gate 1714 are output lines 1716–1720 from AND gates 1721–1725 respectively and beforementioned output line 1693 from AND gate 1695. One input to AND gate 1721 is S3 line 203. One input to AND gates 1722–1725 is S6 line 206. The input to the 0 side of SS trigger 1682 is output line 1732 from OR gate 1734. The inputs to OR gate 1734 are output lines 1736 and 1737 from AND gates 1738 and 1739 respectively. One input to AND gate 1738 is S1 line 201 and one input to AND gate 1739 is S6 line 206. The output from the 1 side of SS trigger 1682 is line 1742 and the output from the 0 side of this trigger is line 1743.

The input to the 1 side of CDS trigger 1684 is output line 1744 from OR gate 1746. The inputs to OR gate 1746 are output lines 1747 and 1748 from AND gates 1749 and 1750 respectively. One input to AND gates 1749 and 1750 is S1 line 201. The input to the 0 side of CDS trigger 1684 is output line 1752 from AND gate 1754. One input to AND gate 1754 is S5 line 205. The output from the 1 side of CDS trigger 1684 is line 1756.

The input to the 1 side of sector match trigger 1686 is output line 1758 from AND gate 1760 and the input to the 0 side of this trigger is output line 1762 from AND gate 1764. One input to AND gate 1760 is S5 line 205, and one input to AND gate 1764 is S1 line 201. The output from the 1 side of sector match trigger 1686 is line 1766.

Two triggers which are used to control the compare operation are compare upper (CU) trigger 1770 (FIG. 7S) and compare lower (CL) trigger 1772. The input to the 1 side of CU trigger 1770 is output line 1774 from AND gate 1776. Two inputs to AND gate 1776 are S5 line 205 and output line 1778 from OR gate 1780. Two inputs to OR gate 1780 are output lines 1782 and 1783 from AND gates 1784 and 1785 respectively. The input to the 0 side of CU trigger 1770 is output line 1786 from OR gate 1788. Five inputs to OR gate 1788 are output lines 1790–1794 from AND gates 1796–1800 respectively. S3 line 203 is an input to AND gates 1796 and 1799, S6 line 206 is an input to AND gates 1797 and 1800, and S1 line 201 an input to AND gate 1798. Two additional inputs to AND gate 1797 are output lines 1802 and 1803 from OR gates 1804 and 1805 respectively. The output from the 1 side of CU trigger 1770 is line 1808, and the output from the 0 side of this trigger is line 1810.

The input to the 1 side of CL trigger 1772 is output line 1812 from AND gate 1814. One input to AND gate 1814 is S4 line 204. The input to the 0 side of CL trigger 1772 is output line 1816 from OR gate 1818. The inputs to OR gates 1818 are output lines 1820–1824 from AND gates 1826–1830 respectively. One input to AND gates 1826–1830 is S0 line 200. The output from the 1 side of CL trigger 1772 is line 1832 and the output from the 0 side of this trigger is line 1834.

Three additional triggers which are used during search operations are begin character (BC) trigger 1836 (FIG. 7S) $\phi$ trigger (FI) 1838 (FIG. 7Z), entry search (ES) trigger 1840 (FIG. 7T), and new search (NS) trigger 1842 (FIG. 7DD). The input to the 1 side of BC trigger 1836 (FIG. 7J) is output line 1844 from OR gate 1846. The inputs to OR gate 1846 are output lines 1848 and 1849 from AND gates 1850 and 1851 respectively. One input to AND gates 1850 and 1851 is S5 line 205. A second input to AND gate 1851 is output line 1854 from OR gate 1856. The input to the 0 side of the BC trigger 1836 is output line 1858 from OR gate 1860. The inputs to OR gate 1860 are output lines 1862–1865 from AND gates 1867–1870 respectively. S1 line 201 is an input to AND gates 1867 and 1869, while S3 line 203 is an input to AND gate 1868 and S6 line 206 is an input to AND gate 1870. The output line from the 1 side of BC trigger 1836 is line 1872 and the output from the 0 side of this trigger is line 1874.

The input to the 1 side of $\phi$ trigger (FI) 1838 (FIG. 7Z) is output line 1876 from OR gate 1878. The inputs to OR gate 1878 are output lines 1880 and 1881 from AND gates 1882 and 1883 respectively. One input to AND gates 1882 and 1883 is S3 line 203. The input to the 0 side of FI trigger 1838 is output line 1886 from OR gate 1888. The inputs to OR gate 1888 are output lines 1890 and 1891 from AND gates 1892 and 1893 respectively. One input to AND gates 1892 and 1893 is S6 line 206. The output from the 1 side of FI trigger 1838 is line 1896 and the output from the 0 side of this trigger is line 1898.

The input to the 1 side of ES trigger 1840 (FIG. 7T) is output line 1900 from OR gate 1902. The inputs to OR gate 1902 are output lines 1904–1906 from AND gates 1908–1910 respectively. One input to AND gates 1908–1910 is S1 line 201. The input to the 0 side of ES trigger 1840 is output line 1914 from OR gate 1916. The inputs to OR gate 1916 are output lines 1918–1921 from AND gates 1924–1927. S6 line 206 is one input to AND gates 1924 and 1927 while S5 line 205 is an input to AND gate 1925 and S2 line 202 is an input to AND gate 1926. The output from the 1 side of ES trigger 1840 is line 1930 and the output from the 0 side of this trigger is line 1932.

The input to the 1 side of NS trigger 1842 (FIG. 7DD) is output line 1934 from OR gate 1936. The inputs to OR gate 1936 are output lines 1938 and 1939 from AND gates 1940 and 1941 respectively. S1 line 201 is an input to AND gate 1940 and S4 line 204 is an input to AND gate 1941. The input to the 0 side of NS trigger 1842 is output line 1944 from OR gate 1946. The inputs to OR gate 1946 are output lines 1948–1950 from AND gates 1952–1954 and the beforementioned output lines 1703 from AND gate 1705. One input to AND gate 1952 is S2 line 202, one input to AND gate 1953 is S6 line 206, and one input to AND gate 1954 is S1 line 201. The output from the 1 side of NS trigger 1842 is line 1956 and the output from the 0 side of this trigger is line 1958.

The trigger involved in the early-warning cycle is remember-early warning (REW) trigger 1960 (FIG. 7EE). The input to the 1 side of this trigger is output line 1962 from AND gate 1964 and the input to the 0 side of this trigger is output line 1966 from AND gate 1968. Line 1962 is also applied to the CPU (not shown) to inform this unit that it has a fixed period of time to get out of buffer 10. One input to AND gate 1964 is S3 line 203 and one input to AND gate 1968 is S6 line 206. The output from the 1 side of REW trigger 1960 is line 1970 and the output from the 0 side of this trigger is line 1972.

Two triggers, read prefix (RP) trigger 1974 (FIG. 7V) and prefix (P) trigger 1976 (FIG. 7BB), are involved in a prefix search. The input to the 1 side of the RP trigger 1974 is output line 1978 from AND gate 1980 and the input to the 0 side of this trigger is output line 1982 from AND gate 1984. One input to AND gate 1980 is S1 line 201 and one input to AND gate 1984 is S2 line 202. The output from the 1 side of RP trigger 1974 is line 1986 and the output from the 0 side of this trigger is line 1988.

The input to the 1 side of P trigger 1976 is output line 1990 from OR gate 1992. The inputs to OR gate 1992 are output lines 1994–1996 from AND gates 1998–2000 respectively. S5 line 205 is one input to AND gate 1998, S1 line 201 is one input to AND gate 1999, and S6 line 206 is one input to AND gate 2000. The input to the 0 side of P trigger 1976 is output line 2001 from one-time-unit delay. The input to delay 2002 is output line 2003 from OR gate 2004. The inputs to OR gate 2004 are output lines 2006–2009 from AND gates 2013–2016 respectively. One input to AND gates 2013, 2014, and 2016 is S7 line 207 and one input to AND gate 2015 is S6 line 206. The output from the 1 side of P trigger 1976 is line 2022 and the output from the 0 side of this trigger is line 2024.

Five triggers are involved in the read-out and end-of-operation operations. They are end argument (EA) trigger 2026 (FIG. 7AA), read (RD) trigger 2028, store enable (SE) trigger 2030 (FIG. 7BB), end entry (EE) trigger 2032, and normal end (NE) trigger 2034 (FIG. 7DD). The input to the 1 side of EA trigger 2026 (FIG. 7AA) is output line 2036 from OR gate 2038. The inputs to OR gate 2038 are lines 2040–2042 from AND gates 2044–2046 respectively. One input to AND gate 2044 is S1 line 201 and one input to AND gates 2045 and 2046 is S2 line 202. The input to the 0 side of EA trigger 2026 is output line 2048 from AND gate 2050. The inputs to AND gate 2050 are S1 line 201 and output line 2051 from inverter 2053. The output from the 1 side of EA trigger 2026 is line 2052 and the output from the 0 side of this trigger is line 2054.

The input to the 1 side of RD trigger 2028 is ouput line 2056 from AND gate 2058, and the input to the 0 side of this trigger is output line 2060 from AND gate 2062. One input to AND gate 2058 is S6 line 206 and one input to AND gate 2062 is S5 line 205. The output from the 1 side of RD trigger 2028 is line 2064, and the output from the 0 side of this trigger is line 2066.

The input to the 1 side of SE trigger 2030 is output line 2072 from AND gate 2074, and the input to the 0 side of this trigger is S5 line 205. The inputs to AND gate 2074 are S6 line 206 and output lines 2076 and 2077 from OR gates 2078 and 2079 respectively. One input to OR gate 2078 is output line 2082 from AND gate 2084 and one input to OR gate 2079 is output line 2083 from AND gate 2085. The output from the 1 side of SE trigger 2030 is line 2086 and the output from the 0 side of this trigger is line 2087.

The input to the 1 side of EE trigger 2032 is output line 2088 from OR gate 2089 and the input to the 0 side of this trigger is beforementioned output line 1703 from AND gate 1705 (FIG. 7DD). The inputs to OR gate 2089 are output lines 2091 from AND gate 2090 and output line 2093 from AND gate 2095. One input to AND gate 2090 is S6 line 206 and one input to AND gate 2095 is S7 line 207. The output from the 1 side of EE trigger 2032 is line 2092 and the output from the 0 side of this trigger is line 2094.

The input to the 1 side of NE trigger 2034 (FIG. 7DD) is output line 2096 from OR gate 2098 and the input to the 0 side of this trigger is S7 line 207. The inputs to OR gate 2098 are output lines 2100 and 2101 from AND gates 2102 and 2103 respectively. One input to AND gates 2102 and 2103 is S5 line 205. The output from the 1 side of NE trigger 2034 is line 2106 which line is connected, among other places, as the other input to beforementioned AND gate 1705.

Output line 1703 from AND gate 1705 is also connected to the 0 side input of RRPI trigger 1298 (FIG. 7X) and AB trigger 1278, and as one input to OR gate 2108 (FIG. 7W). The other inputs to OR gate 2108 are output lines 2110–2112 from AND gates 2114–2116 respectively. One input to AND gates 2114 and 2115 is S6 line 206. Two inputs to AND gate 2115 are S2 line 202 and output line 2118 from OR gate 2120. Output line 2121 from OR gate 2108 is the input to the 0 side of FT trigger 1500.

The input to the OFF side of ATS trigger 1484 is output line 2122 from OR gate 2124. The inputs to OR gate 2124 are output lines 2126 and 2127 from AND gates 2128 and 2129 respectively. One input to AND gate 2128 is S2 line 202 and one input to AND gate 2129 is S5 line 205. The output from the 0 side of the ATS trigger is line 2130. The input to the 0 side of ND trigger 1498 is output line 2132 from OR gate 2134. The inputs to OR gate 2134 are lines 2136 and 2137 from AND gates 2138 and 2139 respectively. One input to AND gates 2138 and 2139 is S6 line 206.

The input to the 0 side of DIRABS trigger 1280 (FIG. 7X) is output line 2142 from AND gate 2144.

The inputs to AND gate 2144 are S7 line 207 and output line 2146 from OR gate 2148. The input to the 1 side of ABAR trigger 1290 (FIG. 7EE) is output line 2150 from AND gate 2152. The inputs to AND gate 2152 are S6 line 206 and output line 1292 from the 1 side of ABIND trigger 1288. The input to the 0 side of ABAR trigger 1290 is output line 2154 from OR gate 2156. The inputs to OR gate 2156 are beforementioned output line 1452 from AND gate 1454 and output line 2158 from AND gate 2160. The inputs to AND gate 2160 are S7 line 207 and output line 2162 from OR gate 2164.

Referring now to FIG. 7V, it is seen that the circuit also includes a byte counter designated TR counter 2170. Counter 2170 is used to determine whether a track or a record designation is being compared on at any given time. The reset input to counter 2170 is output line 2172 from OR gate 2174. The inputs to OR gate 2174 are output lines 2176 and 2177 from AND gates 2178 and 2179 respectively. One input to AND gate 2178 is S0 line 200 and one input to AND gate 2179 is S1 line 201. The increment (or step) input to counter 2170 is output line 2182 from OR gate 2184. The inputs to OR gate 2184 are output lines 2186–2189 from AND gates 2192–2195 respectively. One input to AND gate 2192 is S4 line 204, to AND gate 2193 is S1 line 201, to AND gate 2194 is S6 line 206, and to AND gate 2195 is S0 line 200. Counter 2170 has two stages which apply output signals through lines 2198 and 2199 respectively to decoder 2202. Decoder 2202 generates an output signal on line 2204–2210 when both stages of counter 2170 are set to 0, on line 2211 when the first stage is set to 1 and the second stage to 0 and on line 2212 when the first stage is set to 0 and the second stage to 1. When a step signal is applied through line 2182 to counter 2170 when the counter is set to generate an output signal on line 2212, the counter is effectively reset.

DETAILED DESCRIPTION OF OPERATION

*Absolute search*

Assume an initial condition with all triggers in their 0 state, all registers reset to the special character $\epsilon$, clock 199 (FIG. 7E) generating an output signal on S7 line 207 and TR counter 2170 (FIG. 7B) reset so as to cause decoder 2202 to generate an output signal on line 2210.

From FIG. 2, it can be seen that the first step of the read absolute (RRPA) operation is to load the RRPA instruction. From FIG. 4D, it can be seen that when an RRPA instruction is applied to the system, there is a bit applied to RRPA line 334, bits are applied to lines 0 through 12 of input bus 26 which are to be stored in function index register (FIR) 36 and bits are applied to lines 13–23 of input bus 26 which are to be stored in photostore address register (PAR) 38. The address stored in FIR is the address in output region 15 of memory 10 at which the first word of the function is to be stored and the address read into PAR38 is the photostore address at which the desired data unit is stored.

The signal applied to RRPA line 334 is applied through OR gate 332 (FIG. 7Q) and line 330 to condition gate 328 to apply the input bits applied to data channel 26 through lines 326, and OR gates 302, to bus 338. The signals on lines 0–12 of the bus 338 are applied to gate 344 (FIG. 7N) which is conditioned at this time by the signal on line 330 to pass the function address through lines 378 to FIR36. The signal on line 334 conditions gate 348 (FIG. 7L) to pass the track and record address on lines 13–23 of the bus 338 through lines 392 to PAR38. Finally, the signal on line 334 is applied to the 1 side input of AB trigger 1278 (FIG. 7X) and DIRABS trigger 1280 to set these two triggers to their 1 state. The output signal on line 1286 from DIRABS trigger 1280 is applied through OR gate 224 (FIG. 7E) and line 222 to fully condition AND gate 220 to generate an output signal on line 218 which is applied through OR gate 212 to restart clock 199.

The above described preliminary steps having been completed, the circuit is conditioned to begin a directory search. At this time, the track identifying byte stored in PAR38 is applied through six of the lines 876 to the information input of gate 874 (FIG. 7F). The DIRABS trigger being in its ON state at this time, a signal appears on line 1286, partially conditioning AND gate 885. Clock 199 initially being set to generate an output signal on S7 line 207, fully conditions AND gate 885 to generate an output signal on line 882 which is applied through OR gate 880 and line 878 to condition gate 874 to pass the track address byte on line 876 through lines 872, OR gates 682 (FIG. 7P), and lines 896 to the conditioning input of accumulator 236. When clock 199 is restarted, the signal on S7 line 207 terminates and a signal appears on S0 line 200 causing, for reasons previously indicated, the track address applied to the accumulator to be stored therein. The byte stored in accumulator 236 is passed through lines 238 to the information input of gate 240. The signal on DIRABS output line 1286 is applied through OR gate 270 (FIG. 7H) and line 268 to fully condition AND gate 257 at this time, causing an output signal on line 251 which is applied through OR gate 248 to memory select line 246 to condition gate 240 (FIG. 7P) to pass the track address on lines 238 through lines 242 to MAR20. The storing of this address in MAR20 causes a signal to be applied through lines 234 to energize the appropriate driver 232 to cause the contents of the address in directory 12 which is the same as the track address to be read out through lines 272 to MDR24. It will be remembered that the first sixty-four address positions in memory 10, this being the total number of addresses which can be represented by 6 binary bits, contain the directory. Therefore, there will always be a directory address corresponding to the 6-bit track address. The contents of MDR24 are applied through lines 296 to energize inhibit drive circuits 318 to cause the directory word to be rewritten in memory 10 during the write portion of the read-write cycles of drive 232. Unless otherwise indicated, it will be assumed that in subsequent discussion, whenever a word is read out of memory 10, it is rewritten on the write portion of the cycle. The contents of MDR are also applied through lines 296 and OR gate 302 (FIG. 7Q) to bus 338. Line 18 of the lines 338 is applied as one input to AND gate 1410 (FIG. 7W). From FIG. 4A and previous discussion, it will be remembered that if there is a bit on this line at this time, it means that there are no entries for this photostore track on drum 68 and that the system should proceed directly to a photostore search. If there is a bit on line 18 at this time, gate 1410 is fully conditioned at S4 time to generate an output signal on line 1418 which is applied through OR gate 1420 and line 1422 to switch MARK trigger 1424 to its 1 state. Output line 1430 from MARK trigger 1424 is connected as one input to AND gates 1434 and 1722 (FIG. 7R). If MARK trigger 1424 is switched to its 1 state, at S6 time, AND gates 1722 and 1434 are fully conditioned to generate an output signal on lines 1717 and 1458 respectively which are applied to switch SS trigger 1682, ATS trigger 1484, FT trigger 1500, and ND trigger 1498 to their ON state. As will be seen later, the switching of these three triggers to their ON state causes the circuit to start a photostore track search.

If there is no bit on line 18 then the circuit must proceed to a table search. As preliminary steps to the table search, the absolute table address contained on lines 23–25 of the bus 338 (see FIG. 4A) at this time are applied as the information input to gate 342 (FIG. 7N). At S4 time, AND gate 369 is fully conditioned to generate an output signal on line 368 which conditions gate 342 to pass the absolute table address through lines 377, to TIR32. At S6 time, a signal is applied through line 206 to one input of AND gate 1450 (FIG. 7EE), the other input to this AND gate being output line 1286 from the 1 side of DIRABS trigger 1280. The resulting output signal on line 1448 from AND gate 1450 is applied through OR gate 1446 and line 1444 to one input of AND gate 1442. Since there was no mark on line 18, MARK trigger 1424 is still in its 0 state, causing an output signal on line 1440 which fully conditions AND gate 1442 to generate an output signal on line 1456. The signal on line 1456 is applied to set ABIND trigger 1288 to its ON state. The output signal on line 1292 from the 1 side of the ABIND trigger is applied through OR gate 2148 (FIG. 7X) and line 2146 to 1 input of AND gate 2144. At S7 time, a signal is applied to line 207, fully conditioning AND gate 2144 to apply a signal through line 2142 to reset DIRABS trigger 1280 to its 0 state. The signal on output line 1292 from the 1 side of the ABIND trigger is also applied through OR gate 224 (FIG. 7E) and line 222 to condition AND gate 220 at S7 time to generate an output signal on line 218 which is applied to restart clock 199.

The circuit is now conditioned to start a table search. At the same time that a reset signal is being applied to clock 199, the S7 signal on line 207 and output line 1292 from ABIND trigger 1288 are being applied to fully condition AND gate 826 (FIG. 7N) to generate an output signal on line 818. This signal is applied through OR gate 812 and line 810 to condition gate 808 to pass the table address stored in TIR32 through lines 846, OR gate 682 (FIG. 7P) and lines 896 to accumulator 236. At S0 time, AND gate 257 (FIG. 7H) is fully conditioned to cause a memory select output signal from OR gate 248 which conditions gates 240 to pass the table address in accumulator 236 through lines 242 to MAR20. This results in the contents of the word in the table at the indicated table address being read out through sense lines 272 to MDR24. At S2 time, a signal is applied through line 202 to one input of AND gate 524 (FIG. 7M), the other input to this AND gate being energized by the signal on ABIND output line 1292 being applied through OR gate 528 and line 526. The resulting output signal on line 521 is applied through OR gate 518 to force-six line 516. This causes the numeral 6 to be applied through true complement circuit 494 and lines 492 to one input of adder 490, the other input to the adder being output lines 238 from accumulator 236. The resulting output on line 576 is the address by six byte positions or one word position advanced from the address previously stored in accumulator 236. This is the address at which the second word of the table entry (see FIG. 4B) is stored. At S4 time, a signal is applied to fully condition AND gate 797 (FIG. 7P), causing an output signal on line 793 which is applied through OR gate 790 and line 788 to condition gate 786 (FIG. 7N) to apply the address on lines 576 through lines 804, OR gate 682, and line 896 to accumulator 236.

At the same time, the first word of the table entry stored in MDR24 is being applied through lines 296 and OR gates 302 (FIG. 7Q) to bus 338. The 0 line, the line on which a bit appears if the last table entry for a given track has been reached, is applied as one input to AND gate 1408 (FIG. 7W), a second input to this AND gate being output line 1412 from OR gate 1414 which has a signal applied to it by output line 1492 from the ABIND trigger at this time. If there is a mark in this position, at S4 time, AND gate 1408 is fully conditioned to generate an output signal on line 1416 which is applied through OR gate 1420 to set MARK trigger 1424 to its 1 state. Lines 5–17 of bus 338 are connected as the information inputs to gate 340 (FIG. 7N). At S4 time, this gate is conditioned by the combined occurrence of a signal on line 204 and an output signal on line 372 from OR gate 374, line 1292 from the ABIND trigger being one input to this OR gate. This permits the table address of the next entry in the table to be passed through lines 376 to TIR32. Lines 22–35 of bus 338 are connected as the information inputs to gate 352 (FIG. 7D). At S4 time, the combined occurrence of a signal on line 204 and a signal on output line 402 from OR gate 404, ABIND output line 1292 being an input to OR gate 404, fully condition AND gate 400 to generate an output signal on line 398 which conditions gate 352 to store in DAR42 the drum address at which the function for the photostore address contained in the table entry is stored.

At S6 time, the combined occurrence of signals of S6 line 206 and ABIND output line 1292 fully condition AND gate 2152 (FIG. 7EE) to generate an output signal on line 2150 which is applied to set ABAR trigger 1290 to its 1 state. At S7 time, the combined occurrence of a singal on S7 line 207 and ABAR output line 1294 fully conditions AND gate 1468 to generate an output signal on line 1466 which is applied through OR gate 1460 to reset ABIND trigger 1288 to its 0 state. At S7 time, the combined occurrence of a signal on ABAR output line 1294 and S7 line 207 also fully conditions AND gate 220 (FIG. 7E) to generate an output signal on line 218 which is applied thruogh OR gate 212 and line 210 to restart clock 199.

The combined occurrence of a signal on S0 line 200 and ABAR line 1294 fully conditions AND gate 257 (FIG. 7H) to generate an output signal on line 251 which is applied through OR gate 248 to memory select line 246. This causes the address in accumulator 236, in this case the address of the first byte of the second word of the table entry to be applied through lines 242 to MAR20. The lowest order three bits of this address, which bits contain the byte address, are applied through the lowest order three lines of the lines 242 to byte register and decoder 244 (FIG. 7P). Since the address applied to register 244 is that of the first byte, the decoder portion of the circuit generates an output signal on line 411 of the lines 410. The applying of an address to MAR20 causes drivers 232 to be energized to read this word out through sense lines 272 to MDR24. The word in MDR24 is applied through lines 296 and OR gate 302 to bus 338. The first six lines (lines 0–5) of the bus 338 are applied to the information input of gate 354 (FIG. 7L) which gate is conditioned at this time by the signal on line 411 from byte register and decoder 244 to pass this byte through lines 421 and OR gates 430 to lines 432. At S3 time, the combined occurrence of a signal on line 203 and on ABAR output line 1294 fully conditions AND gate 481 (FIG. 7K) to generate an output signal on line 478 which is passed through OR gate 476 and line 474 to condition gate 438 to pass the byte on lines 432 through lines 484 to DCON register 486 (FIG. 7I). The byte is stored in this register at the end of S3 time. The combined occurrence of a signal on S7 line 207 and on ABAR line 1294 fully conditions AND gate 1061 (FIG. 7B) to generate an output signal on line 1054 which is applied through OR gate 1052 and line 1050 to condition gate 1042 to pass the contents of DCON register 486 through lines 1046 to TCOMP register 88.

Since ABAR trigger 1290 remains in its 1 state, at S7 time, AND gate 220 (FIG. 7E) is still conditioned to cause clock 199 to be restarted. At the next S7 time, AND gate 1061 is again fully conditioned to generate an output signal on line 1050 which is applied to condition gate 1048 (FIG. 7J) to pass the byte which was stored in the TCOMP register to ICOMP register 102 (FIG. 7B). It should be noted that at each S2 time, AND gate 548 (FIG. 7M) is fully conditioned by the combined occurrence of signals on S2 line 202 and ABAR line 1294 to generate an output signal on line 538 which is applied through OR gate 536 to force 1 line 534. This causes the code for the numeral 1 to be applied through OR gate 498 and true-complement circuit 494 to one input of adder 490, the other input to this adder being the address in accumulator 296. The resulting output on lines 576 is the address of the second byte, in this case the record byte, of the second word of the table entry. One clock cycle after the first byte has been read out from core memory 10, the address of the second byte is stored in MAR 20 and in byte register and decoder 244 causing an output signal from the decoder on line 412. Therefore, at the same time that the track address from the table is stored in ICOMP register 102, the record address from the table is stored in TCOMP register 88.

Referring now to FIG. 7U, it is seen that back when the ABIND trigger was in its ON state, at S0 time, the combined occurrence of the signal on S0 line 200 and on ABIND output line 1292 fully conditioned AND gate 2178 to generate an output signal on line 2176 which was applied through OR gate 2174 and line 2172 to reset TR counter 2170. At this same time, AND gate 1077 (FIG. 7B) is fully conditioned to generate an output signal on line 1073 which is applied through OR gate 1069 and line 1067 to reset DCON register 486, TCOMP register 88, and ICOMP register 102 to the special character ε. At S4 time, with ABIND trigger 1288 in its ON state, AND gate 2192 (FIG. 7U) is fully conditioned to generate an output signal on line 2186 which is applied through OR gate 2184 and line 2182 to increment TR counter 2170 to a count of 1. Decoder 2202 is therefore generating an output signal on line 2211.

It will be remembered that ABAR trigger 1290 was set to its ON state at S6 time. At S7 time following this, AND gate 926 (FIG. 7K) is fully conditioned to generate an output signal on line 921 which is applied through OR gate 918 and line 916 to condition AND gate 914. The output signal on line 2211 from decoder 2202 fully conditions AND gate 914 at this time to generate an output signal on line 912 which is applied thru OR gate 906 and line 904 to condition gate 900 to pass the track address byte in PAR38 through OR gates 938 and lines 940 to ISCAN register 64. This sequence of operations is repeated during the two clock cycles which are required to transfer the track address from the table into ICOMP register 102. Since the special character ε is sitting in ICOMP register 102 until this time, there is a signal on line 1143 (FIG. 7B) causing an output signal on line 1180 from OR gate 1176 so that there is no signal on ICOMP data line 1184. This effectively prevents AND gate 1208 (FIG. 7C) from being fully conditioned to generate a compare condition signal on line 1194.

At S6 time, after the track address from the table has been transferred into ICOMP register 102, AND gate 1208 (FIG. 7C) is fully conditioned to generate an output signal on line 1198 which is applied through OR gate 1196 and line 1194 to cause a compare operation to be performed in upper compare circuit 108. From FIG. 8 it can be seen that the compare operation ripples through the various compare circuits causing a comparison to be made first on the highest order bit of the byte and proceeding to less significant bits.

At S0 time, after the track address has been transferred into ICOMP register 102, this being before the comparison is performed, AND gate 2195 (FIG. 7U) is fully conditioned to generate an output signal on line 2189 which is applied through OR gate 2184 and line 2182 to step TR counter 2170 to a binary count of 10. This causes decoder 2202 to generate an output signal on line 2212. If the result of the track address comparison in upper comparator 108 is a match, at S7 time, AND gates 1061 (FIG. 7B) and 926 (FIG. 7K) are again fully conditioned to cause the record address contained in TCOMP register 88 to be transferred into ICOMP register 102 and to cause an output signal from OR gate 918 (FIG. 7K) on line 916 which is applied to fully condition AND gate 932 to generate an output signal on line 930. The signal on line 930 conditions gate 902 to pass the record address stored in PAR38 through lines 936 and OR gate 938 to ISCAN register 64. At S6 time, AND gate 1208 (FIG. 7C) is again fully conditioned to cause a comparison in upper comparator 108 of the two record addresses. If the record addresses are also the same, upper compare circuit 108 generates an output signal on match line 119. At the previous S0 time, AND gate 2195 (FIG. 7U) was fully conditioned to generate an output signal on line 2189 which was applied through OR gate 2184 to increment TR counter to a count of 0. Decoder 2202 is therefore generating an output signal on line 2210 at this time. The combined occurrence of an IMATCH signal on line 119, A TR00 signal on line 2210, an ABAR signal on line 1294, an ICOMP data signal on line 1184, and an S6 signal on line 206 fully conditions AND gate 1695 (FIG. 7R) to generate an output signal on line 1693 which is applied to set DRO trigger 1680 and SS trigger 1682 to their ON state. This indicates that the desired data unit is stored on the drum and initiates a drum sector search.

If during either a track comparison or a record comparison in upper compare circuit 108 it is found that the contents of ISCAN register 64 is less than the contents of ICOMP register 102, this meaning that the table address being looked at is greater than the desired photostore address, upper compare circuit 108 generates an output signal on line 118 which is applied to fully condition AND gate 1454 (FIG. 7EE) to generate an output signal on line 1452 which is applied through OR gate 2156 and line 2154 to reset ABAR trigger 1290 and through OR gate 1446 to one input of AND gate 1442. If a mark was not detected when the ABIND trigger was in its ON state, meaning that there are additional table entries for the track in question, AND gate 1442 is fully conditioned at this time to generate an output signal on line 1456 which is applied to again set ABIND trigger 1288 to its ON state. This results in an attempt to determine whether the table entry whose address is at this time in TIR32 (FIG. 7N), the table entry whose address was contained in bits 5–17 of the first word of the table entry just looked at, is one which matches the address stored in PAR38.

If during either a track comparison or a record comparison in upper comparator 108 it is found that the contents of the ISCAN register are less than that of the ICOMP register, meaning as was indicated before that the address in the table entry is greater than that in PAR38, but, MARK trigger 1424 was previously set to its ON state indicating that this is the last table entry for the track in question, then AND gate 1432 (FIG. 7W) is fully conditioned to generate an output signal on line 1436 which is applied to OR gate 1438. If, on the other hand, it is found that the contents of ISCAN register 64 are greater than the contents of ICOMP register 102 during either of the comparisons, this means that the address in the table entry is lower than that being sought, and, since the table entries are arranged in sequential fashion, this also means that there is no matching entry in the table. The resulting output signal on line 120 is applied as the other input to OR gate 1438. When a signal is applied to OR gate 1438 in either of the ways indicated above, the resulting output signal on line 1480 is connected to fully condition AND gate 1478 to generate an output signal on line 1476 which is applied to set ATS trigger 1484, FT trigger 1500, and ND trigger 1498 (FIG. 7DD) to their 1 states. At this time, either AND gate 1423 (FIG. 7R) or 1424 is also conditioned to cause SS trigger 1682 to be set to its 1 state. It will now be seen that the setting of these four triggers to their 1 state causes a photostore track search to be initiated.

Referring to FIG. 2, assume first that one of the three conditions which cause a photostore track search to occur has been detected and therefore that ATS trigger 1484 (FIG. 7W), FT trigger 1500, ND trigger 1498, and SS trigger 1682 have all been set to their 1 states. The first step in a photostore track search is to determine what track the photostore read head is presently positioned over and to further determine whether this track is the one which the photostore should be positioned over. At this time, a signal is applied to the CPU in a manner not shown, to inform the CPU that it may have access to buffer 10.

The first clock pulse which is received on output line 1002 from OR gate 984 (FIG. 7N) after FT trigger 1500 is set to its 1 state fully conditions AND gate 216 (FIG.

7E) to generate an output signal on line 214 which restarts clock 199. Ordinarily the clock pulse on line 1002 indicates that a full byte is in SCAN register 74 and this byte is, when the clock is restarted, transferred into DCON register 486. However, for various reasons, it is desired to establish a boundary between previous and new data. Therefore, when clock 199 is reset, AND gate 1063 (FIG. 7B) is fully conditioned to generate an output signal on line 1056 which causes the byte in the DCON register to be transferred to the TCOMP register and the byte in the TCOMP register to be transferred into the ICOMP register. However, since SS trigger 1682 is in its 1 state, AND gate 1022 (FIG. 7A) is deconditioned, inhibiting the transfer of the byte in the SCAN register into the DCON register. This effectively resets the DCON register, giving the desired boundary. At S6 time of the first clock cycle AND gate 1739 (FIG. 7A) is fully conditioned to cause SS trigger 1682 to be reset.

When the next clock pulse is received on line 1002, clock 199 is again set to generate an output on S7 line 207, AND gate 216 is therefore again conditioned to restart clock 199. At this time both AND gates 1022 and 1063 are fully conditioned causing the new byte in SCAN register 74 to be transferred into DCON register 486, the buffer byte in the DCON register to be transferred into the TCOMP register and the byte in the TCOMP register to be transferred into the ICOMP register. The next time a clock is received from photostore 66, clock 199 is again restarted, causing a new byte to be transferred into the DCON register and causing the previous byte to be transferred into the TCOMP register. The buffer byte is at this time transferred from TCOMP register 88 into ICOMP register 102.

Referring to FIG. 5A, it is seen that for an absolute search the track and record address are always preceded by the special character $\phi$. Even if the photostore should happen to be in the wrong dictionary (i.e., the integral dictionary) there are still entries, the argument of which is the same as that shown in FIG. 5A even though the entries have no function. These entries are used for track identification purposes. When an $\alpha 1$–$\alpha 2$ character combination is detected in SCAN register 74 by detector AND gates 1006 (FIG. 7I) and 1007, AND gate 1012 generates an output signal on line 1013 which is applied as one input to AND gate 1851 (FIG. 7S). At S5 time, this AND gate is fully conditioned to generate an output signal on line 1849 which is applied through OR gate 1846 and line 1944 to set begin character (BC) trigger 1836 to its ON state. At the following S4 time, AND gate 1814 (FIG. 7S) is fully conditioned to generate an output signal on line 1812 which sets CL trigger 1772 to its on state. If there is a $\phi$ character immediately following the $\alpha 1$–$\alpha 2$ combination, as eventually there will be, when this character reaches TCOMP register 88, it causes $\phi$ detector AND gate 1158 (FIG. 7J) to generate an output signal on line 1168 which is applied as one input to AND gate 1883 (FIG. 7Z). At S3 time, this AND gate is fully conditioned to generate an output signal on line 1881 which signal is applied through OR gate 1878 and line 1876 to set FI trigger 1838 to its 1 state. As each bit is applied to ICOMP register 102, ICOMP register 102 in turn applies it through lines 104 to the information input to gate 1132 (FIG. 7I). At S2 time, this byte is stored in PT adder 1102.

At S7 time, after FI trigger 1838 is set, gates 1042 and 1048 are conditioned to pass the track address byte in DCON register, 486 to TCOMP register 88 and the $\phi$ character in TCOMP register 88 to ICOMP register 102.

At S7 time, just before the photostore track search was begun, AND gate 910 (FIG. 7K) is fully conditioned, the ATS trigger 1484 having been set to its 1 state at the beginning of the track search, to generate an output signal on line 908 which is applied to condition gate 900 and to allow the transfer of the track address stored in PAR38 to ISCAN register 64 (FIG. 7C) with the first resetting of the clock. Since, from FIG. 5A, it can be seen that from the time that the special character $\phi$ is detected in the TCOMP register until the track address is shifted into ICOMP register, there are always special characters in the ICOMP register causing an output signal on line 1180 from OR gate 1176 and preventing an ICOMP data signal from appearing on line 1184. At S1 time, after the track address from the photostore has been read into the ICOMP register, there is a signal on ICOMP data line 1184 causing AND gate 1214 (FIG. 7C) to be fully conditioned to generate an output signal on line 1204 which is applied through OR gate 1196 to compare condition line 1194 for upper comparator 108. This causes the track address read from photostore 66 to be compared with the desired track address stored in PAR38.

Assume first that the track over which the head is positioned is not the desired track so that the result of the comparison is an output signal on either ISCAN low line 118 or ISCAN high line 120. The situation where the head is positioned over the proper track will be described later. If there is an ISCAN low signal on line 118, then the head is positioned over too high a track and it is desired to perform a back-track operation. Under these conditions, all inputs to AND gate 1527 (FIG. 7T) are present causing an output signal on line 1525 which is applied through OR gate 1520 and line 1518 to set BT trigger 1512 to its ON state. The resulting output signal on back-track line 80 is applied to photostore 66 (FIG. 7A) to cause the read head (not shown) to step to the next lower track. Similarly, if ISCAN is higher than ICOMP, meaning that the photostore read head is positioned over too low a track, all inputs to AND gate 1521 (FIG. 7T) are present causing an output signal on line 1519 which is applied through OR gate 1560 and line 1514 to set AT trigger 1510 to its ON state. The resulting output signal on advance-track line 78 causes the photostore read head (not shown) to be stepped to the next higher photostore track. The signal on advance-track line 78 or back-track line 80 is applied through OR gate 2120 (FIG. 7W) and line 2118 to, at S2 time, fully condition AND gate 2115 to generate an output signal on line 2111 which is applied to reset FT trigger 1500 to its 0 state.

When a signal appears on advance-track line 78 or back-track line 80, OR gate 1550 (FIG. 7J) also has an input applied to it, resulting in a signal on line 1548 which switches single shot 1542 to its unstable state and, at S2 time, fully conditions AND gate 1128 (FIG. 7I) to generate a conditioning signal on line 1126 to gate 1116. If there is a signal on advance-track line 78, the character 1 from code generator 1124 is applied through line 1118 in uncomplemented form to the information input of gate 1116 and through a line 1114 to one input of PT adder 1102, the other input to this adder being the present track address stored in ICOMP register 102. The track address to which the photostore disc is being stepped is in this manner generated in PT adder 1102. If, on the other hand, there is a signal on back-track line 80 at this time, the character 1 applied to true complement circuit 1120 is complemented and applied through line 1118, conditioned gate 1116 and line 1114 to PT adder 1102. This results in the character 1 being subtracted from the track address stored in ICOMP register 102 to give the track address one position behind that presently being looked at or, in other words, the track address of the track to which the photostore read head is being stepped. At S3 time, with the FT trigger reset, all inputs to AND gate 1111 are present, causing an output signal on line 1108 which is applied to condition gate 1098 to apply the new track address stored in PT adder 1102 to PT register 1090. The time duration of single shot 1542 (FIG. 7J) is sufficient to assure that the track step operation is completed before it returns to its stable state. When it returns to its stable state, an output signal is generated on line 1540 which is converted into a pulse by capacitor 1544 and applied through ECHO line 1538 to one input of AND gates 1534 (FIG. 7T) and 1536. At S7 time, (it being remembered that S7 time lasts until clock 199 is restarted) each of these gate is fully conditioned to cause the AT or BT trigger, whichever one was set, to be reset to its 0 state. The echo signal on line 1538 is also applied to fully condition AND gate 1406 (FIG. 7E) to generate an output signal on line 1404 which, at S7 time, is applied to restart clock 199.

At S7 time, all inputs to AND gate 1094 (FIG. 7I) are also present causing an output signal on line 1092 which conditions gate 1086 to apply the track address which the read head (not shown) of photostore disk 66 is now positioned over, which address is stored in PTR 1090, to be applied through lines 1084 to the conditioning input of ICOMP register 102 (FIG. 7B). At the same time, still conditioned AND gate 910 (FIG. 7K) causes the desired track address in PTR 38 to be applied to ISCAN register 64. When clock 199 is restarted the input quantities applied to the ICOMP and ISCAN registers are stored in these registers. At S1 time, all inputs to ADD gate 1209 (FIG. 7C) are present, causing an output signal on line 1199 which results in a compare condition signal on line 1194 for upper comparator 108. If ISCAN is high, AT trigger 1510 (FIG. 7T) is set and if ISCAN is low, back-track trigger 1512 is set both in a manner previously described. The setting of the AT or the BT trigger causes the read head (not shown) of the photostore to be stepped in the appropriate direction, causes an appropriate incrementing or decrementing in PTA1102, and causes the new track address to be stored in PTR-1090. The subsequent occurrence of an echo signal on line 1538 and a signal on S7 line 207 cause the AT or the BT trigger, whichever is set, to be reset, and the restarting of clock 199.

This sequence of operations is repeated until, when a comparison is made at S1 time, it is found that the contests of the ISCAN register 64 and ICOMP register 102 are the same. This means that the photostore read head is now positioned over the right track and that no further stepping is required. AT trigger 1510 and BT trigger 1512 are therefore left in their reset condition. At S2 time, all inputs to AND gate 1490 (FIG. 7W) are present causing an output signal on line 1488 which is applied through OR gate 1486 to set FT trigger 1500 to its ON state.

The triggers are now set in the same manner that they were at the beginning of the photostore track search with the ATS, FT, and ND triggers all in their 1 states. The circuit now proceeds to look at the track which the head is presently positioned over to determine if it is in fact the desired track. This is accomplished in exactly the same manner as the initial search to determine what track the head was positioned over. Bytes are sequentially applied through DCON reister 486, TCOMP register 88, and ICOMP register 102 until a $\phi$ bit is detected in TCOMP register 88, at which time FI trigger 1838 is set to its ON state. When the track address following the $\phi$ character has been transferred into ICOMP register 102, a comparison is performed in upper comparator 108. If, for some reason, such as the fact that the head advanced more than one track when an advance-track or a back-track signal was applied to it, the head is not positioned over the proper track at this time, an output signal is generated on ISCAN high line 118 or ISCAN low line 120 and the advance-track or back-track trigger set causing FT trigger 1500 to be reset and a suitable incrementing or decrementing of the count in PT adder 1102 to occur. The circuit then compares the new count which is transferred into PTR with the desired track address, continues stepping if they are not equal, and goes back into a verify operation if they are. If during a verify operation it is found that the read head is in fact positioned over the proper track, an IMATCH signal is generated on line 119 which is applied to fully condition AND gate 1910 (FIG. 7T) to generate an output signal on line 1906 which is applied through OR gate 1902 to set ES trigger 1840 to its 1 state. At S2 time, with the ES trigger in its 1 state, AND gate 2128 (FIG. 7W) is fully conditioned to generate an output signal on line 2126 which is applied to reset ATS trigger 1484 to its 0 state.

The circuit is now ready to begin an entry search to find the entry having the desired address. It will, however, be remembered from previous discussion, that when a photostore search was initiated, the CPU was given access to the buffer. In order to inform CPU that it must leave the buffer prior to the finding of the desired entry, an entry of the form shown in FIG. 5B is placed a predetermined number of degrees advanced from the desired entry so as to provide an early-warning signal to the CPU to enable it to get out of the buffer before the desired entry is located. Since the number of degrees which the early warning entry is advanced from the desired entry is controllable, the time provided to get out of the buffer is variable as determined by the dictionary user. Therefore, prior to the actual entry search, the circuit performs an early warning search. During this search, the circuit is searching for an entry of the form shown in FIG. 5B.

With ES trigger 1840 in its ON state, there is a signal on line 1930 which is applied through OR gate 225 to condition AND gate 216 each time a clock signal is applied to line 1002 to restart clock 199. At S7 time, AND gate 1033 (FIG. 7A) is conditioned to generate an output signal on line 1129 which fully conditions AND gate 1022 to generate a conditioning signal on line 1020 to gate 1018 (FIG. 7I). This results in the byte in SCAN register 74 being transferred into DCON register 486 when clock 199 is restarted. Similarly, at each S7 time, AND gate 1064 (FIG. 7B) is fully conditioned to generate an output signal on line 1057 which is applied through OR gate 1052 to line 1050 to condition gate 1042 to apply the byte in DCON register 486 to TCOMP register 88 and to condition gate 1048 to apply the byte in TCOMP register 88 to ICOMP register 102. These bytes are likewise stored in their respective registers when clock 199 is restarted. Bytes stream through these three registers until an $\alpha 1$–$\alpha 2$ character combination is detected in SCAN register 74. This causes BC trigger 1836 (FIG. 7S) to be set at S5 time in a manner previously described. At the following S4 time, when the $\alpha 2$ character has advanced to DCON register 486, CL trigger 1772 is set to its ON state. At the following S3 time, AND gate 1868 (FIG. 7S) is fully conditioned to cause BC trigger 1836 to be reset to its 0 state. When clock 199 is restarted one clock cycle later, the special character $\phi$ is transferred into TCOMP register 88. At the following S3 time, AND gate 1883 (FIG. 7Z) is fully conditioned to generate an output signal on line 1881 which sets FI trigger 1838 to its ON state. At S5 time, all inputs to AND gate 1776 (FIG. 7S) are present, fully conditioning this AND gate to generate an output signal on line 1774 which switches CU trigger 1770 to its ON state.

It will be remembered that the last time TR counter 2170 was used, it ended up with a count of 00 in it. At S6 time, after the CU trigger is set, all inputs to AND gate 2194 (FIG. 7U) are present, conditioning this AND gate to generate an output signal on line 2188 which is applied to increment TR counter 2170 to a binary count of 01. This causes an output signal on line 2211. Therefore, at S7 time, AND gate 927 (FIG. 7K) is fully conditioned to generate an output signal on line 922 which is applied through OR gate 918 through conditioned AND gate 914 and OR gate 906 to condition gate 900 to pass the track address in PTR 38 to the conditioning input of ISCAN register 64. The track address is set into ISCAN register 64 when clock 199 is restarted.

Nothing further happens until the track address has been advanced into ICOMP register 102 at which time there is an output signal on ICOMP data line 1184, fully conditioning AND gate 1211 at S1 time to generate an output signal on line 1201 which is applied through OR gate 1196 to upper compare condition line 1194. If the track addresses stored in ISCAN register 64 and ICOMP register 102 are the same, as they should be since the track search has placed the read head over the proper track, there is an output signal on IMATCH line 119 which is applied to fully condition AND gate 2193 (FIG. 7U) to cause TR counter 2170 to be incremented to a binary count of 10. This results in an output signal on line 2212 from decoder 2202. The next time clock 199 is restarted, the record address contained in TCOMP register 88 is advanced into ICOMP register 102. At the same time, AND gate 932 (FIG. 7K) is fully conditioned to generate an output signal on line 930 which conditions gate 902 to pass the record address in PAR 38 through lines 936 to ISCAN register 64. At S7 time, AND gate 964 (FIG. 7C) is fully conditioned to generate an output signal on line 962 which conditions the circuit to force a 1 bit into the highest order position of ISCAN register 64. This bit, which indicates that an early warning search is being made and permits a match only on an entry of the form shown in FIG. 5B, is set into the register when clock 199 is restarted.

At S1 time, compare circuit 1211 is again fully conditioned, causing a record comparison in upper comparator 108. If the record addresses being compared are not equal, AND gate 2179 (FIG. 7U) is fully conditioned to generate an output signal on line 2177 which causes TR counter 2170 to be reset. At the same time, AND gate 1798 (FIG. 7S) is fully conditioned to generate an output signal on line 1792 which resets CU trigger 1770 to its 0 state. Since the FI trigger (FIG. 7Z) was reset when the track address was transferred into ICOMP register 102, AND gates 1211 (FIG. 7C) and 1214 are deconditioned. Further compare operations are therefore inhibited until a new entry has been applied to SCAN register 74. It should be noted that even if an entry having the proper record address of the form shown in FIG. 5A is being looked at at this time, a mismatch is still generated. This is because the early-warning entry must be found before the desired entry.

When the next $\alpha 1$–$\alpha 2$ character combination is detected in SCAN register 74, the circuit begins a new cycle identical to that described above to determine if this is the early-warning entry which is desired. When, as a result of such a cycle, an IMATCH signal is obtained on IMATCH line 119 when the two record addresses are being compared, AND gate 2193 (FIG. 7U) is again fully conditioned to cause TR counter 2170 to be incremented to a binary count of 00. At the following restarting of clock 199, the special character $\tau$ is transferred into ICOMP register 102 causing an output signal on line 1146 from ICOMP $\tau$ detector AND gate 1136. At the S3 time immediately following the transfer of the $\tau$ character into the ICOMP register, all inputs to AND gate 1964 (FIG. 7EE) are present, causing an output signal on line 1962 which sets REW trigger 1960 to its ON state and also sends an indication to the CPU to indicate that it has a given period of time to get out of buffer 10. At the same time, all inputs to AND gate 1799 are present, causing an output signal on line 1793 which causes CU trigger 1770 to be reset, thereby inhibiting further compare operations.

The circuit is now ready to begin an entry search for the desired photostore entry. The circuit is now conditioned to search for an entry of the type shown in FIG. 5A. As each entry passes through the SCAN register, the ICOMP and ISCAN register are loaded in the same manner as these two registers were loaded for the remember-early-warning search, the only difference being that, since REW trigger 1960 is now in its ON state, there is no signal on 0 side output line 1972 from this trigger, and AND gate 964 (FIG. 7C) is never fully conditioned so that the extra bit is not inserted into the highest order position of each record address entry placed in ISCAN register 64. As with the early-warning search, a mismatch in compare circuit 108 causes CU trigger 1770 to be reset and TR counter 2170 to be reset to a count of 0. When a match is had in upper comparator 108 between two record addresses, AND gate 2193 (FIG. 7U) is fully conditioned to generate an output signal on line 2187 which causes TR counter 2170 to be incremented to a binary count of 00 in a manner previously described. When clock 199 is restarted after such a match occurs, the special character $\tau$ is transferred into ICOMP register 102. At S2 time, after this occurs, all inputs to AND gate 2046 (FIG. 7AA) are present, causing an output signal on line 2042 which causes EA trigger 2026 to be set. At S3 time, all inputs to AND gate 1799 are present, causing CU trigger 1770 to be reset. At S4 time, AND gate 726 (FIG. 7P) is also fully conditioned to generate an output signal on line 718 which is applied to condition gate 716 (FIG. 7N) to apply the address in FIR36, the address at which the first byte of the function is to be stored in output region 15 of buffer 10 to accumulator 236. At S5 time, after the setting of EA trigger 2026, all inputs to AND gate 1925 (FIG. 7T) are present, causing an output signal on line 1919 which causes ES trigger 1840 to be reset. Finally, at S6 time, AND gate 2074 (FIG. 7BB) is fully conditioned to generate an output signal on line 2072 which is applied to set SE trigger 2030 to its 1 state and AND gate 2058 (FIG. 7AA) is fully conditioned to generate an output signal on line 2056 which causes RD trigger 2028 to be set to its 1 state.

The circuit has now completed the photostore search and is ready to read out the desired function. RD trigger 2028 being in its ON state causes an output signal on line 2064 which is applied through OR gate 225 (FIG. 7E) to condition AND gate 216 to generate an output signal when the next clock is received from photostore 66 to restart clock 199. When the clock is restarted the first byte of the function is transferred into ICOMP register 102. At S2 time, AND gate 292 (FIG. 7H) is fully conditioned to generate an output signal on line 288 which is applied to condition gate 280 to apply the first byte of the function stored in ICOMP register 102 to gates 304–309. At the same time, AND gate 256 (FIG. 7H) is fully conditioned to generate an output signal on line 250 which conditions gate 240 to pass the address in accumulator 236 to MAR20 and byte register and decoder 244 causing the suitable driver 232 to be energized and causing signals on line 279B–279F and 411. The signals on lines 279B–279F condition gates 274B–274F to apply the second through the sixth bytes on the word read out from memory 10 to the corresponding byte positions in MDR. The absence of a signal on line 279A inhibits the storing of the first byte in MDR. The signal on line 411 however conditions gate 304 to store the function byte in the first byte position of MDR. The contents of MDR are applied to inhibit drivers 318 during the write portion of the cycle of driver 232 to cause the word in MDR, with the new function byte to be stored in output region 15 of memory 10.

At S2 time, AND gate 550 (FIG. 7M) is also fully conditioned to generate an output signal on line 540 which results in a signal on force 1 line 534. At S4 time, AND gate 798 (FIG. 7P) is fully conditioned to generate an output signal on line 794 which permits the new address now on line 576, the address 1 byte position advanced from that at which the last byte was stored, to be applied to accumulator 236. This address is stored in the accumulator at the transfer from S4 to S5 time. At the beginning of the next clock cycle, a new byte of function data is transferred from TCOMP register 88 to ICOMP register 102 and the above described storage procedure is repeated. This sequence of operations is repeated with appropriate ones of the lines 279A–279F and 411–416 being energized and successive function bytes being stored until, during this operation an $\alpha 1$–$\alpha 2$ character combination is detected in SCAN register 74. This causes $\alpha 1$–$\alpha 2$ trigger 1074 to be set. At S5 time following the setting of the $\alpha 1$–$\alpha 2$ trigger, AND gate 1850 (FIG. 7S) is fully conditioned to generate an output signal on line 1848 which is applied to set BC trigger 1836 to its ON state. At S6 time, all inputs to AND gate 2090 (FIG. 7BB) are present causing an output signal on line 2088 which sets EE trigger 2032 to its 1 state. At the following S5 time, when the last character of the function is positioned in ICOMP register 102, the α1 character is in TCOMP register 88 and the α2 character is in DCON register 486, AND gate 2103 (FIG. 7DD), is fully conditioned to generate an output signal on line 2101 which is applied to set NE trigger 2034 to its ON state. At the same time, RD trigger 2028 (FIG. 7AA) is reset to its 0 state. At S6 time, when all necessary transfers have been completed, AND gate 1705 (FIG. 7DD) is fully conditioned to generate an output signal on line 1703 which is applied to reset EE trigger 2032 (FIG. 7BB) and to reset AB trigger 1278 (FIG. 7X) indicating the end of a search absolute operation. The signal on line 1703 may also be applied to the CPU to indicate that the system is ready for a new search command. At S7 time NE trigger 2034 is reset.

Referring again to FIG. 2, assume that during the table search it was found that an entry in the table matched the photostore address stored in PAR38. Under these conditions, it will be remembered that at the end of the table search, DRO trigger 1680 (FIG. 7R) and SS trigger 1682 were set to their ON state and the drum address at which the desired function is stored is stored in DAR42 (FIG. 7D). The circuit is now ready to perform a drum sector search.

As indicated previously, drum sector counter 72 (FIG. 7A) is reset (once for each revolution of magnetic drum 68) by an index mark applied to index line 1070 and is incremented (by a signal applied to line 1072) each time a sector mark is detected on the sector mark track (not shown). DSC72 therefore gives a continuous indication of the sector position of the drum at any given instant. At S1 time, all inputs to AND gate 1750 (FIG. 7R) are present causing an output signal on line 1748 which is applied to set CDS trigger 1684 to its 1 state. At S6 time AND gate 1739 (FIG. 7R) is fully conditioned to reset SS trigger 1682. Referring to FIG. 7E, it can be seen that the first sector mark following the setting of the CDS trigger fully conditions AND gate 221 causing clock 199 to be restarted.

At S4 time, all inputs to AND gate 958 (FIG. 7D) are present, causing an output signal on line 955 which is applied to condition gate 946 (FIG. 7C) to apply the sector address in DAR42 to ISCAN register 64. At S4 time, all inputs to AND gate 1080 (FIG. 7A) are also present, conditioning this gate to generate an output signal on line 1078 which conditions gate 1076 to pass the sector count in DSC72 to ICOMP register 102. The addresses applied to the ICOMP and ISCAN registers are stored at the transition between S4 and S5 times. At S5 time, all inputs to AND gate 1210 (FIG. 7C) are present causing an output signal on line 1200 which is applied through compare condition line 1194 for upper comparator 108.

If this comparison results in a mismatch, nothing further occurs until the next sector is detected, at which time DSC72 is again incremented and clock 199 restarted. At S5 time, a new comparison is made between the drum sector count now in ICOMP register 102 and the desired sector count in ISCAN register 64. This sequence of operations is repeated until the two sector counts are the same, at which time upper compare circuit 108 generates an output signal on IMATCH line 119 which is applied to fully condition AND gate 1760 to generate an output signal on line 1758 causing sector match trigger 1686 to be set to its 1 state and to fully condition AND gate 1754 to generate an output signal on line 1752 which is applied to reset CDS trigger 1684 to its 0 state.

It should be noted that since DRO trigger 1680 is in its 1 state, AND gates 992 (FIG. 7A) and 998 are conditioned to pass data bits and clock bits respectively from drum 68 into scan register 74. The read heads (not shown) which are energized at this time are determined by the track address applied to TAR944 (FIG. 7B) by DAR42 (FIG. 7D). The first α1–α2 character combination applied to SCAN register 74 following the setting of sector match trigger 1686 causes all inputs to AND gate 1909 (FIG. 7T) to be present, causing an output signal on line 1905 which is applied to set ES trigger 1840 to its ON state. The setting of ES trigger 1840 to its ON state, permits clock 199 to be restarted the next time a clock pulse is received from drum 68 (i.e., fully conditions AND gate 216 (FIG. 7E)). When the clock is restarted, the α1 byte is transferred into DCON register 486.

At S5 time, following the setting of ES trigger 1840, all inputs to AND gate 1851 (FIG. 7S) are present causing BC trigger 1836 to be set. At the following S4 time, CL trigger 1772 is set, and at the following S3 time, BC trigger 1836 is reset.

While these operations are going on, the characters applied to SCAN register 74 are being gated into DCON register 486, TCOMP register 88, and ICOMP register 102 under control of conditioned AND gates 1033 (FIG. 7A) and 1064 (FIG. 7B). When the α2 character reaches ICOMP register 102, all inputs to AND gate 1776 (FIG. 7S) are conditioned, causing an output signal on line 1774 which is applied to set CU trigger 1770 to its ON state. At the start of the next clock cycle, the character following the α2 in the drum entry is transferred into ICOMP register 102 and AND gate 957 (FIG. 7D) is fully conditioned to generate an output signal on line 954 which conditions gate 946 to pass the sector address in DAR42 into ISCAN register 64. Referring to FIGS. 6A and 6B, it is seen that the drum entry may either be unverified, in which case the character now in ICOMP register 102 is the special character τ, or it may be a verified entry in which case the character in ICOMP register 102 at this time is the sector number. At S1 time, all inputs to AND gate 1211 are present causing a compare operation to be initiated in upper compare circuit 108. If there is a sector number in ICOMP register 102 at this time, as there would be for a verified entry of the type shown in FIG. 6B, and a mismatch occurs at this time, AND gate 1798 (FIG. 7S) is fully conditioned to cause CU trigger 1770 to be reset. For the purpose of the present description, assume that the resetting of the CU trigger at this time causes an error indication to be given to the CPU in a manner not shown. Other things which may be done when a failure to verify occurs will be described later. If the sector numbers in ISCAN register 64 and ICOMP register 102 are the same, there is an output signal on IMATCH line 119 at this time and nothing further happens until the start of the next clock cycle when the τ character stored in TCOMP register 88 is transferred into ICOMP register 102. When there is a τ character in ICOMP register 102 this character being the character following the α2 if it is an unverified entry or the character following the sector number for a verified entry, no comparison is performed in upper comparator 108. At S2 time, however, provided CU is still on, the detection of the τ character in the ICOMP register causes an output signal on line 1146 from τ detector AND gate 1136 fully conditioning AND gate 2045 (FIG. 7AA) to generate an output signal on line 2041 which is applied to set EA trigger 2026 to its ON state. At S3 time AND gate 1799 (FIG. 7S) is fully conditioned to reset CU trigger 1770. The address in FIR36 (FIG. 7N) is then transferred into accumulation 236 and the RD and SE triggers are set in a manner identical to that previously described for a read-out from the photostore. The function characters applied to ICOMP register 102 from SCAN register 74 are then stored in output region 15 of buffer 10 in a manner identical to that previously described for a read-out of the function from the photostore disc. When the $\alpha 1$–$\alpha 2$ character combination is tranferred into SCAN register 74 at the end of the function read-out, BC trigger 1836, EE trigger 2032, and finally NE trigger 2034 are set to their 1 state in a manner previously described. At S6 time, after the setting of the NE trigger, AND gate 1705 (FIG. 7DD) is fully conditioned to generate an output signal on line 1703 which resets AB trigger 1276, signaling the end of the read absolute operation.

*Read record integral*

Before a read record photostore integral (RRPI) instruction can be applied to the system, a write instruction must be executed to store the input data to be matched on in input region 14 of buffer memory 10. The manner of loading information into a core memory is fairly well known and will not be described here. The characters loaded into input region 14 may, for example, be a complete sentence represented in one language which it is desired to perform a word by word translation of into a second language.

Referring now to FIG. 3, it is seen that the first step in the read integral (RRPI) operation is to load the RRPI instruction. It is assumed that at this time all triggers are reset to their 0 state, all registers except PIR register 854 (FIG. 7G) are reset to the special character $\epsilon$, TR counter 2170 (FIG. 7U) is reset to a binary count of 00 and clock 199 (FIG. 7E) is generating an output signal on S7 line 207. Referring to FIG. 4E, it is seen that when an RRPI instruction is applied to the system, a signal appears on RRPI line 336, the address in output region 15 of buffer 10 at which it is desired to begin storing the function, which address is to be placed in FIR36, is contained on line 0–12 of input bus 26, and the address in input region 14 at which the circuit previously stored in IIR34, is contained on lines 13–28 of the input bus. The signal on RRPI line 336 is applied to the 1 side input of RRPI trigger 1298 (FIG. 7X) to set this trigger to its ON state, is applied through OR gate 332 (FIG. 7Q) to line 330 to condition gate 328 to pass the information on data bus 26 through lines 326 and OR gates 302 to bus 338, is applied through line 330 to condition gate 344 (FIG. 7N) to pass the function address on lines 0–12 of the input bus through lines 378 to FIR36, and is applied to condition gate 346 (FIG. 7F) to pass the input address on lines 13–28 of the input bus through lines 380 to IIR34. The RRPI signal on line 336 is also delayed slightly in delay 710 (FIG. 7F) and applied to fully condition AND gate 702 to generate an output signal on line 692 which is applied through OR gate 690 and line 688 to condition gate 686 to apply the input address just stored in IIR34 through lines 712 and OR gate 682 to accumulator 236. Finally, the RRPI signal on line 336 is applied through delay 1300 (FIG. 7V), which delay is slightly longer than delay 710, and line 1302 to set PRESCAN trigger 1312 to its 1 side. Before going on to describe the directory search, a possible alternative situation which may arise at this point should be considered. If, as a result of a previous operation, RP trigger 1974 (FIG. 7U) is in its 1 state at this time, AND gate 702 is not conditioned when the delayed version of the RRPI signal on line 336 is applied to it, and, instead, AND gate 868 (FIG. 7G) is conditioned at this time to generate an output signal on line 862 which is applied to condition gate 850 to apply the address in PIR854 to accumulator 236. This would be the situation where it was desired to modify the beginning of the first entry to be searched in some predetermined way so that the first character to be matched on would be taken from prefix region 16 rather than input region 14.

With PRESCAN trigger 1312 in its ON state, a signal is applied to line 1314 and OR gate 224 (FIG. 7E) to condition AND gate 220 to generate an output signal on line 218 which is applied to restart clock 199. At S0 time, AND gate 257 (FIG. 7H) is fully conditioned by the signal on S0 line 200 and on output line 268 from OR gate 270, one input to OR gate 270 being output line 1314 from PRESCAN trigger 1312. This causes a memory select signal to be applied to gate 240 causing the address in accumulator 236, either the input region address stored in IIR34, or the prefix region address stored in PIR854, to be transferred to MAR20. As indicated previously, this causes a read-out of this memory word into MDR24. The contents of MDR24 are applied through lines 296 and OR gate 302 and bus 338 to the information input of gates 354–359 (FIG. 7L). The lowest order three bits applied to byte register and decoder 242 when the memory select signal was applied to gate 240 are those for the first byte in the word, causing an output signal from the decoder on line 411. Gate 354 is therefore conditioned, at this time, to pass the first byte of the word on bus 338 to the information inputs of gate 434 (FIG. 7C). At S4 time, AND gate 450 (FIG. 7D) is fully conditioned to generate an output signal on line 445 which is applied to condition gate 434 to apply the first byte of the first word of the entry being accessed through lines 458 to ISCAN register 64. This byte is stored in the ISCAN register at the transition between S4 and S5 time. At S7 time, AND gate 894 (FIG. 7F) is fully conditioned to generate an output signal on line 892 which conditions gate 890 to pass the byte stored in ISCAN register 64 through lines 888 and OR gates 682 to accumulator 236. At S7 time, AND gate 1316 (FIG. 7V) is also fully conditioned to generate an output signal on line 1320 which is applied to set INTDIR trigger 1322 to its 1 state. When INTDIR trigger 1322 is set, AND gate 1326 is fully conditioned to reset PRESCAN trigger 1312. Finally, at S7 time, AND gate 220 (FIG. 7E) is again fully conditioned to cause clock 199 to be restarted.

At S0 time, AND gate 257 (FIG. 7H) is again fully conditioned to generate a memory select signal on line 246 which causes the first byte of the entry being searched for to be applied as an address input to MAR20 causing the word at that address in directory 12 to be read out into MDR24. The manner in which the directory is arranged to cause the proper entry to be read out at this time has been described previously. Referring to FIG. 4A, it is seen that bits 5–17 of the word at this address contain the table address at which a search should be begun during the table search portion of the integral search operation. At S4 time, AND gate 365 (FIG. 7N) is fully conditioned to generate an output signal on line 364 which is applied to condition gate 340 to apply the table address contained on lines 5–17 of bus 338 through lines 376 to TIR32. The circuit is now ready to begin an integral table search.

Referring to FIG. 4C, it is seen that the first word of an integral table entry contains in its 0 bit position a mark if there is no drum entry corresponding to this table entry, the address at which the next integral table entry begins in bit positions 5–17, and the drum address at which the function for the particular table entry argument is stored in bit positions 22–35. As indicated previously; when there is a mark in the 0 bit position of the table entry word, the drum address in bit positions 22–35 is meaningless. With INTDIR trigger 1322 in its ON state, at S7 time, AND gate 824 (FIG. 7N) is fully conditioned to generate an output signal on line 816 which is applied to condition gate 808 to pass the table address stored in TIR32 through OR gate 682 to accumulator 236. At S7 time, AND gate 1328 (FIG. 7V) is also fully conditioned to generate an output signal on line 1332 which is applied through OR gate 1334 to set INTX1, trigger 1346, to its 1 state.

When the INTX1 trigger has set, AND gate 1350 is fully conditioned to generate an output signal on line 1356 which is applied to reset INTDIR trigger 1322 to its 0 state. At S0 time, AND gate 257 (FIG. 7H) is again fully conditioned to generate a memory select signal causing the table address in accumulater 236 to be applied to MAR20. This results in the first word of the table entry being applied, in a manner previously described, to bus 338. With INTX1 trigger 1346 in its 1 state generating an output signal on line 1348, at S2 time, AND gate 524 (FIG. 7M) is fully conditioned to generate an output signal on line 521 which is applied through OR gate 518 and force 6 line 516 to condition gate 506 to apply the code for the numeral 6 through true-complement circuit 494 to adder 490. The other input to this adder is the address of the first byte of the table entry being looked at. The resulting address on output line 576 from adder 490 is the address 6 byte positions or one word position advanced from the address of the first word of the table entry, or in other words, the address of the first byte of the second word of the table entry. At S3 time, AND gate 639 (FIG. 7E) is fully conditioned to generate an output signal on line 634 which is applied through OR gate 632 and line 630 to condition gates 584 to pass the address on lines 576 through lines 646 to TSR648. The address of the first byte of the table entry argument is in this manner stored in TSR648.

As indicated previously, the first word of the table entry is at this time being applied to bus 338 by MDR24. If there is a mark on the 0 line of this bus, at S4 time, AND gate 1408 (FIG. 7W) is fully conditioned to generate an output signal on line 1416 which is applied to set MARK trigger 1424 to its 1 state. Also at S4 time, AND gate 365 (FIG. 7N) is fully conditioned to generate an output signal on line 364 which is applied to condition gate 340 to pass the table address of the next table entry on lines 5–17 of bus 338 to TIR32 and AND gate 400 (FIG. 7D) is fully conditioned to generate an output signal on line 398 which conditions gate 352 to pass the drum address on lines 22–35 of bus 338 to DAR 42.

At S4 time, while the values on bus 338 are being stored, AND gate 706 (FIG. 7F) is fully conditioned to generate an output signal on line 696 which is applied through OR gate 690 and line 688 to condition gate 686 to apply the address in IIR684 to accumulator 236. If the circuit is operating in the prefix mode at this time, then, at S1 time, after INTX1 is set to its 1 state, all inputs to AND gate 1999 (FIG. 7BB) are present, causing an output signal on line 1995 which is applied to set P trigger 1976 to its ON state. Under these conditions, at S4 time, all inputs to AND gate 867 (FIG. 7G) are in their ON state, causing an output signal on line 861 which is applied through OR gate 858 to condition gate 850 to pass the prefix address in PIR 854 to accumulator 236. In either event, the address at which the first word of the entry to be matched on is stored is transferred into accumulator 236. The contents of accumulator 236 are continuously applied through lines 238 as one input to adder 490. If there is no other input being applied to this adder by lines 492 from true-complement circuit 494, the output from adder 490 on lines 576 is the same as the input to this adder on lines 238. At S6 time, all inputs to AND gate 600 (FIG. 7D) are present, causing an output signal on line 594 which is applied through OR gate 590 and line 588 to condition gate 578 to apply the address on lines 576, which in this case is the address just stored in accumulator 236, to ISR606. The address of the first word of the entry to be matched on is in this manner transferred into ISR606.

At S7 time, all inputs to AND gate 745 (FIG. 7P) are present, fully conditioning this AND gate to generate an output signal on line 740 which is applied through OR gate 736 and line 734 to condition gate 732 (FIG. 7N) to pass the address in TSR648, which address is the address of the first byte of the table entry argument (the first byte of the second word of the table entry—see FIG. 4C) through OR gate 682 to accumulator 236. At this same time, all inputs to AND gate 1352 (FIG. 7CC) are present, fully conditioning this AND gate to generate an output signal on line 1358 which is applied through OR gate 1360 to set INTARG trigger 1364 to its 1 state. When the INTARG trigger has set, all inputs to AND gate 1378 (FIG. 7N) are present causing an output signal on line 1382 which is applied to reset INTX1 trigger 1346 to its 0 state. At S0 time, AND gate 257 (FIG. 7H) is again fully conditioned to generate a memory select signal on line 246 causing the address in accumulator 236, the address of the first byte of the table entry argument, to be applied to MAR20 causing the second word of the table entry to be read out through conditioned gates 274A–274F to MDR24. The low order three bits of this address are applied to byte register and decoder 244 causing the decoder to generate an output signal on line 411.

The first byte of the word stored in MDR244 is applied through bus 338 to the information inputs to gate 354, the conditioning input to this gate being line 411 which, as indicated previously, has a signal on it at this time. The resulting output signals on lines 421 are applied through OR gates 430 and lines 432 to the information inputs of gate 438 (FIG. 7K). At S3 time, AND gate 482 is fully conditioned to generate an output signal on line 479 which is applied through OR gate 476 and line 474 to condition gate 438 to pass this byte through lines 484 to DCON register 486 (FIG. 7I). The byte is stored in the DCON register during the transition between S3 and S4 time. Assuming that the character transferred into DCON register 486 is not the special character $\tau$ which occurs only at the end of the table entry argument, at S5 time, AND gate 549 (FIG. 7M) is fully conditioned to generate an output signal on line 539 which is applied to force 1 line 534 to condition gate 510 to pass the code for the numeral 1 through true-complement circuit 494 to adder 490. The resulting address applied to line 576 is the address of the second byte of the first word of the table entry argument. At S6 time, AND gate 641 (FIG. 7E) is fully conditioned to generate an output signal on line 636 which is applied through OR gate 632 and line 630 to gate this address through gate 584 into TSR648. TSR648 therefore contains the address of the next byte in the table on which a comparison is to be performed. Since ISOMP register 102 still contains the reset character $\epsilon$, none of the inputs to OR gate 683 (FIG. 7CC) are present at this time and the INTARG trigger 1364 remains in its ON state. At S7 time, AND gate 1062 (FIG. 7B) is fully conditioned to generate an output signal on line 1055 which is applied through OR gate 1052 to line 1050 to condition gate 1042 to apply the table byte in DCON register 486 to TCOMP register 88. This byte is stored in the TCOMP register when clock 199 is restarted. Also, at S7 time, AND gate 743 (FIG. 7P) is fully conditioned to generate an output signal on line 738 which is applied through OR gate 736 and line 734 to condition gate 732 to apply the address in TSR648, the address of the second byte of the table argument, to accumulator 236. At S0 time, AND gate 257 (FIG. 7H) is fully conditioned to generate a memory select signal which causes this address to be applied to MAR20 and to byte register and decoder 244. This results in an output signal on line 412 from decoder 244 and in the word being read out onto bus 338. The second byte of the word is thus passed through conditioned gate 355 (FIG. 7L) and at S4 time is stored under control of AND gate 482 (FIG. 7K) in DCON register 486. At S7 time, a signal again appears on line 1050 conditioning the first byte of the argument to be transferred from TCOMP register 88 to ICOMP register 102 and the second byte of the argument to be transferred from DCON register 486 to TCOMP register 88. At this same time, AND gate 743 (FIG. 7P) is again conditioned to generate an output signal which causes the address of the third byte of the table entry argument to be applied by TSR648 to accumulator 236.

During this clock cycle the third byte of the table entry argument is transferred into the DCON register at the termination of S3 time. At S7 time of this third INTARG cycle, all inputs to AND gate 675 (FIG. 7CC) are present, causing an output signal on line 669 which causes INPARG trigger 1368 to be set to its 1 state and conditions gate 660 (FIG. 7F) to pass the contents of ISR658 into accumulator 236.

The setting of the INPRAG trigger causes AND gate 1372 (FIG. 7CC) to be conditioned to reset INTARG trigger 1364. The resetting of the INTARG trigger inhibits further transfers of table characters into the DCON, TCOMP, and ICOMP registers. The first byte of the table entry argument therefore remains in ICOMP register 102. At S0 time, AND gate 257 (FIG. 7H) is fully conditioned to transfer the contents of ISR stored in the accumulator into MAR causing the contents of this address, in this case the first word of the entry being matched on, to be read out through MDR24 to data bus 338. The low order three bits in accumulator 338 are applied to byte register and decoder 244, causing an output signal from the decoder on line 411 at this time. This results in the first byte of the input word being applied through conditioned gate 354 (FIG. 7L) and OR gates 430 to the information input of gate 434 (FIG. 7C). At S4 time, AND gate 451 (FIG. 7D) is fully conditioned to generate an output signal on line 446 which conditions gate 434 to pass this byte into ISCAN register 64. The address in the accumulator, the address of the first byte of the input entry, is also applied as one input to adder 490. At S2 time, AND gate 552 (FIG. 7M) is fully conditioned to generate an output signal on line 542 which is applied through OR gate 536 and line 534 to cause this address to be incremented by one in adder 490. At S3 time, AND gate 598 (FIG. 7D) is fully conditioned to generate an output signal on line 592 which is applied through OR gate 590 and line 588 to condition gate 578 (FIG. 7F) to store this new byte address in ISR606.

At S7 time, all inputs to AND gate 1212 (FIG. 7C) are present, causing an output signal on line 1202 which is applied through OR gate 1196 to upper comparator condition line 1194. The first byte of the table entry argument stored in ICOMP register 102 is in this manner compared with the first byte of the input entry stored in ISCAN register 64. If these two bytes are not equal, there is a signal on mismatch line 1278 which is applied through OR gate 832 (FIG. 7N) and line 830 to fully condition AND gate 1342 (FIG. 7V) to switch INTX1 trigger 1346 to its 1 state. When the INTX1 trigger is set, AND gate 1391 (FIG. 7CC) is fully conditioned to reset INPARG trigger 1368. The signal on line 830 also fully conditions AND gate 822 (FIG. 7N) to generate an output signal on line 814 which is applied through OR gate 812 and line 810 to cause the address in TIR32, the address of the first byte of the next table entry, to condition transfer into accumulator 236. At S0 time, AND gate 257 (FIG. 7H) is again fully conditioned to cause a memory select operation which causes this address to be transferred into MAR and initiates a new search to determine if the table entry now being looked at is one which matches the input entry.

If the initial comparison in comparator 108 results in a match condition, but the $\tau$ character indicating the end of a table entry argument is not in TCOMP register 88, then all inputs to AND gate 752 (FIG. 7CC) are present, causing an output signal on line 750 which is applied through OR gate 1360 to set INTARG trigger 1364 to its 1 state and is applied through OR gate 748 (FIG. 7P) and line 747 to OR gate 736 to cause an output signal on line 734 which causes the contents of TSR 648 to condition accumulator 236. This causes the second byte of the input entry and the second byte of the table entry argument to be applied to ISCAN register 64 ad ICOMP register 102 respectively in a manner similar to that previously described for the first byte of these two entries, causes the byte addresses in TSR and ISR to be incremented, and causes a comparison between these two second bytes to be performed. As long as matches occur, the above described sequences of operations is repeated with successive bytes of the table entry argument and the input entry being applied to ICOMP register 102 and ISCAN register 64 respectively.

If the initial comparisons were on prefix characters, it can be seen from FIG. 5D that when all the prefix characters have been mached on, the next character applied to ICOMP register 102 is the special character $\alpha 1$. This signifies the end of the prefix search and means that subsequent input bytes should be taken from input region 14. The detection of the $\alpha 1$ character in ICOMP register 102 by detector AND gate 1134 causes an output signal on line 1144 which, at S4 time, fully conditions AND gate 705 (FIG. 7F) to generate an output signal on line 695 which is applied through OR gate 690 and line 688 to condition gate 686 to condition passage of the address of the first byte in the input region contained in IIR34 into accumulator 236. This address is stored in the accumulator at the transition between S4 and S5 time. At S6 time, AND gate 601 (FIG. 7D) is fully conditioned to generate an output signal on line 595 which is applied through OR gate 590 and line 588 to condition gate 578 (FIG. 7F) to pass the address first stored in the accumulator into ISR 606. At S7 time, AND gate 2014 (FIG. 7BB) is fully conditioned to generate an output signal on line 2007 which is applied to one time unit delay 2002. At S0 time, the output from delay 2002 is applied to reset P trigger 1976. The circuit then proceeds in a manner the same as that previously described when the table search started in the input region.

When the special character $\tau$ is detected in TCOMP register 88, the resulting signal on output line 1146 from ICOMP $\tau$ detector AND gate 1136 is applied to fully condition AND gate 523 (FIG. 7M) at S5 time to cause a force six operation. This effectively puts the address of the last word of the table entry argument on output lines 576 from adder 490. At S6 time, AND gate 641 (FIG. 7E) is fully conditioned to cause this address to be stored in TSR648. After a comparison, when the special character $\tau$ is detected in TCOMP register 88 indicating that the character just matched on is the last character of the table entry argument, $\tau$ detector AND gate 1156 (FIG. 7J) generates an output signal on line 1166 which is applied to fully condition AND gate 756 (FIG. 7CC) to generate an output signal on line 754 to set INTX2 trigger 1394 to its 1 state and through OR gate 748 (FIG. 7P) and line 747 to OR gate 736 to cause the address in TSR648 to be set into accumulator 236. This address is the address of the last word of the table entry (see FIG. 4C). At S0 time, AND gate 257 (FIG. 7H) is again fully conditioned to generate a memory select signal causing this address to be set into MAR20 and causing the contents of this address, the contents of the last word of the table entry, to be read out onto bus 338. At S7 time, when the INTX2 trigger is set, AND gate 1390 (FIG. 7CC) is fully conditioned to generate an output signal on line 1388 which is applied through OR gate 1386 to reset INPARG trigger 1368. At S4 time, AND gate 365 (FIG. 7N) is fully conditioned to generate an output signal on line 364 which conditions gate 340 to store the address of the first word of the table entry argument contained on lines 5–17 of bus 338 at this time in TIR32 and AND gate 386 (FIG. 7L) is fully conditioned to generate an output signal on line 384 to condition gate 350 to pass the photostore track address contained on lines 21–26 of bus 338 to PAR38. At S6 time, AND gate 1396 (FIG. 7W) is fully conditioned to generate an output signal on line 1474 which is applied through OR gate 1462 to set ATS trigger 1484 and FT trigger 1500 to their 1 state and is applied through OR gate 1466 (FIG. 7DD) to set ND trigger 1498 to its 1 state. At the same time, AND gate 1725 (FIG. 7R) is fully conditioned to generate an output signal on line 1720 which is applied to set SS trigger 1682 to its 1 state. It will be remembered that the setting of these four triggers to their 1 state initiates a photostore track search.

At the end of the table search, the address of the first byte of the table entry argument being matched on its stored in TIR, the address of the photostore rack at which a photostore track sample search should be begun is stored in PAR38, and the address on the drum at which the function for the matches on table entry argument is stored in DAR42. MRK trigger 1424 may or may not be set at this time.

The system now proceeds to position the read head (not shown) for photostore 66 (FIG. 7A) over the track indicated in PAR38. This is accomplished in the identical manner to the track search of the absolute search operation. Since this track search operation has been described in detail once already, it will only be summarized at this point. Briefly then, the track address in PAR is applied to ISCAN register 64 and bytes from photostore 66 assembled in SCAN register 74 are applied through DCON register 486 and TCOMP register 88 to ICOMP register 102. When the special character $\phi$ is detected in ICOMP register 102, meaning that the next character to be applied to this register is a track address, FI trigger 1838 (FIG. 7Z) is set to its 1 state. At the next byte time when a track address is in ICOMP register 102, a comparison is performed and either AT trigger 1510 or BT trigger 1512 is set to its 1 state, depending on whether an advance-track or a back-track operation needs to be performed. The track address in ICOMP register 102 is also transferred into PTA1102 (FIG. 7I) and this address is either incremented or decremented by 1 depending on whether an advance-track or a back-track operation is performed. The new address generated in PTA is passed through PTR to ICOMP register 102 and another comparison is performed in upper comparator 108. If this comparison again results in a mismatch, the appropriate trigger 1510 or 1512 is again set to its 1 state and the appropriate stepping operation performed. An appropriate incrementing or decrementing of the track address stored in ICOMP register 102 is also performed in PTA1102 and the new track address then applied to ICOMP register 102. This sequence of operations is repeated until a match is detected in upper comparator 108. At this time, the circuit again causes bytes assembled in SCAN register 74 from photostore 66 to be applied through DCON register 486, TCOMP register 88, and ICOMP register 102 until a track address finally appears in the ICOMP register. A comparison is then performed in upper comparator 108. If there is a mismatch at this time, the circuit again performs an advance track or back-track operation, generates a new track number in PTA1102, and applies this number to ICOMP register 102. A comparison is then performed, and if the two track addresses are equal, the circuit again samples the track to verify that the head is in fact positioned over the desired track. When a match is detected during such a verify operation, all inputs to AND gate 1940 (FIG. 7DD) are present causing an output signal on line 1938 which is applied through OR gate 1936 and line 1934 to set NS trigger 1842 to its 1 state. At S5 time, AND gate 2129 is fully conditioned to generate an output signal on line 2127 which is applied through OR gate 2124 to reset ATS trigger 1484 to its 0 state. As indicated previously, it is desired to have a buffer of a blank byte before applying new bytes from the photostore to the registers. At S7 time after the NS trigger is set, AND gate 1063 is conditioned to condition a transfer of the contents of the DCON register into the TCOMP register but AND gate 1022 (FIG. 7A) is not conditioned to condition a transfer of the contents of the SCAN register into DCON. This effectively resets DCON register 486 to $\epsilon$. At S1 time AND gate 1738 (FIG. 7R) is conditioned to reset SS trigger 1682.

Therefore, at the beginning of the photostore track sample search, ND trigger 1498, FT trigger 1500, and NS trigger 1842 are all in their 1 state. Since DRO trigger 1680 is in its OFF state, bits are being appplied by photostore 66 to SCAN register 74. When an $\alpha 1$–$\alpha 2$ character combination is detected in this register by detector AND gates 1006 (FIG. 7I) and 1007, the resulting output signal on output line 1013 from AND gate 1012 is applied to set $\alpha 1$–$\alpha 2$ trigger 1014. The resulting output signal on line 1015 fully conditions AND gate 1851 (FIG. 7S) to set BC trigger 1836 to its 1 state. At the following S4 time when the $\alpha 2$ character has been transferred into DCON register 486, AND gate 1814 (FIG. 7S) is fully conditioned to generate an output signal on line 1812 which sets CL trigger 1772 to its 1 state. At S7 time, AND gate 1063 (FIG. 7B) is fully conditioned to condition a transfer of the $\alpha 2$ character in DCON register 486 into TCOMP register 88 and at the follownig S7 time, this AND gate is again fully conditioned to condition the transfer of the $\alpha 2$ character in the TCOMP register into ICOMP register 102 and to cause the first byte of the photostore entry argument to be applied to TCOMP register 88.

The entries being looked at at this time should be of the form shown in FIGS. 5C–5E. This means that the first bit follownig the $\alpha 2$ character which byte is now stored in TCOMP register 88, may either be an argument or a prefix character. The detection of the $\alpha 2$ character in ICOMP register 102 by $\alpha 2$ detector AND gate 1135 (FIG. 7B) causes an output signal on line 1145 which, at the following S4 time, fully conditions AND gate 711 (FIG. 7F) to generate an output signal on line 709. If the circuit is not performing a prefix search, the signal on line 709 fully conditions AND gate 704 to generate an output signal on line 694 which is applied through OR gate 690 and line 688 to condition gate 686 to pass the address of the first input byte stored in IIR34 to accumulator 236. It is noted that if RP trigger 1974 is in its 1 state at this time, signifying that a prefix search is being performed, AND gate 865 (FIG. 7F) is fully conditioned to generate an output signal on line 859 which is applied to condition gate 850 (FIG. 7G) to transfer the address in PIR 854 to the accumulator. Therefore, when the $\alpha 2$ character is detected in ICOMP register 102, the address of the first character of the input entry is transferred into accumulator 236 whether this address be in the input region or the prefix region. At SS time all inputs to AND gate (FIG. 7S) are present causing an output signal on line 1774 which is applied to set CU trigger to its 1 state. If a prefix search is being performed, at S6 time all inputs to AND gate 2000 (FIG. 7BB) are present causing an output signal on line 1996 which is applied to set P trigger 1976 to its 1 state.

The next time clock 199 is restarted, the first byte of the photostore entry argument (this may be a prefix byte) is transferred into ICOMP register 102. At S0 time, all inputs to AND gate 258 (FIG. 7H) are present, conditioning this AND gate to generate an output signal on line 252 which is applied to memory select line 246 to cause the entry address in accumulator 236 to be applied to MAR20 and byte register in decoder 244. The portion of the address applied to MAR causes the first word in the input region or the first word in the prefix region to be read out through line 272 to MDR24 and the three bits applied to byte register 244 cause an output signal on, for example, line 411 from the decoder portion thereof. The word applied to bus 338 therefore has its first byte passed through gate 354 (FIG. 7L) and OR gate 430 to the information input of gate 434 (FIG. 7C). At S4 time, all inputs to AND gate 449 (FIG. 7D) are present, causing an output signal on line 444 which conditions gate 434 to pass this byte into ISCAN register 64. At S5 time, all inputs to AND gate 1213 (FIG. 7C) are present, causing a compare condition signal on line 1194. A comparison is thus performed between the first byte of the photostore entry argument store in ICOMP register 102 and the first byte of the input or prefix entry stored in ISCAN register 64.

At the same time that the compare operation is being performed, all inputs to AND gate 554 (FIG. 7M) are present, causing a force 1 operation which brings the address one byte position advanced from that previously applied to ISCAN register 64 onto lines 576. At S6 time, all inputs to AND gate 599 (FIG. 7D) are present, causing an output signal on line 593 which causes gate 578 (FIG. 7F) to be conditioned to pass this new address into ISR606.

If the result of the comparison in upper comparator 108 is a match, at S7 time, a signal again appears on line 1050 to cause the third byte of the photostore entry argument to be applied to TCOMP register 88 and the second byte of the photostore entry argument to be applied to ICOMP register 102. At S7 time, all inputs to AND gate 672 (FIG. 7G) are also present, causing an output signal on line 666 which conditions gate 660 (FIG. 7F) to pass the address in ISR606 to accumulator 236. When clock 199 is restarted, this address is stored in the accumulator. At S0 time, all inputs to AND gate 258 are again conditioned, causing a memory select signal on line 246 which stores the byte address of the second byte of the input entry (or the prefix entry) in byte register and decoder 244 and the remainder of the address in MAR20. This causes the second byte of the word to be applied through bus 338 to gate 355 (FIG. 7L) which gate is now conditioned by an output signal on line 412 from decoder 244. The byte therefore passes through gate 355 and OR gate 430 to the information input of gate 434 (FIG. 7C). At S4 time, AND gate 449 is again fully conditioned to condition gate 434 to store this byte in ISCAN register 64. At S5 time, AND gate 1213 is again conditioned to generate a compare condition signal on line 1194. The circuit proceeds to match on succeeding bytes of the input entry and the photostore entry until either a mismatch occurs or a $\tau$ character is detected in TCOMP register 88 when a match occurs.

If the circuit is initially performing a prefix search, after a few matches an $\alpha 1$ character is applied to ICOMP register 102. At the following S4 time AND gate 703 (FIG. 7F) is fully conditioned to generate an output signal on line 593 which is applied to condition gate 686 (FIG. 7F) to apply the address in IIR34 to accumulator 236. At S7 time AND gate 2016 (FIG. 7BB) is fully conditioned to apply a signal to delay 2002. At S0 time delay 2002 applies a signal to line 2001 to reset P trigger 1976. The circuit then continues to match on characters of the input in a manner the same as that previously described.

It will be remembered that in order to start an entry search at a track position which is just higher than that at which the desired entry is located, it is necessary to start at a lower track and continue the track sample search until an entry just higher than that desired is located. Since, in the usual case, the first track sample search will yield an ISCAN high indication in line 120, indicating that the photostore is positioned over too low a track, it will now be assumed that this is what initially occurs. The sequence of events under other initial conditions will be described later. The first time a signal is obtained on line 120, all inputs to AND gate 1663 (FIG. 7Y) are present, causing an output signal on line 1659 which is applied to set TL trigger 1556 to its 1 state. At S6 time, all inputs to AND gate 1797 (FIG. 7S) are present, causing an output signal on line 1791 which is applied to reset CU trigger 1770 to its 0 state, thereby inhibiting further comparison on the particular photostore entry. At the following S2 time, all inputs to AND gate 1620 (FIG. 7Z) are present, causing an output signal on line 1618 which causes AD trigger 1562 to be set to its 1 state. At S4 time, all inputs to AND gate 1668 (FIG. 7Y) are present causing an output signal on line 1666 which resets the TL trigger.

Nothing further happens until the next $\alpha 1$–$\alpha 2$ character combination is detected in SCAN register 74, at which time a second comparison identical to that described above is performed. This provides a double check on the initial indication that the head is positioned over too low a track. Assuming that an ISCAN-high indication is again received, AND gate 1663 (FIG. 7Y) is again fully conditioned to cause TL trigger 1556 to be set to its 1 state. At S1 time following the setting of the TL trigger, all inputs to AND gate 1520 (FIG. 7T) are present, causing an output signal on line 1518 which is applied to set AT trigger 1510 to its 1 state. At S6 time, AND gate 1953 (FIG. 7DD) is fully conditioned to generate an output signal on line 1949 which causes NS trigger 1842 to be reset to its 0 state. The setting of AT trigger 1510 to its ON state causes a signal on advance-track line 78 which causes the photostore read head to be stepped to the next higher track. It also causes single shot 1542 (FIG. 7J) to be switched to its unstable state. When the single shot returns to its stable state, a signal is applied to fully condition AND gate 1534 (FIG. 7T) to reset AT trigger 1510.

The circuit then proceeds to sample an entry on the next higher track to determine whether it is higher or lower than the entry being sought and to generate advance-track signals on line 78 until, as a result of a comparison, a signal is generated on output line 118 indicating the contents of the ISCAN register is less than that of the ICOMP register and therefore that the head is positioned over too high a track. If this reading is in fact correct, the head is now positioned over the track which it is desired to begin an entry search on. The first time that a signal appears on line 118, it is applied to fully condition AND gate 1646 (FIG. 7Y) to generate an output signal on line 1640 which is applied to set TH trigger 1554 to its 1 state. At S6 time, AND gate 1797 (FIG. 7S) is again fully conditioned to generate an output signal on line 1791 which resets CU trigger 1770 to its 0 state. At the following S3 time, AND gate 1603 (FIG. 7AA) is fully conditioned to generate an output signal on line 1601 which is applied to set DC trigger 1558 to its 1 state. The setting of the DC trigger to its 1 state indicates that there has been a single match on the desired track. At S4 time AND gate 1651 (FIG. 7Y) is fully conditioned to generate an output signal on line 1649 which resets TH trigger 1554. The circuit then proceeds to perform a second compare operation on the next entry of the same track and, if this comparison also results in an ISCAN low signal on line 118, AND gate 1646 (FIG. 7Y) is again fully conditioned to generate an output signal on line 1640 which again sets TH trigger 1554 to its 1 state. The setting of the TH trigger at S5 time results in CU trigger 1770 being reset at S6 time in a manner previously described. At the following S1 time, all inputs to AND gate 1908 (FIG. 7T) are present, causing an output signal on line 1904 which is applied to set ES trigger 1840 to its 1 state. At S2 time, all inputs to AND gate 1628 (FIG. 7Z) are present, causing AD trigger 1562 to be reset and all inputs to AND gate 1606 (FIG. 7AA) are present, causing DC trigger 1558 to be reset. At S4 time, all inputs to AND gate 1651 (FIG. 7Y) are present (the CL trigger having been previously reset), causing TH trigger 1554 to be reset. The circuit is now conditioned to begin the compare photostore entry v. table search.

In the previous discussion, it was assumed that the initial comparison resulted in an indication that the photostore read head was positioned over too low a track. If, for some reason, a match is obtained during either the first search, or during any subsequent search on a complete entry argument on the photostore, there will be the combined occurrence of an output signal on IMATCH line 119 and an output on line 1166 from $\tau$ detector AND gate 1156 (FIG. 7J) for the TCOMP register. Remembering the example previously given, a match may be had on an entry in the photostore such as "manage" when the input word is in fact management. Therefore, the circuit interprets any match the same as an ICOMP low condition. Therefore, under these conditions, all inputs to AND gate 1663 (FIG. 7Y) are present, causing an output signal on line 1660 which switches TL trigger 1556 to its 1 state. The circuit then proceeds in a manner identical to that in which it proceeded when it was an ICOMP low indication on line 120 which caused the TL trigger to be set to its 1 state.

While the photostore track address which is obtained from the table search should place the head on a track which is slightly below the track on which entry search should begin, it is possible that the photostore track indicated in the table will be incorrect and that the first comparison during the photostore track sample search will result in an ISCAN low signal on line 118, indicating that the photostore read head is positioned over too high a track. When this occurs, all inputs to AND gate 1646 (FIG. 7Y) are present, causing an output signal on line 1640 which sets TH trigger 1554 to its 1 state. This results in CU trigger 1770 being reset in a manner previously described in AND gate 1566 (FIG. 7Z) being fully conditioned at the following S1 time to set BD trigger 1560 to its 1 state, and in the TH trigger being reset at the following S4 time also in a manner previously described. The next sample on the same track should confirm the initial indication that the head is positioned over too high a track causing AND gate 1646 to again be fully conditioned to set TH trigger 1554 to its 1 state. At the following S1 time, all inputs to AND gate 1526 (FIG. 7T) are present, resulting in an output signal on line 1524 which is applied to set BT trigger 1512 to its 1 state. The resulting output signal on line 80 causes a back-track operation of the photostore to be performed and causes single shot 1542 (FIG. 7J) to be switched to its unstable state. When the single shot returns to its stable state, an ECHO signal is received which resets BT trigger 1512 to its 0 state. The signal on output line 80 from BT trigger 1512 is also applied to fully condition AND gate 1952 (FIG. 7DD) to generate an output signal on line 1948 which is applied to reset NS trigger 1842 to its 0 state.

BT trigger 1512 is then reenergized each time an ICOMP high indication is received on line 118 as the result of a comparison in upper comparator 108, causing the read head to be stepped to successively lower tracks. The first time that an ISCAN high indication is received on line 120 as a result of a comparison, AND GATE 1663 (FIG.7Y) is again conditioned to set TL trigger 1556 to its 1 state. The setting of the TL trigger to its 1 state causes the CU trigger to be reset in a manner previously described and, at S3 time, causes AND gate 1602 (FIG. 7AA) to be fully conditioned to generate an output signal on line 1600 which causes DC trigger 1558 to be set. The circuit then performs a second comparison on the same track and if a SCAN high indication is again received on line 120, the TL trigger is again set to its 1 state. This causes CU trigger 1770 and AD trigger 1562 to be reset and set respectively in a manner previously described. At S2 time, following the setting of the TL trigger, all inputs to AND gate 1606 (FIG. 7AA) are present, causing an output signal on line 1604 which resets DC trigger 1558 and all inputs to AND gate 1580 (FIG. 7Z) are present, causing an output signal on line 1586 which resets BD trigger 1560 to its 0 state. The circuit then proceeds to find the desired track on which to begin an entry search in a manner identical to that previously described when the initial search indicated that the read head was positioned over too low a track.

When ES trigger 1840 is switched to its ON state, the circuit is ready to begin the compare photostore entry versus table entry step on the flow diagram of FIG. 3. With the ES trigger in its ON state, AND gates 1033 (FIG. 7A) and 1064 (FIG. 7B) are conditioned at S7 time to condition a transfer of the byte in SCAN register 74 into DCON register 486, a transfer of the byte in DCON register 486 into TCOMP register 88 and a transfer of the byte in TCOMP88 into ICOMP register 102. As for previously described operations, when an $\alpha 1$–$\alpha 2$ character combination is detected in SCAN register 74, BC trigger 1836 (FIG. 7S) is set to its ON state at S5 time, and at the following S4 time, when the $\alpha 2$ character has been advanced to DCON register 486, CL trigger 1772 is set to its ON state. At S7 time, after the CL trigger has been set to its 1 state, BC trigger 1836 is still in its 1 state and therefore all inputs to AND gate 825 (FIG. 7N) are present, causing an output signal on line 817 from this AND gate, which is applied to condition gate 808 to pass the contents of TIR32, in this case the address at which the first byte of the matched-on table entry argument is stored, to accumulator 236. This address is stored in the accumulator when clock 199 is reset. At S0 time, AND gate 259 (FIG. 7H) is fully conditioned to generate a memory select signal which causes this address to be fed into MAR20 and byte register in decoder 244 resulting in an output signal on line 411 from the decoder portion of circuit 244 and in the first word of the table entry argument being applied by MDR24 to data bus 338. The first byte of this word is applied through conditioned gate 354 (FIG. 7L) to the information input of gate 436 (FIG. 7K). At S2 time AND gate 553 is fully conditioned to generate an output signal on line 543 which causes the table address in the accumulator to be incremented by one in adder 490 and the resulting address, the address of the second byte of the table entry argument to be applied to line 516. At S3 time AND gate 640 (FIG. 7E) is fully conditioned to generate an output signal on line 635 which conditions gate 584 (FIG. 7N) to store the new table address on lines 576 in TSR648. Also at S3 time, AND gate 1868 (FIG. 7S) is fully conditioned to generate an output signal on line 1863 which is applied to reset BC trigger 1836. Therefore, at S4 time, all inputs to AND gate 462 (FIG. 7K) are present, causing the first byte of the matched-on table entry argument to be transferred through gates 436 to TCON register 466. At S7 time, AND gate 471 is fully conditioned to generate an output signal on line 469 which conditions gate 470 to pass the byte in TCON register 466 to TSCAN register 40. At the same time, a signal appears on line 1050 conditioning gate 1042 (FIG. 7J) to pass the first argument byte of the table entry to TCOMP register 88 and conditioning gate 1048 to pass the special character $\alpha 2$ to ICOMP register 102. These bytes are stored in their respective registers when clock 199 is restarted. TSCAN register 40 therefore contains the first byte of the table entry argument at this time, and TCOMP register 88 contains the first byte of the photostore entry.

At the same S4 time that an entry is being transferred from bus 338 into TCON register 466, AND gate 711 (FIG. 7F) is fully conditioned to generate an output signal on line 709 which is applied to fully condition either AND gate 704 or 865 depending on whether RP trigger 1974 is in its ON or OFF state. If the RP trigger is in its OFF state, the contents of IIR, the first byte address in the input region, is transferred to the accumulator and if the RP trigger is in its ON state, the first address in prefix region 16 is transferred to the accumulator. At S5 time, all inputs to AND gate 1776 are present, fully conditioning this AND gate to generate an output signal on line 1774 which is applied to set CU trigger 1770 to its ON state. The CU trigger being in its ON state, at S6 time, all inputs to AND gate 599 (FIG. 7D) are present, causing an output signal on line 593 which is applied through OR gate 590 and line 588 to condition gate 578 (FIG. 7F) to pass the address on lines 576, which, since at this time the only input to adder 490 is the contents of the accumulator 236, is the address in the accumulator, the address of the first byte of the input or prefix entry, into ISR 606.

As was indicated previously, when clock 199 is restarted, the first byte of the photostore entry is transferred into TCOMP register 88 and the first byte of the table entry argument is transferred into TSCAN register 40. At S7 time, prior to this AND gate 744 (FIG. 7P) is fully conditioned to generate an output signal on line 739 which is applied through OR gate 736 and line 734 to condition gate 732 (FIG. 7N) to apply the address in TSR648, in this case the address of the second byte of the table entry, to accumulator 236. This byte is stored in the accumulator when clock 199 is restarted. At S0 time, all inputs to AND gates 258 (FIG. 7H) and 259 are present, causing a memory select signal on line 246 which causes the word address for the first word of the table entry argument to be applied to MAR20 and the byte address for the second byte of this word to be applied to byte register and decoder 244. This results in signals on bus 338 and on line 412 which cause the second byte of the table entry argument to be applied through gate 355 (FIG. 7L) to one input of gate 436. At S1 time, all inputs to AND gate 1222 (FIG. 7C) are present, causing an output signal on low-comparator compare condition line 1220 which causes the two first bytes in the TSCAN and TCOMP registers to be compared. At S2 time AND gate 553 (FIG. 7M) is again fully conditioned to cause the table address in the accumulator to be incremented and at S3 time AND gate 640 (FIG. 7E) is fully conditioned to cause this address to be stored in TSR648.

Assume first that the two entries compared are equal. Under these conditions, at S4 time, all inputs to AND gate 459 (FIG. 7K) are present, causing an output signal which conditions gate 436 to pass the second byte of the table entry argument applied to it through lines 464 to TCON register 466. At S4 time, assuming that the character α1 is not in ICOMP register 102, AND gate 674 (FIG. 7Z) is fully conditioned to generate an output signal on line 668 which is applied through OR gate 664 and line 662 to condition gate 660 (FIG. 7F) to pass the contents of ISR606, in this case the address of the first byte of the input entry into accumulator 236. At S5 time, all inputs to AND gate 554 (FIG. 7M) are present, causing a force 1 signal on line 534 which increments the address in accumulator 236 to the address of the second byte of the input or prefix entry and causes this address to be applied to output lines 576 of adder 490. At S6 time, all inputs to AND gate 599 (FIG. 7D) are present causing an output signal on line 593 which is applied to condition gate 578 to pass the address on lines 576 through lines 604 to ISR606. The address of the second byte of the input entry is in this manner stored in ISR606. At S7 time, gate 470 (FIG. 7K) is conditioned in a manner previously described to pass the second byte of the table entry argument into TSCAN register 40 and gate 1042 is conditioned to pass the second byte of the photostore entry into TCOMP register 88. The first byte of the photostore argument is transferred from TCOMP register 88 into ICOMP register 102.

At S7 time, AND gate 744 (FIG. 7P) is again conditioned to cause the contents of TSR648 to be applied to accumulator 236 and at S0 time, a memory select signal is generated in a manner previously described to cause the address of the third byte of the table entry argument to be applied to MAR20 and byte register and decoder 244. This results in the passing of the third byte of the table entry argument through gate 356 and, at the transition between S3 and S4 time, in the storage of this byte in TCON register 466. At S1 time, AND gate 1222 is again fully conditioned to cause a comparison of the two second bytes stored in TCOMP register 88 and TSCAN register 40 in lower comparator 112.

Assume that this second comparison again results in a match and that subsequent comparisons also result in matches. Assume further that the initial matches are on prefix characters and that just prior to the last of these matches an α1 character is detected in the ICOMP register fully conditioning AND gate 703 (FIG. 7F) at S4 time, this causes an output signal on line 693 which is applied to condition gate 686 to apply the contents of IIR34 to accumulator 236. This means that the prefix portion of the match has been completed and that subsequent matches will be had on input characters. Therefore, subsequent updating of ISR must be done with characters from the input region. Since there is a special character in ICOMP register 102 at this time, there is no signal on ICOMP data line 1184 and therefore at S5 time, AND gate 554 (FIG. 7M) is not fully conditioned and there is no force 1 operation performed. At S6 time, AND gate 599 (FIG. 7D) is again fully conditioned to cause the address on line 576, in this case the address of the first character of the inpnt region, to be stored in ISR606. At S7 time AND gate 2016 (FIG. 7BB) is fully conditioned to apply a signal to delay 2002. At S0 time, to output from delay 2002 resets P trigger 1976.

As before, when clock 199 is restarted the next character of the table entry argument and the next character of the photostore entry argument are transferred into TSCAN register 40 and TCOMP register 88 respectively and the second character of the photostore entry argument is transferred into ICOMP register 102. The next time clock 199 is restarted, the address of the following byte of the table entry argument is transferred from TSR 648 into accumulator 236 and at S0 time, a memory select signal is generated causing this byte to be transferred through a conditioned gate 354–359 to the information input of gate 436. At S1 time, a new comparison is performed in lower comparator 112.

Assume now that the result of this comparison is that the contents of TCOMP register 88 are greater than the contents of TSCAN register 40. This results in a TSCAN low output signal on line 123 which fully conditions AND gate 1644 (FIG. 7Y) to generate an output signal on line 1638 which is applied to set TH trigger 1554 to its 1 state. At S4 time, AND gate 674 (FIG. 7G) is again conditioned to apply the next byte of the input entry to accumulator 236. At S5 time, this address is incremented, and at S6 time, the incremented address is restored in ISR606, both in a manner previously described. At S7 time, the byte in TCOMP register 88 is applied to ICOMP register 102.

At the following S0 time, AND gate 258 is again conditioned to generate a memory select signal which causes the address from accumulator 236 to be applied to MAR20 and byte register and decoder 244, resulting in an output signal on bus 338 and on one of the decoder output lines 410, the particular line depending on the byte on which the mismatch in lower comparator 112 occurs. For example, if the first byte of the input was the second byte of a word in memory 10 and if the mismatch occurred on the third byte, an output signal would appear on line 414 from decoder 244. Also, at S0 time, AND gate 1829 (FIG. 7S) is fully conditioned to generate an output signal on line 1823, which is applied to reset CL trigger 1772 to its 0 state. At S4 time, AND gate 499 (FIG. 7D) is now fully conditioned to pass the byte from, for example, gate 357, into ISCAN register 64. Therefore, at S4 time, ICOMP register 102 contains the byte from the photostore on which the mismatch occurred, and ISCAN register 64 contains the comparable byte from the input entry. At S5 time, all inputs to AND gate 1213 (FIG. 7C) are present, causing a compare condition signal to be generated on upper compare line 1194. If this comparison results in a match, the next character of the input entry is placed in ISCAN register 64 in a manner previously described, and the next byte of the photostore entry is transferred into ICOMP register 102. At the following S5 time, these two bytes are compared. This sequence of operations is repeated with successive bytes being applied to the ISCAN and ICOMP registers until either a mismatch occurs in upper comparator 118 or a match occurs when the special chasacter $\tau$ is stored in TCOMP register 88. When a mismatch occurs, either AND gate 1645 (FIG. 7Y) or AND gate 1663 is fully conditioned to generate an output signal which causes TH trigger 1554 or TL trigger 1556 respectively to be set to its 1 state. With either the TH or the TL trigger in its ON state, at S6 time, AND gate 1797 (FIG. 7S) is fully conditioned to generate an output signal on line 1791 which resets CU trigger 1770 to its OFF state. This inhibits further comparisons on the photostore entry presently being looked at.

When the next $\alpha$1–$\alpha$2 character combination is detected in SCAN register 74, signifying the beginning of a new photostore entry, a new cycle of operation is begun with the photostore entry first being compared against the matched-on table entry argument in lower comparator 112 and, if the photostore entry is found to be more significant, the comparison being continued in upper comparator 118 against the input entry. If, during a comparison against the input entry in upper comparator 118, the special character $\tau$ is shifted into ICOMP register 102 at the beginning of an S0 time, at the following S1 time, all inputs to AND gate 2044 (FIG. 7AA) are present, causing an output signal on line 2040 which is applied to set EA trigger 2026 to its 1 state. This indicates that the photostore is the winner and initiates the photostore read-out operation.

Before describing the photostore read-out operation, other possible conditions which may arise during the compare photostore entry v. table step should be considered. The first condition arises when, at S1 time, a comparison is being made in lower comparator 112 and it is found that the contents of TSCAN register 40 is greater than the contents of TCOMP register 88, indicating that the table entry is more significant. The resulting output signal on line 125 is applied to fully condition AND gate 1662 to generate an output signal on line 1658 which is applied to set TL trigger 1558 to its ON state. A second possible condition occurs when, as the result of a comparison in lower comparator 112 at S1 time, a lower match signal is generated on line 124, indicating that TSCAN register 40 and TCOMP register 88 contained the same character and at the same time there is an output signal on output line 1166 from TCOMP $\tau$ detector AND gate 1156 (FIG. 7J) indicating that the end of the photostore table entry argument, and therefore the end of the table entry argument have both been reached. Under these conditions, the two entries are equal and, since the drum always contains the most recent information the output is taken from the drum. Under these conditions, all inputs to AND gate 1664 (FIG. 7Y) are present, causing an output signal on line 1660 which is likewise applied to set TL trigger 1556 to its 1 state. Assuming that MARK trigger 1424 is in its OFF state (i.e., that there was no bit in the 0 bit position of the first word of the matched-on table entry) at S3 time, all inputs to AND gate 1694 (FIG. 7R) are present causing an output signal on line 1692 which is applied to set DRO trigger 1680 to its ON state. At S6 time, AND gate 1924 (FIG. 7T) is fully conditioned to cause ES trigger 1840 to be reset. At the following S1 time, assuming still that the MARK trigger is in its OFF state, all inputs to AND gate 1749 (FIG. 7R) are present, causing CDS trigger 1684 to be set to its 1 state. It will be remembered from the previous discussion of the absolute search operation, that the setting of the DRO and CDS triggers to their 1 state initiates a drum sector search.

The drum sector search for an integral search operation is identical to the drum sector search previously described in detail for the absolute search operation. To summarize this operation, the drum sector count which is continuously maintained in DSC72 (FIG. 7A) is applied to ICOMP register 102 and the desired drum sector stored in DAR42 during the table search operation is transferred into ISCAN register 64. A comparison is then performed, and, if the sector numbers are found to be unequal, the circuit waits until DSC72 has been incremented by the next sector mark applied to it through line 1072, applies this new count to ICOMP register 102, and performs a new comparison. When, as a result of such a comparison, it is found that the contents of ISCAN register 64 and ICOMP register 102 are the same, the circuit then energizes the read head (not shown) on magnetic drum 68 for the track indicated by TAR944 (FIG. 7B), this register having the track address applied to it by DAR42, and causes bytes read from magnetic drum 68 to be applied through SCAN register 74, DCON register 486, and TCOMP register 88 to ICOMP register 102. Following the detection of an $\alpha$1–$\alpha$2 character combination, the first byte applied to ICOMP register 102 is checked to determine if it is a $\tau$ character. If it is a $\tau$ character, then all inputs to AND gate 2045 (FIG. 7AA) are present, causing an output signal on line 2041 which sets EA trigger 2026 to its 1 state. If the character is something other than a $\tau$, and the entry is a drum verified entry of the type shown in FIG. 6B then the character in ICOMP register 102 is the sector position of the entry. This is compared with the desired sector count which is in ISCAN register 64. If they are equal, nothing further happens until the next character is applied to ICOMP register 102. From FIG. 6B, it can be seen that this character is a $\tau$ and from previous discussion, it can be seen that this causes the EA trigger to be set to its 1 state.

Before describing the photostore read-out and the drum read-out operations, which operations are substantially the same, there is one more possible condition which may occur during a comparison between the contents of the TSCAN register 40 and TCOMP register 88 in lower comparator 112. This is a situation where the end of a photostore entry is reached before the end of a table entry so that during a comparison there is a $\tau$ character in TCOMP register 88 and there is some other character in TSCAN register 40. Since the code for the $\tau$ character is lower than that of any other character, this results in a TSCAN high signal on line 125 which conditions AND gate 1662 to set TL trigger 1556 to its 1 state. Ordinarily this causes DRO trigger 1680 to be set to its 1 state at S3 time, ES trigger 1840 to be reset at S6 time and CDS trigger 1684 to be set at the following S1 time. In short, under these conditions, the drum is ordinarily the winner. However due to the manner in which the photostore is laid out, and in which the search is performed, such a condition is most likely to occur in the situation where there was a marker bit in the 0 bit position of the first word of the matched-on table entry indicating that there is no corresponding function on the drum. Under these conditions, MARK trigger 1424 (FIG. 7W) is in its 1 state inhibiting the setting of the DRO and CDS triggers to their 1 state, inhibiting the resetting of the ES trigger and therefore preventing a drum sector search and drum read-out operation from occurring. Therefore, after the setting of the TL trigger to its 1 state, nothing further happens until, at S0 time, AND gate 1827 is fully conditioned to cause CL trigger 1772 to be reset to its 0 state. At the beginning of S0 time, the $\tau$ character in TCOMP register 88 is transferred into ICOMP register 102. At S1 time, all inputs to AND gate 2044 (FIG. 7AA) are present, causing an output signal on line 2040 which switches EA trigger 2026 to its 1 state. The circuit is in this manner conditioned to begin a photostore read-out operation.

Before describing the two read-out operations, one additional operation should be described. At the beginning of the photostore track sample search, when NS trigger 1842 is in its 1 state, ISR register 606 (FIG. 7F) contains the address of the last byte in the prefix or input region on which a match was made during the table search. If this character is in the input region, this is the character on which the next table entry search is to be begun. If this character is in the prefix region, then the next table entry search is to be begun at the address contained in IIR. If the character is in the input region at S4 time, all inputs to AND gate 673 (FIG. 7G) are present, causing gate 660 (FIG. 7F) to be conditioned to pass the address in ISR to accumulator 236. If the circuit is still in the prefix region, at S4 time AND gate 701 (FIG. 7F) is fully conditioned to apply an output signal to line 691 which conditions gate 686 to apply the address in IIR to the accumulator. At S6 time, all inputs to AND gate 652 (FIG. 7L) are present causing conditioning gate 586 to pass the address in accumulator 236, which address also appears on output lines 576 from adder 490 for reasons previously described, to be applied to PAR38. This information remains stored in PAR until DRO trigger 1680 is set to its 1 state by a determination that the drum is the winner. If the drum is not the winner, this information remains in PAR until it is eventually written over. When a determination is made that the drum is the winner and DRO trigger 1680 is switched to its ON state, all inputs to AND gate 886 (FIG. 7F) are present, causing gate 874 to be conditioned to pass the stored address to accumulator 238. At S6 time, all inputs to AND gate 615 (FIG. 7E) are present, causing this address to be stored in IIR34. This conditions the circuit to begin the next search operation at the desired address.

Similarly, when it is determined that the photostore is the winner, AND gate 674 (FIG. 7G) has been previously conditioned to apply the address in ISR606, which is again the address at which the next search should begin, to accumulator 236. After the EA trigger has been set to its ON state, at S6 time, all inputs to AND gate 616 (FIG. 7E) are present, conditioning this gate to generate an output signal on line 613 which is applied to condition gate 580 (FIG. 7F) to store this address in IIR to condition the circuit for the next operation.

After the EA trigger has been set, either as the result of a determination that the drum is the winner, or as a result of the determination that the photostore is the winner, at S4 time, all inputs to AND gate 726 (FIG. 7P) are present, causing an output signal on line 723 which is applied to condition gate 716 (FIG. 7N) to apply the address in FIR, the address at which the first byte of the function is to be stored, to accumulator 236. At S6 time, all inputs to AND gate 2058 (FIG. 7AA) are present, causing an output signal on line 2056 which sets RD trigger 2028 to its 1 state. At S7 time, all inputs to AND gate 2074 (FIG. 7BB) are present, causing an output signal on line 2072 which sets SE trigger 2030 to its 1 state. At the end of S7 time, the first byte of the function is transferred from TCOMP register 88 into ICOMP register 102.

At the following S2 time, AND gate 292 (FIG. 7H) is fully conditioned to generate an output signal on line 288 which is applied to condition gate 280 to apply the byte in ICOMP register 102 to the information inputs of gates 304–309. At S2 time, AND gate 256 (FIG. 7H) is also fully conditioned to generate a memory select signal to pass the address in FIR, which is stored in accumulator 236, into MAR20 and byte register and decoder 244. Since the address applied to circuit 244 is that of the first byte of the memory word, the decoder portion of circuit 244 generates a signal on line 411 and on complement lines 279B–279F. The application of the address to MAR causes appropriate drivers 232 to be energized to read out the word indicated by MAR, in this case, the first word in the output region; and apply it to the information inputs of gates 274A–274F. The signal on line 411 conditions gate 304 (FIG. 7H) to pass the first function byte into the first six bit positions in MDR and the signals on lines 279B–279F are applied through OR gates 276B–276F (FIG. 7Q) to condition gates 274B–274I to store the second-sixth bytes of the read out word in the remaining storage positions in MDR. The contents of MDR are applied to inhibit drivers 318 causing the contents of MDR, including the new function byte to be stored in the output region of memory 10 during the write portion of the cycle of driver 232. The first byte of the function data is in this way stored in output region 15 of buffer 10.

At S2 time, all inputs to AND gate 550 (FIG. 7M) are also present, causing a force 1 signal on line 534 which causes the address one byte position advanced from the address in accumulator 236, the address at which the second byte of the function is to be stored, to be applied to adder output line 576. At S4 time, AND gate 798 (FIG. 7P) is fully conditioned to generate an output signal on line 794 which is applied to condition gate 786 to pass this address to accumulator 236. At the end of S7 time, the second byte of the function is applied to ICOMP register 102 and at the following S2 time, this byte is stored in buffer 10 at the address stored in accumulator 236. At S2 time, a force 1 operation is again performed and at S4 time, the new function address stored in accumulator 236. This sequence of operations continues, with succeeding bytes of the function derived from either the drum or the photostore, depending on whether the DRO trigger is in its ON or its OFF state, being stored in output region 15 of buffer 10, until an $\alpha 1$–$\alpha 2$ character combination is detected in SCAN register 74.

The detection of an $\alpha 1$–$\alpha 2$ character combination in SCAN register 74 causes $\alpha 1$–$\alpha 2$ trigger 1014 to be set to its 1 state. At the following resetting of clock 199, the $\alpha 1$ character is transferred into the DCON register, the last character of the function into the TCOMP register and the next to the last character of the function into the ICOMP register. Referring to FIG. 5E, it can be seen that if this is the last entry of the integral input, the next to the last character of the function is the special character $\phi$. Such a character would appear in the function for a terminal type punctuation such as, for example, a period or a question mark. At S3 time, the presence of the character $\phi$ in ICOMP register 102 fully conditions AND gate 1882 (FIG. 7Z) to generate an output signal on line 1880 which is applied to set FI trigger 1838 to its 1 state. If there is no $\phi$ character in the next to the last byte position of the function entry, the FI trigger remains in its OFF state. At the following S5 time, AND gate 1850 (FIG. 7S) is fully conditioned to generate an output signal on line 1848 which is applied to switch BC trigger 1836 to its 1 state. At S6 time, all inputs to AND gate 2090 (FIG. 7BB) are present, causing an output signal on line 2088 which conditioned EE trigger 2032 to be switched to its 1 state. At the end of S7 time, the $\alpha 2$ character is switched into DCON register 482, the $\alpha 1$ character of the function is transferred into TCOMP register 88, and the last character of the function is transferred into ICOMP register 102. At S4 time, AND gate 624 (FIG. 7E) is fully conditioned to cause the address stored in the accumulator, the address at which the function byte is to be stored, to be transferred into FIR. At S5 time, all inputs to AND gate 2062 (FIG. 7AA) are present, causing an output signal on line 2060 which is applied to reset RD trigger 2028 to its 0 state. At S4 time of the following cycle, all inputs to AND gate 1941 (FIG. 7DD) are present, causing an output signal on line 1939 which is applied to set NS trigger 1842 to its 1 state. At S5 time, if the FI trigger is in its ON state, all inputs to AND gate 2102 (FIG. 7DD) are present, causing an output signal on line 2100 which is applied to set NE trigger 2034 to its 1 state. If the FI trigger has not been set to its 1 state prior to this, NE trigger 2034 remains in is 0 state. If the NE trigger is set to its ON state, at S6 time, all inputs to AND gate 1705 (FIG. 7DD) are present, causing an output signal on line 1703 which is applied to reset, among others, NS trigger 1842 and RRP trigger 1298. This inhibits further operations of the circuit and indicates the end of an integral search. If, on the other hand, FI trigger 1838 is previously set so that the NE trigger remains in its 0 state, at S7 time, NS trigger 1842 is still in its 1 state, fully conditioning AND gate 1308 (FIG. 7V) to generate an output signal on line 1306 which is applied to set PRESCAN trigger 1312 to its 1 state. The setting of PRESCAN trigger 1312 to its 1 state, conditions the circuit to begin a new integral search for a new matching entry starting with the input entry whose address is stored in IIR34 at this time. The manner in which the address of the next input entry to be matched on is stored in this register has been previously described.

Referring to FIG. 5E, it is seen that during the read-out operation, one other possible situation may arise. This occurs when the special character $\mu$ is detected first in TCOMP register 88 and then in a read-out operation. When the $\mu$ character is detected in TCOMP register 88, AND gate 625 (FIG. 7E) is fully conditioned to generate an output signal on line 622 which conditions gate 582 (FIG. 7N) to store the address in FIR the address in the output region at which the next character is to be stored which address is presently in the accumulator. When the $\mu$ character is in ICOMP register 102, the resulting output signal on line 1147 from $\mu$ detector AND gate 1137 (FIG. 7B) is applied to fully condition AND gate 1980 (FIG. 7U) at S1 time to generate an output signal on line 1978 which is applied to set RP trigger 1974 to its 1 state. At S4 time, all inputs to AND gate 866 (FIG. 7G) are present, causing an output signal which is applied to condition gate 850 to pass the address in PIR register 854 to accumulator 236. At S5 time, all inputs to AND gate 1998 (FIG. 7BB) are present fully conditioning this AND gate to generate an output signal on line 1994 which is applied to set P trigger 1976 to its 1 state. At the following S2 time when the first prefix character following the special character $\mu$ is in ICOMP register 102, AND gates 256 and 292 are again conditioned to cause the character to be applied to MDR24. From MDR, this character is stored in the first address of the prefix region in a manner the same as that for the normal function characters. The following characters are stored in the prefix region of buffer 10 in a manner identical to the manner in which succeeding characters were stored in the output region thereof. However, when the $\alpha 1$ character reaches TCOMP register 88, it causes AND gate 2084 (FIG. 7BB) to be conditioned to fully condition 2074 at S6 time. This causes SE trigger 2030 to be set to its 1 state. AND gate 290 (FIG. 7H) is therefore fully conditioned during the next clock cycle to cause the $\alpha 1$ character to be stored in the prefix region of memory 10.

As was indicated in the introductory portions of this discussion, the circuit shown in FIGS. 7A–7EE has the capacity to perform certain limited logic operations during a search. In the discussion so far, it has been assumed that whenever the contents of table region 13, input region 14, or prefix region 16, of buffer 10 are being compared against themselves or against characters from photostore 66, the comparisons were on successive characters from each of the storage elements. As a result, a force 1 operation was performed after each match to bring the next character from buffer 10 into the appropriate one of the registers to be applied to either upper comparator 108 or lower comparator 112. The universal character $\nu$ was used to effect any necessary masking.

However, the circuit has the capacity to perform discontinuous searches. For example, assume that during an integral search it is desired to match on two nonadjacent fields of a record, all other fields of the record being immaterial. To accomplish this, the character in photostore 66 following the last character of the first field which it is desired to match on is the special character $\delta$P. The character following a $\delta$N or $\delta$P character is always a numeral, the value of this numeral being equal to the number of byte positions which it is desired to jump. Therefore, for example, if it is desired to skip a single field in the record and the field is 10 bytes long, the character following the $\delta$ character is the coded equivalent of the numeral 10. Assuming that one of the conditions required to cause an output signal on line 568 from OR gate 570 (FIG. 7M) were present when the $\delta$P character is in ICOMP register 102, AND gate 566 is fully conditioned at S2 time to condition gate 562 to pass the character in TCOMP register 88, the numeral N, to true-complement circuit 494. The numeral applied to true-complement circuit 494 at this time is applied to one input of adder 490, the other input to this adder being the contents of accumulator 236. The resulting address on lines 576 is address 10 byte positions advanced from that previously stored in the accumulator. This address would be used in the operation being performed, the same as the address which would have been generated on lines 576 had a force 1 operation been performed.

An example of when a $\delta$N instruction might be employed is where after matching on a field of a record it is then desired to look back at a preceding field. The character following the last character matched on would then be the special character $\delta$N and the character following the $\delta$N would be a numeral, the value of which is equal to the number of byte positions it is desired to skip back. The detection of the $\delta$N character in ICOMP register 102 causes an output signal on line 1149 from $\delta$N detector AND gate 1139 (FIG. 7B) which is again applied to fully condition AND gate 566 (FIG. 7M) at S2 time. This causes gate 562 to be conditioned to pass the numeral character in TCOMP register 88 to the input of true-complement circuit 494. The signal on output line 1149 from ICOMP $\delta$N detector AND gate 1139 causes true-complement circuit 494 to be operating in its complement mode. The numeral applied to this circuit is therefore complemented and applied through lines 492 to one input of adder 490. As before, the contents of accumulator 236 are the other input to this adder. The resulting address applied to lines 576 is the desired address N byte positions behind that which was previously stored in the accumulator.

In a discussion so far, possible error conditions have more or less been ignored. It is possible that, due to programming or other errors, an attempt will be made to store a character in or to read a character from a region other than that which it should be stored in or read from in buffer 10. It is particularly important that input or output characters not be read into directory portion 12 and table portion 13 of buffer 10. To avoid this, boundary registers may be provided, indicating the permitted regions in which access to the buffer may be had during particular operations. If an attempt is made to access the buffer at an address outside of the indicated region, an error indication may be generated.

A second problem occurs when, after a drum sector search, there is a failure to verify during the verify operation. In the description so far, when this occurred, an error indication was generated. It is possible, however, to merely energize a trigger when this occurs and then make a second try to find the desired sector. If, after a second sector search, there is again a failure to verify, an error indication may then be generated.

While the invention has been particularly shown and described with reference to a preferred embodiment thereof, it will be understood by those skilled in the art that the foregoing and other changes in forms and details may be made therein without departing from the spirit and scope of the invention.

APPENDIX

A—Triggers

| Element No. and Letter Identifier | Output Line No. | Figure Element Appears in— | Elements Line Applied As Input to— | Figure in Which Element Attached to Appears | Function of Element Attached to— |
|---|---|---|---|---|---|
| AB-1278 | 1282(1) | 7X | AND 1785 | 7S | Set CU. |
| | | | AND 1798 | 7S | Reset CU. |
| | | | AND 1799 | 7S | Do. |
| | | | AND 1910 | 7T | Set ES. |
| | | | AND 2046 | 7AA | Set EA. |
| | | | AND 2194 | 7U | Step TR Counter 2170. |
| | | | AND 2179 | 7U | Reset TR Counter 2170. |
| | | | AND 2103 | 7DD | Set NE. |
| | | | AND 1964 | 7EE | Set REW. |
| | | | AND 1211 | 7C | Compare Condition for Upper Comparator. |
| | | | AND 964 | 7C | Set Highest Order Bit in ISCAN to 1. |
| AB-1278 | 1284(0) | 7X | AND 1694 | 7R | Set DRO. |
| | | | AND 1784 | 7S | Set CU. |
| | | | AND 1797 | 7S | Reset CU. |
| | | | AND 1882 | 7Z | Set FI. |
| | | | AND 1924 | 7T | Reset ES. |
| | | | AND 2044 | 7AA | Set EA. |
| | | | AND 1980 | 7U | Set RP. |
| | | | AND 1984 | 7U | Reset RP. |
| | | | AND 2000 | 7BB | Set P. |
| | | | AND 2116 | 7W | Reset FT. |
| | | | AND 2139 | 7DD | Reset ND. |
| | | | AND 1940 | 7DD | Set NS. |
| | | | AND 1213 | 7C | Compare Condition for Upper Comparator. |
| | | | AND 1222 | 7C | Compare Condition for Lower Comparator. |
| | | | AND 599 | 7D | Adder to ISR. |
| | | | AND 499 | 7D | Data Bus 338 to ISCAN. |
| | | | AND 616 | 7E | Adder to IIR. |
| | | | AND 640 | 7E | Adder to TSR. |
| | | | AND 703 | 7F | IIR to Accumulator. |
| | | | AND 711 | 7F | Do. |
| | | | AND 886 | 7F | PAR to Accumulator. |
| | | | AND 672 | 7G | ISR to Accumulator. |
| | | | AND 674 | 7G | Do. |
| | | | AND 258 | 7H | Memory Select. |
| | | | AND 2095 | 7BB | Set EE. |
| | | | AND 259 | 7H | Memory Select. |
| | | | AND 462 | 7K | TCON to TSCAN and Data Bus 338 to TCON. |
| | | | AND 574 | 7M | TCOMP to Adder. |
| | | | AND 554 | 7M | Force One. |
| | | | AND 553 | 7M | Do. |
| | | | AND 825 | 7N | TIR to Accumulator. |
| | | | AND 744 | 7P | TSR to Accumulator. |
| | | | AND 625 | 7E | Adder to FIR. |
| ABAR-1290 | 1294(1) | 7EE | AND 1695 | 7R | Set DRO. |
| | | | AND 2195 | 7U | Step TR Counter 2170. |
| | | | AND 1478 | 7W | Set ATS, Set FT, Set ND. |
| | | | AND 1454 | 7EE | Set ABIND. |
| | | | AND 1468 | 7EE | Reset ABIND. |
| | | | AND 1061 | 7B | DCON to TCOMP and TCOMP to ICOMP. |
| | | | AND 1208 | 7C | Compare Condition for Upper Comparator. |
| | | | OR 224 | 7E | Restart Clock. |
| | | | OR 270 | 7H | Memory Select. |
| | | | AND 481 | 7K | Data Bus 338 to DCON. |
| | | | AND 926 | 7K | PAR to ISCAN. |
| | | | AND 548 | 7M | Force One. |
| | | | AND 796 | 7P | Adder to Accumulator. |
| | | | AND 1723 | 7R | Set SS. |
| | | | AND 1724 | 7R | Do. |
| ABAR-1290 | 1296(0) | 7EE | AND 1739 | 7R | Reset SS. |
| ABIND-1288 | 1292(1) | 7EE | AND 2192 | 7U | Step TR Counter 2170. |
| | | | AND 2178 | 7U | Reset TR Counter 2170. |
| | | | OR 1414 | 7W | Set MARK. |
| | | | OR 2148 | 7X | Reset DIRABS. |
| | | | OR 2152 | 7EE | Set ABAR. |
| | | | AND 1077 | 7B | Reset ICOMP, TCOMP and DCON to $\epsilon$. |
| | | | OR 404 | 7D | Data Bus 338 to DAR. |
| | | | OR 224 | 7E | Restart Clock. |
| | | | OR 270 | 7H | Memory Select. |
| | | | OR 528 | 7M | Force Six. |
| | | | OR 374 | 7N | Data Bus 338 to TIR. |
| | | | AND 797 | 7P | Adder to Accumulator. |
| | | | AND 826 | 7N | TIR to Accumulator. |
| AD-1562 | 1592(1) | 7Z | OR 1584 | 7Z | Reset BD. |
| | | | AND 1520 | 7T | Set AT. |
| | | | AND 1908 | 7T | Set ES. |
| | | | AND 1603 | 7AA | Set DC. |
| AT-1510 | 78(1) | 7T | OR 1788 | 7S | Reset CU. |
| | | | OR 2120 | 7W | Reset FT. |
| | | | AND 1953 | 7DD | Reset NS. |
| | | | Photostore 66 | 7A | Advance Track. |
| | | | OR 1550 | 7J | Transfer Single-Shot to Unstable State. |

APPENDIX—*Continued*

A—Triggers

| Element No. and Letter Identifier | Output Line No. | Figure Element Appears in— | Elements Line Applied As Input to— | Figure in Which Element Attached to Appears | Function of Element Attached to— |
|---|---|---|---|---|---|
| AT-1510 | 1551(0) | 7T | AND 1910<br>AND 1490<br>AND 1022<br>AND 216 | 7T<br>7W<br>7A<br>7E | Set ES.<br>Set FT.<br>SCAN register to DCON.<br>Restart Clock. |
| ATS-1484 | 1492(1) | 7W | AND 1721<br>AND 1521<br>AND 1910<br>AND 1527<br>AND 1490<br>AND 2115<br>AND 1940<br>AND 1209<br>AND 1406<br>AND 1094<br>AND 111<br>AND 910<br>AND 1214 | 7R<br>7T<br>7T<br>7T<br>7W<br>7W<br>7DD<br>7C<br>7E<br>7I<br>7I<br>7K<br>7C | Set SS.<br>Set AT.<br>Set ES.<br>Set BT.<br>Set FT.<br>Reset FT.<br>Set NS.<br>Compare Condition for Upper Comparator.<br>Restart Clock.<br>PTR to ICOMP.<br>PTA to PTR.<br>PAR to ISCAN.<br>Compare Condition for Upper Comparator. |
| ATS-1484 | 2130(0) | 7W | AND 1776<br>AND 964 | 7S<br>7C | Set CU.<br>Set Highest Order Bit in ISCAN to 1. |
| BC-1836 | 1872(1) | 7S | AND 1814<br>AND 2090<br>AND 825<br>AND 2095 | 7S<br>7BB<br>7N<br>7BB | Set CL.<br>Set EE.<br>TIR to Accumulator.<br>Set EE. |
| BC-1836 | 1874(0) | 7S | AND 1776<br>AND 1222<br>AND 711<br>AND 462<br>AND 744 | 7S<br>7C<br>7F<br>7K<br>7P | Set CU.<br>Compare Condition for Lower Comparator.<br>IIR to Amccuulator.<br>TCON to TSCAN and Data Bus 338 to TCON.<br>TSR to Accumulator. |
| BD-1560 | 1590(1) | 7Z | AND 1624<br>AND 1526<br>AND 1602 | 7Z<br>7T<br>7AA | Set AD.<br>Set BT.<br>Set DC. |
| BT-1512 | 80(1) | 7T | OR 1788<br>AND 1926<br>OR 2120<br>AND 1952<br>Photostore 66<br>True Complement Ckt.<br>OR 1550<br>AND 1952 | 7S<br>7T<br>7W<br>7DD<br>7A<br>7I<br>7J<br>7DD | Reset CU.<br>Reset ES.<br>Reset FT.<br>Reset NS.<br>Back Track.<br>Complement Input.<br>Transfer Single-Shot to Unstable State.<br>Reset NS. |
| BT-1512 | 1553(0) | 7T | AND 1910<br>AND 1022<br>AND 216 | 7T<br>7A<br>7E | Set ES.<br>SCAN Register to DCON.<br>Restart Clock. |
| CDS-1684 | 1756(1) | 7R | AND 1754<br>AND 1080<br>AND 1210<br>AND 958<br>AND 221<br>AND 1760 | 7R<br>7A<br>7C<br>7D<br>7E<br>7Y | Reset CDS.<br>DSC to ICOMP.<br>Compare Condition for Upper Comparator.<br>DAR to ISCAN.<br>Restart Clock.<br>Set SECTMATCH. |
| CL-1772 | 1832(1) | 7S | AND 1694<br>AND 1644<br>AND 1647<br>AND 1662<br>AND 1671<br>AND 1796<br>AND 1868<br>AND 1776<br>AND 1893<br>AND 1222<br>AND 599<br>AND 640<br>AND 711<br>AND 259<br>AND 462<br>AND 553<br>AND 825<br>AND 744 | 7R<br>7Y<br>7Y<br>7Y<br>7Y<br>7S<br>7S<br>7S<br>7Z<br>7C<br>7D<br>7E<br>7F<br>7H<br>7K<br>7M<br>7N<br>7P | Set DRO.<br>Set TH.<br>Do.<br>Set TL.<br>Do.<br>Reset CU.<br>Reset BC.<br>Set CU.<br>Set FI.<br>Compare Condition for Lower Comparator.<br>Adder to ISR.<br>Adder to TSR.<br>IIR Accumulator.<br>Memory Select.<br>TCON to TSCAN and Data Bus 338 to TCON.<br>Force One.<br>TIR to Accumulator.<br>TRS to Accumulator. |
| CL-1772 | 1834(0) | 7S | AND 1645<br>AND 1676<br>OR 1659<br>OR 1804<br>OR 456<br>OR 1218<br>OR 678 | 7Y<br>7Y<br>7Y<br>7S<br>7D<br>7C<br>7G | Set TH.<br>Reset TL.<br>Reset TH.<br>Reset CU.<br>Data Bus 338 to ISCAN.<br>Compare Condition for Upper Comparator.<br>ISR to Accumulator. |
| CU-1770 | 1808(1) | 7S | AND 2044<br>AND 2045<br>AND 2046<br>AND 2193<br>AND 2179 | 7AA<br>7AA<br>7AA<br>7U<br>7U | Set EA.<br>Do.<br>Do.<br>Step TR Counter 2170.<br>Reset TR Counter 2170. |

APPENDIX—*Continued*

A—Triggers

| Element No. and Letter Identifier | Output Line No. | Figure Element Appears in— | Elements Line Applied As Input to— | Figure in Which Element Attached to Appears | Function of Element Attached to— |
|---|---|---|---|---|---|
| CU-1770—*Cont* | 1808(1) | 78 | AND 2194 | 7U | Step TR Counter 2170. |
| | | | AND 2000 | 7BB | Set P. |
| | | | AND 1964 | 7EE | Set REW. |
| | | | AND 1211 | 7C | Compare Condition for Upper Comparator. |
| | | | AND 2095 | 7BB | Set EE. |
| | | | AND 1213 | 7C | Compare Condition for Upper Comparator. |
| | | | AND 964 | 7C | Set Highest Order Bit in ISCAN to 1. |
| | | | AND 957 | 7D | DAR to ISCAN. |
| | | | AND 599 | 7D | Adder to ISR. |
| | | | AND 449 | 7D | Data Bus 338 to ISCAN. |
| | | | AND 616 | 7E | Adder to IIR. |
| | | | AND 703 | 7F | IIR to Accumulator. |
| | | | AND 672 | 7G | ISR to Accumulator. |
| | | | AND 674 | 7G | Do. |
| | | | AND 258 | 7H | Memory Select. |
| | | | AND 927 | 7K | PAR to ISCAN. |
| | | | AND 574 | 7M | TCOMP to Adder. |
| | | | AND 554 | 7M | Force One. |
| | | | AND 1661 | 7Y | Set TL. |
| CU-1770 | 1810(0) | 7S | AND 1893 | 7Z | Set FI. |
| | | | AND 711 | 7F | IIR to Accumulator. |
| DC-1558 | 1594(1) | 7AA | AND 1624 | 7Z | Set AD. |
| | | | AND 1904 | 7T | Set ES. |
| DC-1558 | 1595(0) | 7AA | AND 1520 | 7T | Set AT. |
| DIRABS-1280 | 1286(1) | 7X | AND 1729 | 7R | Set SS. |
| | | | AND 1410 | 7W | Set MARK. |
| | | | AND 1434 | 7W | Set ATS. |
| | | | AND 1450 | 7EE | Set ABIND. |
| | | | OR 224 | 7E | Restart Clock. |
| | | | AND 885 | 7F | PAR to Accumulator. |
| | | | OR 270 | 7H | Memory Select. |
| | | | AND 369 | 7N | Data Bus 338 to TIR. |
| DRO-1680 | 1708(1) | 7R | AND 1749 | 7R | Set CDS. |
| | | | AND 1750 | 7R | Set CDS. |
| | | | AND 1760 | 7Y | Set SECTMATCH. |
| | | | AND 1764 | 7Y | Reset SECTMATCH. |
| | | | OR 1780 | 7S | Set CU. |
| | | | AND 1924 | 7T | Reset ES. |
| | | | AND 1909 | 7T | Set ES. |
| | | | AND 2045 | 7AA | Set EA. |
| | | | AND 2116 | 7W | Reset FT. |
| | | | AND 2139 | 7DD | Reset ND. |
| | | | OR 2164 | 7EE | Reset ABAR. |
| | | | AND 992 | 7A | Drum Data to SCAN Register. |
| | | | AND 998 | 7A | Drum Clock to SCAN Register. |
| | | | AND 1080 | 7A | DSC to ICOMP. |
| | | | AND 1210 | 7C | Compare Condition for Upper Comparator. |
| | | | AND 957 | 7D | DAR to ISCAN. |
| | | | AND 615 | 7E | Adder to IIR. |
| | | | AND 1402 | 7E | Restart Clock. |
| | | | AND 886 | 7F | PAR to Accumulator. |
| DRO-1680 | 1710(0) | 7R | AND 1644 | 7Y | Set TH. |
| | | | AND 1645 | 7Y | Do. |
| | | | AND 1646 | 7Y | Do. |
| | | | AND 1647 | 7Y | Do. |
| | | | AND 1676 | 7Y | Reset TL. |
| | | | AND 1663 | 7Y | Set TL. |
| | | | AND 1662 | 7Y | Do. |
| | | | AND 1664 | 7Y | Do. |
| | | | AND 974 | 7A | Photostore Clock to SCAN Register. |
| | | | AND 970 | 7A | Photostore to SCAN Register. |
| | | | AND 711 | 7F | IRR to Accumulator. |
| EA-2026 | 2052(1) | 7AA | AND 1925 | 7T | Reset ES. |
| | | | AND 2058 | 7AA | Set RD. |
| | | | AND 2013 | 7BB | Reset P. |
| | | | AND 616 | 7E | Adder to IIR. |
| | | | AND 726 | 7P | FIR to Accumulator. |
| EA-2026 | 2054 (0) | 7AA | AND 599 | 7D | Adder to ISR. |
| | | | AND 449 | 7D | Data Bus 338 to ISCAN. |
| | | | AND 674 | 7G | ISR to Accumulator. |
| | | | AND 258 | 7H | Memory Select. |
| | | | AND 574 | 7M | TCOMP to Adder. |
| | | | AND 554 | 7M | Force One. |
| | | | AND 1909 | 7T | Set ES. |
| | | | AND 1941 | 7DD | Set NS. |
| EE-2032 | 2092 (1) | 7BB | AND 1704 | 7R | Reset DRO. |
| | | | AND 1764 | 7Y | Reset SECTMATCH. |
| | | | AND 1869 | 7S | Reset BC. |
| | | | AND 2062 | 7AA | Reset RD. |
| | | | AND 2114 | 7W | Reset FT. |
| | | | AND 2138 | 7DD | Reset ND. |
| | | | AND 2103 | 7DD | Set NE. |
| | | | AND 2102 | 7DD | Do. |
| | | | AND 1941 | 7DD | Set NS. |
| | | | AND 624 | 7E | Adder to FIR. |

APPENDIX—*Continued*

A—Triggers

| Element No. and Letter Identifier | Output Line No. | Figure Element Appears in— | Elements Line Applied As Input to— | Figure in Which Element Attached to Appears | Function of Element Attached to— |
|---|---|---|---|---|---|
| EE-2032—*Cont.* | 2092 (1) | 7BB | AND 869 | 7G | PIR to Accumulator. |
| | | | AND 267 | 7H | Memory Select. |
| | | | AND 290 | 7H | Store. |
| | | | AND 2016 | 7BB | Reset P. |
| | | | AND 2085 | 7BB | Set SE. |
| EE-2032 | 2094 (0) | 7BB | AND 1721 | 7R | Set SS. |
| | | | AND 1893 | 7Z | Reset FI. |
| | | | AND 2015 | 7BB | Reset P. |
| | | | AND 599 | 7D | Adder to ISR. |
| | | | AND 701 | 7F | IIR to Accumulator. |
| | | | AND 673 | 7G | ISR to Accumulator. |
| | | | AND 1112 | 7I | PTA to PTR. |
| | | | AND 2058 | 7AA | Set RD. |
| ES-1870 | 1930 (1) | 7T | AND 1694 | 7R | Set DRO. |
| | | | AND 1644 | 7Y | Set TH. |
| | | | AND 1647 | 7Y | Do. |
| | | | AND 1662 | 7Y | Set TL. |
| | | | AND 1664 | 7Y | Do. |
| | | | AND 1785 | 7S | Set CU. |
| | | | AND 1796 | 7S | Reset CU. |
| | | | OR 1856 | 7S | Set BC. |
| | | | OR 1632 | 7Z | Reset AD. |
| | | | AND 2044 | 7AA | Set EA. |
| | | | AND 2045 | 7AA | Do. |
| | | | OR 2079 | 7BB | Set SE. |
| | | | AND 2128 | 7W | Reset ATS. |
| | | | AND 1964 | 7EE | Set REW. |
| | | | AND 1033 | 7A | SCAN Register to DCON. |
| | | | AND 1064 | 7B | DCON to TCOMP and TCOMP to ICOMP. |
| | | | AND 1222 | 7C | Compare Condition for Lower Comparator. |
| | | | AND 616 | 7E | Adder to IIR. |
| | | | AND 640 | 7E | Adder to TSR. |
| | | | AND 225 | 7E | Restart Clock. |
| | | | AND 259 | 7H | Memory Select. |
| | | | AND 462 | 7K | TCON to TSCAN and Data Bus 338 to TCON. |
| | | | AND 925 | 7K | PAR to ISCAN. |
| | | | AND 553 | 7M | Force One. |
| | | | AND 825 | 7N | TIR to Accumulator. |
| | | | AND 744 | 7P | TSR to Accumulator. |
| ES-1870 | 1932 (0) | 7T | AND 1646 | 7Y | Set TH. |
| | | | OR 1667 | 7Y | Set TL. |
| | | | OR 1670 | 7Y | Reset TL. |
| | | | OR 1659 | 7Y | Reset TH. |
| | | | OR 1804 | 7S | Reset CU. |
| | | | OR 456 | 7D | Data Bus 338 to ISCAN. |
| | | | OR 1218 | 7C | Compare Condition for Upper Comparator. |
| | | | OR 678 | 7G | ISR to Accumulator. |
| | | | AND 1661 | 7Y | Set TL. |
| FI-1838 | 1896(1) | 7Z | AND 1721 | 7R | Set SS. |
| | | | AND 1830 | 7S | Reset CL. |
| | | | AND 1867 | 7S | Reset BC. |
| | | | AND 1785 | 7S | Set CU. |
| | | | AND 1910 | 7T | Set ES. |
| | | | AND 2194 | 7U | Step TR Counter 2170. |
| | | | AND 2102 | 7DD | Set NE. |
| | | | AND 1940 | 7DD | Set NS. |
| | | | AND 1112 | 7I | PTA or PTR. |
| | | | AND 1214 | 7C | Compare Condition for Upper Comparator. |
| FI-1838 | 1898(0) | 7Z | AND 1784 | 7S | Set CU. |
| | | | AND 711 | 7F | IIR to Accumulator. |
| FT-1500 | 1504(1) | 7W | OR 1856 | 7S | Set BC. |
| | | | AND 1556 | 7Z | Set BD. |
| | | | AND 1620 | 7Z | Set AD. |
| | | | AND 1893 | 7Z | Set FI. |
| | | | AND 1910 | 7T | Set ES. |
| | | | OR 2079 | 7BB | Set SE. |
| | | | AND 1940 | 7DD | Set NS. |
| | | | AND 1032 | 7A | SCAN Register to DCON. |
| | | | AND 1063 | 7B | DCON to TCOMP and TCOMP to ICOMP. |
| | | | OR 225 | 7E | Restart Clock. |
| | | | AND 1112 | 7I | PTA to PTR. |
| | | | AND 1214 | 7C | Compare Condition for Upper Comparator. |
| FT-1500 | 1506(0) | 7W | AND 1209 | 7C | Compare Condition for Upper Comparator. |
| | | | AND 1094 | 7I | PTR to ICOMP. |
| | | | AND 1111 | 7I | Do. |
| INPARG-1368 | 1366(1) | 7CC | AND 1342 | 7V | Set INTX 1. |
| | | | AND 752 | 7CC | Set INTARG. |
| | | | OR 1354 | 7CC | Reset INTARG. |
| | | | AND 756 | 7CC | Set INTX 2. |
| | | | AND 1212 | 7C | Compare Condition for Upper Comparator. |
| | | | AND 601 | 7D | Adder to ISR. |
| | | | AND 598 | 7D | Do. |
| | | | AND 451 | 7D | Data Bus 338 to ISCAN. |

APPENDIX—*Continued*

A—Triggers

| Element No. and Letter Identifier | Output Line No. | Figure Element Appears in— | Elements Line Applied As Input to— | Figure in Which Element Attached to Appears | Function of Element Attached to— |
|---|---|---|---|---|---|
| INPARG-1368—*Cont* | 1366(1) | 7CC | OR 224 | 7E | Restart Clock. |
| | | | AND 705 | 7F | IIR to Accumulator. |
| | | | OR 270 | 7H | Memory Select. |
| | | | OR 570 | 7M | TCOMP to Adder. |
| | | | AND 552 | 7M | Force One. |
| | | | AND 822 | 7N | TIR to Accumulator. |
| | | | AND 2015 | 7BB | Reset P. |
| INTARG-1364 | 1376(1) | 7CC | AND 1340 | 7V | Set INTX 1. |
| | | | AND 1378 | 7V | Reset INTX 1. |
| | | | AND 675 | 7CC | Set INPARG. |
| | | | AND 1380 | 7CC | Reset INPARG. |
| | | | AND 1062 | 7B | DCON to TCOMP and TCOMP to ICOMP. |
| | | | AND 641 | 7E | Adder to TSR. |
| | | | ORD 224 | 7E | Restart Clock. |
| | | | OR 270 | 7H | Memory Select. |
| | | | AND 482 | 7K | Data Bus 338 to DCON. |
| | | | AND 523 | 7M | Force Six. |
| | | | AND 549 | 7M | Force One. |
| | | | AND 823 | 7N | TIR to Accumulator. |
| | | | AND 743 | 7P | TSR to Accumulator. |
| INTDIR-1322 | 1324(1) | 7V | AND 1328 | 7V | Set INTX 1. |
| | | | AND 1326 | 7V | Reset PRESCAN. |
| | | | OR 224 | 7E | Restart Clock. |
| | | | OR 270 | 7H | Memory Select. |
| | | | OR 374 | 7N | Data Bus 338 to TIR. |
| | | | AND 824 | 7N | TIR to Accumulator. |
| INTX 1-1346 | 1348(1) | 7V | AND 1999 | 7BB | Set P. |
| | | | AND 1350 | 7V | Reset INTDIR. |
| | | | AND 1352 | 7CC | Set INTARG. |
| | | | OR 1354 | 7CC | Reset INTARG. |
| | | | OR 1414 | 7W | Set MARK. |
| | | | AND 1428 | 7W | Reset MARK. |
| | | | AND 1075 | 7B | Reset ICOMP, TCOMP and DCON to ε. |
| | | | AND 600 | 7D | Adder to ISR. |
| | | | OR 404 | 7D | Data Bus 338 to DAR. |
| | | | AND 639 | 7E | Adder to TSR. |
| | | | OR 224 | 7E | Restart Clock. |
| | | | AND 706 | 7F | IIR to Accumulator. |
| | | | AND 867 | 7G | PIR to Accumulator. |
| | | | OR 270 | 7H | Memory Select. |
| | | | OR 528 | 7M | Force Six. |
| | | | OR 374 | 7N | Data Bus 338 to TIR. |
| | | | AND 745 | 7P | TSR to Accumulator. |
| | | | AND 1391 | 7CC | Reset INPARG. |
| INTX 2-1394 | 1392(1) | 7CC | AND 1390 | 7CC | Reset INPARG. |
| | 1393(0) | | AND 1396 | 7W | Set ATS, Set FT, Set ND. |
| | | | AND 386 | 7L | Data Bus 338 to PAR. |
| | | | OR 374 | 7N | Data Bus 338 to TIR. |
| | | | AND 1725 | 7R | Set SS. |
| | | | AND 1939 | 7R | Set SS. |
| MARK-1424 | 1430(1) | 7W | AND 1729 | 7R | Set SS. |
| | | | AND 1432 | 7W | Set ATS, Set FT, Set ND. |
| | | | AND 1434 | 7W | Set ATS, Set FT, Set ND, Reset ABIND. |
| | | | AND 1723 | 7R | Set SS. |
| MARK-1424 | 1440(0) | 7W | AND 1694 | 7R | Set DRO. |
| | | | AND 1749 | 7R | Set CDS. |
| | | | AND 1796 | 7S | Reset CU. |
| | | | AND 1924 | 7T | Reset ES. |
| | | | AND 2116 | 7W | Reset FT. |
| | | | AND 2139 | 7DD | Reset ND. |
| | | | AND 1442 | 7EE | Set ABIND. |
| | | | AND 615 | 7E | Adder to IIR. |
| | | | AND 1402 | 7E | Restart Clock. |
| | | | AND 886 | 7F | PAR to Accumulator. |
| ND-1498 | 1502(1) | 7DD | AND 1694 | 7R | Set DRO. |
| | | | AND 1799 | 7S | Reset CU. |
| | | | AND 1797 | 7S | Do. |
| | | | AND 1910 | 7T | Set ES. |
| | | | AND 2046 | 7AA | Set EA. |
| | | | AND 2194 | 7U | Step TR Counter 2170. |
| | | | AND 2000 | 7BB | Set P. |
| | | | AND 2016 | 7BB | Reset P. |
| | | | AND 1940 | 7DD | Set NS. |
| | | | OR 2148 | 7X | Reset DIR ABS. |
| | | | OR 2164 | 7EE | Reset ABAR. |
| | | | AND 1964 | 7EE | Set REW. |
| | | | AND 449 | 7D | Data Bus 338 to ISAN. |
| | | | AND 1213 | 7C | Compare Condition for Upper Comparator. |
| | | | AND 964 | 7C | Set Highest Order Bit in ISCAN to 1. |
| | | | AND 1222 | 7C | Compare Condition for Lower Comparator. |
| | | | AND 599 | 7D | Adder to ISR. |
| | | | AND 616 | 7E | Adder to IIR. |
| | | | AND 640 | 7E | Adder to TSR. |
| | | | AND 703 | 7F | IIR to Accumulator. |
| | | | AND 711 | 7F | Do. |
| | | | AND 886 | 7F | PAR to Accumulator. |
| | | | AND 672 | 7G | ISR to Accumulator. |
| | | | AND 674 | 7G | Do. |
| | | | AND 258 | 7H | Memory Select. |

APPENDIX—*Continued*

A—Triggers

| Element No. and Letter Identifier | Output Line No. | Figure Element Appears in— | Elements Line Applied As Input to— | Figure in Which Element Attached to Appears | Function of Element Attached to— |
|---|---|---|---|---|---|
| ND-1498—*Cont* | 1502(1) | 7DD | AND 259 | 7H | Do. |
| | | | AND 462 | 7K | TCON to TSCAN and Data Bus 338 to TCON. |
| | | | AND 574 | 7M | TCOMP to Adder. |
| | | | AND 554 | 7M | Force One. |
| | | | AND 553 | 7M | Do. |
| | | | AND 825 | 7N | TIR to Accumulator. |
| | | | AND 744 | 7P | TSR to Accumulator. |
| NE 2034 | 2106(1) | 7DD | AND 1705 | 7DD | Reset DRO. |
| | | | AND 1870 | 7S | Reset BC. |
| | | | AND 1892 | 7Z | Reset FI. |
| | | | AND 1927 | 7T | Reset ES. |
| | | | AND 2009 | 7BB | Reset P. |
| | | | AND 1705 | 7DD | Reset EE, NS, FT, AB, RRPI, DRO. |
| | | | AND 1968 | 7EE | Reset REW. |
| NS 1842 | 1956(1) | 7DD | AND 1704 | 7R | Reset DRO. |
| | | | AND 1721 | 7R | Set SS. |
| | | | AND 1738 | 7R | Reset SS. |
| | | | ND 1584 | 7Z | Reset BD. |
| | | | AND 1620 | 7Z | Set AD. |
| | | | AND 1632 | 7Z | Reset AD. |
| | | | AND 1308 | 7V | Set PRESCAN. |
| | | | AND 2114 | 7W | Reset FT. |
| | | | AND 2129 | 7W | Reset ATS. |
| | | | AND 2138 | 7DD | Reset ND. |
| | | | AND 2102 | 7DD | Set NE. |
| | | | AND 701 | 7F | IIR to Accumulator. |
| | | | AND 673 | 7G | ISR to Accumulator. |
| | | | AND 869 | 7G | PIR to Accumulator. |
| | | | AND 652 | 7L | Adder to PAR. |
| | | | AND 1566 | 7Z | Set BD. |
| NS-1842 | 1958(0) | 7DD | AND 1739 | 7R | Reset SS. |
| | | | AND 267 | 7H | Memory Select. |
| | | | AND 2085 | 7BB | Set SE. |
| P-1976 | 2022(1) | 7BB | AND 2084 | 7BB | Set SE. |
| | | | AND 2015 | 7BB | Reset P. |
| | | | AND 697 | 7CC | Set INPARG. |
| | | | AND 601 | 7D | Adder to ISR. |
| | | | AND 701 | 7F | IIR to Accumulator. |
| | | | AND 705 | 7F | Do. |
| | | | AND 867 | 7G | PIR to Accumulator. |
| | | | AND 551 | 7M | Force One. |
| | | | AND 703 | 7F | IIR to Accumulator. |
| | | | AND 2016 | 7BB | Reset P. |
| P-1976 | 2024(0) | 7BB | AND 616 | 7E | Adder to IIR. |
| | | | AND 706 | 7F | IIR to Accumulator. |
| | | | AND 673 | 7G | ISR to Accumulator. |
| | | | AND 823 | 7N | TIR to Accumulator. |
| PRESCAN-1312 | 1314(1) | 7V | AND 1316 | 7V | Set INTDIR. |
| | | | AND 1954 | 7DD | Reset NS. |
| | | | AND 450 | 7D | Data Bus 338 to ISCAN. |
| | | | OR 224 | 7E | Restart Clock. |
| | | | AND 894 | 7F | ISCAN to Accumulator. |
| | | | OR 270 | 7H | Memory Select. |
| RD-2028 | 2064(1) | 7AA | AND 1850 | 7S | Set BC. |
| | | | AND 1882 | 7Z | Set FI. |
| | | | AND 1998 | 7BB | Set P. |
| | | | AND 2079 | 7BB | Set SE. |
| | | | AND 1034 | 7A | Scan Register to DCON. |
| | | | AND 1065 | 7B | DCON to TCOMP and TCOMP to ICOMP. |
| | | | AND 624 | 7E | Adder to FIR. |
| | | | AND 225 | 7E | Restart Clock. |
| | | | AND 866 | 7G | PIR to Accumulator. |
| | | | OR 266 | 7H | Memory Select. |
| | | | AND 292 | 7H | Store. |
| | | | AND 550 | 7M | Force One. |
| | | | OR 570 | 7M | TCOMP to Adder. |
| | | | AND 798 | 7P | Adder to Accumulator. |
| | | | AND 625 | 7E | Adder to FIR. |
| | | | AND 2090 | 7BB | Set EE. |
| RD-2028 | 2066(0) | 7AA | AND 1764 | 7Y | Reset SECTMATCH. |
| | | | AND 1893 | 7Z | Reset FI. |
| | | | AND 1980 | 7U | Set RP. |
| | | | AND 2016 | 7BB | Reset P. |
| | | | AND 1941 | 7DD | Set NS. |
| | | | AND 1112 | 7I | PTA to PTR. |
| | | | AND 1909 | 7T | Set ES. |
| REW-1960 | 1970(1) | 7EE | AND 2046 | 7AA | Set EA. |
| REW-1960 | 1972(0) | 7EE | AND 1964 | 7EE | Set REW. |
| | | | AND 964 | 7C | Set Highest Order Bit in ISCAN to 1. |
| RP-1974 | 1986(1) | 7U | AND 1998 | 7BB | Set P. |
| | | | AND 2000 | 7BB | Do. |
| | | | AND 1999 | 7BB | Do. |
| | | | AND 865 | 7F | IIR to Accumulator. |
| | | | AND 866 | 7G | PIR to Accumulator. |
| | | | AND 868 | 7G | Do. |
| | | | AND 869 | 7G | Do. |

APPENDIX—*Continued*

A—Triggers

| Element No. and Letter Identifier | Output Line No. | Figure Element Appears in— | Elements Line Applied As Input to— | Figure in Which Element Attached to Appears | Function of Element Attached to— |
|---|---|---|---|---|---|
| RP-1974 | 1988(0) | 7U | AND 624 | 7E | Adder to FIR. |
| | | | AND 702 | 7F | IIR to Accumulator. |
| | | | AND 704 | 7F | Do. |
| | | | OR 802 | 7P | Adder to Accumulator. |
| | | | AND 625 | 7E | Adder to FIR. |
| RRPI-1298 | 1305(1) | 7X | AND 1749 | 7R | Set CDS. |
| | | | AND 624 | 7E | Adder to FIR. |
| SE-2030 | 2086(1) | 7BB | AND 256 | 7H | Memory Select. |
| | | | AND 290 | 7H | Store. |
| | | | AND 292 | 7H | Do. |
| SE-2030 | 2087(0) | 7BB | AND 1980 | 7U | Set RP. |
| SS-1682 | 1742(1) | 7R | AND 1750 | 7R | Set CDS. |
| | | | AND 673 | 7G | ISR to Accumulator. |
| | | | AND 652 | 7L | Adder to PAR. |
| SS-1682 | 1743(0) | 7R | AND 1022 | 7A | SCAN Register to DCON. |
| | | | AND 1210 | 7C | Compare Condition for Upper Comparator. |
| SECTMATCH-1686 | 1766(1) | 7Y | AND 1909 | 7T | Set ES. |
| TH-1554 | 1564 (1) | 7Y | AND 1829 | 7S | Reset CL. |
| | | | OR 1805 | 7S | Reset CU. |
| | | | AND 1556 | 7Z | Set BD. |
| | | | AND 1628 | 7Z | Reset AD. |
| | | | AND 1526 | 7T | Set BT. |
| | | | AND 1908 | 7T | Set ES. |
| | | | AND 1603 | 7AA | Set DC. |
| | | | AND 1610 | 7AA | Reset DC. |
| | | | OR 619 | 7E | Adder to IIR. |
| | | | OR 678 | 7G | ISR to Accumulator. |
| TH-1554 | 1570 (0) | 7Y | AND 1776 | 7S | Set CU. |
| | | | AND 462 | 7K | TCON to TSCAN and Data BUS 338 to TCON. |
| | | | AND 744 | 7P | TSR to Accumulator. |
| TL-1556 | 1572 (1) | 7Y | AND 1694 | 7R | Set DRO. |
| | | | AND 1749 | 7R | Set CDS. |
| | | | AND 1828 | 7S | Reset CL. |
| | | | OR 1805 | 7S | Reset CU. |
| | | | AND 1796 | 7S | Do. |
| | | | AND 1602 | 7Z | Set AD. |
| | | | AND 1624 | 7Z | Do. |
| | | | AND 1574 | 7Z | Reset BD. |
| | | | AND 1520 | 7T | Set AT. |
| | | | AND 1924 | 7T | Reset ES. |
| | | | AND 1602 | 7AA | Set DC. |
| | | | OR 1610 | 7AA | Reset DC. |
| | | | AND 2116 | 7W | Reset FT. |
| | | | AND 2139 | 7DD | Reset ND. |
| | | | AND 615 | 7E | Adder to IIR. |
| | | | OR 619 | 7E | Do. |
| | | | AND 1402 | 7E | Restart Clock. |
| | | | AND 886 | 7F | PAR to Accumulator. |
| | | | OR 678 | 7G | ISR to Accumulator. |
| TL-1556 | 1588 (0) | 7Y | AND 1776 | 7S | Set CU. |
| | | | AND 462 | 7K | TCON to TSCAN and Data BUS 338 to TCON. |
| | | | AND 744 | 7P | TSR to Accumulator. |
| α1 α2-1014 | 1015 | 7I | AND 1826 | 7S | Reset CL. |
| | | | AND 1850 | 7S | Set BC. |
| | | | AND 1909 | 7T | Set ES. |

B—Detectors

| | | | | | |
|---|---|---|---|---|---|
| DCON τ Detector AND Gate 1040. | 1044 | 7I | Inverter 651 | 7E | Adder to TSR. |
| | | | Inverter 556 | 7M | Force One. |
| ICOMP α1 Detector AND Gate 1134. | 1144 | 7B | AND 2015 | 7BB | Reset P. |
| | | | AND 1340 | 7V | Set INTX 1. |
| | | | AND 697 | 7CC | Set INPARG. |
| | | | AND 601 | 7D | Adder to ISR. |
| | | | AND 823 | 7N | TIR to Accumulator. |
| | | | Inverter 781 | 7P | TSR to Accumulator. |
| | | | AND 705 | 7F | IIR to Accumulator. |
| | | | AND 2016 | 7BB | Reset P. |
| | | | Inverter 1683 | 7Y | Set TL. |
| | | | AND 703 | 7F | IIR to Accumulator. |
| | | | Invester 679 | 7G | ISR to Accumulator. |
| ICOMP α2 Detector AND Gate 1135. | 1145 | 7B | AND 1776 | 7S | Set CU. |
| | | | AND 2000 | 7BB | Set P. |
| | | | OR 760 | 7CC | Set INTX 2. |
| | | | AND 711 | 7F | IIR to Accumulator. |
| | | | Inverter 845 | 7N | TIR to Accumulator. |
| | | | | | Set INTX 1. |
| | | | Inverter 1687 | 7Y | Set TL. |

APPENDIX—*Continued*

B—Detectors

| Element No. and Letter Identifier | Output Line No. | Figure Element Appears in— | Elements Line Applied As Input to— | Figure in Which Element Attached to Appears | Function of Element Attached to— |
|---|---|---|---|---|---|
| ICOMP τ Detector AND Gate 1136. | 1146 | 7B | AND 1799<br>AND 1800<br>AND 2044<br>AND 2045<br>AND 2046<br>AND 760<br>OR 683<br>AND 1964<br>Inverter 647<br>Inverter 837<br><br>Inverter 2053 | 7S<br>7S<br>7AA<br>7AA<br>7AA<br>7CC<br>7CC<br>7EE<br>7E<br>7N<br><br>7AA | Reset CU.<br>Do.<br>Set EA.<br>Do.<br>Do.<br>Set INTX 2.<br>Set INPARG.<br>Set REW.<br>Adder to TSR.<br>TIR to Accumulator.<br>Set INTX 1.<br>Reset EA. |
| ICOMP μ Detector AND Gate 1137. | 1147 | 7B | AND 1980<br>AND 1998<br>AND 886<br>Inverter 803<br>AND 625 | 7U<br>7BB<br>7G<br>7P<br>7E | Set RP.<br>Set P.<br>PIR to Accumulator.<br>Adder to Accumulator.<br>Adder to FIR. |
| ICOMP φ Detector AND Gate 1138. | 1148 | 7B | AND 1882 | 7Z | Set FI. |
| ICOMP δN Detector AND Gate 1139. | 1149 | 7B | OR 575<br>True Complement Circuit 494<br>Inverter 775 | 7B<br>7M<br><br>7P | TCOMP to Adder.<br>Complement Input to Circuit 894.<br>TSR to Accumulator. |
| ICOMP δP Detector AND Gate 1140. | 1150 | 7B | OR 575 | 7B | TCOMP to Adder. |
| ICOMP ν Detector AND Gate 1141. | 1151 | 7B | Inverter 1643 to AND 1645<br>Inverter 1675 to AND 1671<br>OR 760<br>Inverter 843<br><br>OR 683<br>Inverter 1217<br><br>Inverter 1221<br>OR 1677 | 7Y<br>7Y<br>7CC<br>7N<br><br>7CC<br>7C<br><br>7C<br>7Y | Set TH.<br>Set TL.<br>Set INTX 2.<br>TIR to Accumulator.<br>Set INTX 1.<br>Set INPARG.<br>Compare Condition for Uppe Comparator.<br>Do.<br>Set TL. |
| ICOMP N Detector AND Gate 1142. | 1152 | 7B | OR 683<br>OR 760 | 7CC<br>7CC | Set INPARG.<br>Set INTX 2. |
| TCOMP α1 Detector AND Gate 1154. | 1164 | 7J | AND 2084<br>AND 551 | 7BB<br>7M | Set SE.<br>Force One. |
| TCOMP τ Detector AND Gate 1156. | 1166 | 7J | AND 1664<br>AND 1827<br>Inverter 755 to AND 752<br>AND 756<br>OR 644<br>AND 523<br>AND 836<br><br>AND 2095 | 7Y<br>7S<br>7CC<br><br>7CC<br>7E<br>7M<br>7N<br><br>7BB | Set TL.<br>Reset CL.<br>Set INTARG.<br><br>Set INTX 2.<br>Adder to TSR.<br>Force Six.<br>TIR to Accumulator.<br>Set INTX 1.<br>Set EE. |
| TCOMP μ Detector AND Gate 1157. | 1167 | 7J | Inverter 729 | 7P | FIR to Accumulator. |
| TCOMP φ Detector AND Gate 1158. | 1168 | 7J | AND 1168 | 7Z | Set FI. |
| TCOMP δN Detector AND Gate 1159. | 1169 | 7J | OR 561<br>OR 561 | 7CC<br>7M | Set INPARG.<br>Force One. |
| TCOMP δP Detector AND Gate 1160. | 1170 | 7J | OR 561<br>OR 561 | 7CC<br>7M | Set INPARG.<br>Force One. |

C—Data Lines

| | | | | | |
|---|---|---|---|---|---|
| INCOMP DATA (Output From OR 1176). | 1180 | 7B | AND 1679 | 7Y | Set TL. |
| ICOMP DATA (Output From Inverter 1182). | 1184 | 7B | AND 2195<br>OR 683<br>AND 1211<br><br>AND 1213<br>AND 1208<br>AND 1212 | 7U<br>7CC<br>7C<br><br>7C<br>7C<br>7C | Step TR Counter 2170.<br>Set INPARG.<br>Compare Condition for Upper Comparator.<br>Do.<br>Do.<br>Do. |

APPENDIX—*Continued*

C—Data Lines

| Element No. and Letter Identifier | Output Line No. | Figure Element Appears in— | Elements Line Applied As Input to— | Figure in Which Element Attached to Appears | Function of Element Attached to— |
|---|---|---|---|---|---|
| INCOMP DATA —*Continued.* | 1184 | 7B | AND 551<br>AND 554<br>AND 552<br>AND 1214<br><br>AND 1723<br>AND 1695<br>AND 1910<br>AND 1893<br>AND 1724 | 7M<br>7M<br>7M<br>7C<br><br>7R<br>7R<br>7T<br>7Z<br>7R | Force One.<br>Do.<br>Do.<br>Compare Condition for Upper Comparator.<br>Set SS.<br>Do.<br>Set ES.<br>Reset FI.<br>Set SS. |
| TCOMP DATA (Out From Inverter 1188). | 1190 | 7J | OR 2078<br>AND 601<br>AND 705 | 7BB<br>7D<br>7F | Set SE.<br>Adder to ISR.<br>IIR to Accumulator. |

D—Comparator Outputs

| Element No. and Letter Identifier | Output Line No. | Figure Element Appears in— | Elements Line Applied As Input to— | Figure in Which Element Attached to Appears | Function of Element Attached to— |
|---|---|---|---|---|---|
| ISCAN Low From Upper Comparator 108. | 118 | 7C | AND 1645<br>AND 1646<br>AND 1527<br>AND 1432<br>AND 1454<br>AND 1723 | 7Y<br>7Y<br>7T<br>7W<br>7EE<br>7R | Set TH.<br>Do.<br>Set BT.<br>Set ATS, Set FT, Set ND.<br>Set ABIND.<br>Set SS. |
| IMATCH From Upper Comparator 108. | 119 | 7C | AND 1754<br>AND 1695<br>AND 1910<br>AND 2193<br>AND 752<br>OR 760<br>AND 1940<br>AND 601<br>AND 1760 | 7R<br>7R<br>7T<br>7U<br>7CC<br>7CC<br>7DD<br>7D<br>7Y | Reset CDS.<br>Set DRO.<br>Set ES.<br>Step TR Counter 2170.<br>Set INTARG.<br>Set INTX 2.<br>Set NS.<br>Adder to ISR.<br>Set SECTMATCH. |
| ISCAN High From Upper Comparator 108. | 120 | 7C | AND 1662<br>AND 1663<br>AND 1521<br>OR 1438<br>AND 1724 | 7Y<br>7Y<br>7T<br>7W<br>7R | Set TL.<br>Do.<br>AT.<br>Set ATS, Set FT, Set ND.<br>Set SS. |
| TSCAN Low From Lower Comparator 112. | 123 | 7K | AND 1644 | 7Y | Set TH. |
| TMATCH or Lower Match From Lower Comparator 112. | 124 | 7K | AND 1664 | 7Y | Set TL. |
| TSCAN High From Lower Comparator 112. | 125 | 7K | AND 1647 | 7Y | Set TH. |
| IMISMATCH From OR 1276. | 1278 | 7C | AND 2179<br>AND 1798<br>OR 832 | 7U<br>7S<br>7N | Reset TR Counter 2170.<br>Reset CU.<br>TIR to Accumulator Set INTX 1. |
| TR00 From DECODE 2202. | 2210 | 7U | AND 1695<br>AND 1799<br>AND 2046<br>AND 2194<br>AND 1964<br>Inverter 929 | 7R<br>7S<br>7AA<br>7U<br>7EE<br>7K | Set DRO.<br>Reset CU.<br>Set EA.<br>Step TR Counter.<br>Set REW.<br>PAR to ISCAN. |
| TR01 From DECODE 2202. | 2211 | 7U | AND 914 | 7K | PAR to ISCAN. |
| TR10 From DECODE 2202. | 2212 | 7U | AND 964<br><br>AND 932 | 7C<br><br>7K | Set Highest Order Bit in ISCAN to 1.<br>PAR to ISCAN. |

What is claimed is:

1. A system for storing and retrieving data units, each of which has an identifier comprising:
   - a main memory in which a plurality of data units are stored;
   - an auxiliary memory in which related data units to those in said main memory are stored;
   - an additional memory device containing entries indicating the data units stored in said auxiliary memory, the position at which such data units are stored in said auxiliary memory, and the position in said main memory to begin searching for a data unit having an identifier which more nearly matches the desired identifier than that in the additional memory device;
   - means for applying the identifier for a desired data unit to said system;
   - means for scanning the entries in said additional memory device to find the entry having an identifier which most nearly matches that for said desired data unit;
   - means for determining if there is an identifier in said main memory which more nearly matches the identifier of said desired data unit;
   - means responsive to a determination that the identifier in said additional memory device is the one which most nearly matches for retrieving the data unit at the address in said auxiliary memory indicated in said entry; and
   - means responsive to a determination that the identifier in said main memory is the one which most nearly matches for retrieving the data unit from the main memory.

2. A system for storing and retrieving data units, each of which has an identifier comprising:
   - a read-only memory device in which a plurality of data units are stored;

a read-write memory device in which related data units to those in said read-only memory are stored;

an additional memory device containing entries indicating the data units stored in said read-write memory device, the position at which such data units are stored in said read-write memory, and the position in said read-only memory to begin searching for a data unit having an identifier which more nearly matches the desired identifier than that in the additional memory device;

means for applying the identifier for a desired data unit to said system;

means for scanning the entries in said additional memory device to find the entry having an identifier which most nearly matches that for said desired data unit;

means for determining if there is an identifier in said read-only memory which more nearly matches the identifier of said desired data unit;

means responsive to a determination that the identifier in said additional memory device is the one which most nearly matches for retrieving the data unit at the address in said read-write memory device indicated in said entry; and means responsive to a determination that the identifier in said read-only memory device is the one which most nearly matches for retrieving the data unit from the read-only memory device.

3. A system for storing and retrieving data units comprising:

a read-only memory in which a plurality of data units are stored in predetermined address positions;

a read-write memory in which related data units to those in said read-only memory are stored;

means for applying to said system the read-only memory address position of a desired data unit;

means for storing a table containing an entry for each data unit stored in said read-write memory, each entry containing the corresponding read-only memory device address and the address in said read-write memory at which the related data unit is stored;

means for storing a directory containing an entry for each of a predetermined number of sub-divisions in said table, each of said entries containing the address in said table at which the corresponding sub-division begins;

means for applying a predetermined portion of the desired address in said read-only memory to said directory causing the corresponding entry therein to be accessed to give the address in said table at which a search therein should be begun;

means for scanning said table to determine if there is an entry therein containing the desired read-only memory position address;

means responsive to the finding of said desired read-only memory position address in said table for causing the data unit at the address in said read-write memory indicated in the matched-on table entry to be retrieved; and means responsive to the absence of an entry in said table containing the desired read-only memory position address for causing the data unit to be retrieved from said desired position address in said main memory.

4. A system for storing and retrieving data units, each of which has an identifier comprising:

a read-only memory in which a plurality of said data units and the identifiers therefor are stored in an ordered sequence;

a read-write memory in which related data units to those in said read-only memory are stored;

means for applying to said system the identifier for the data unit which it is desired to retrieve;

means for storing a table containing an entry for each data unit stored in said read-write memory, each of said entries containing the identifier for the related data unit, the position at which said data unit is stored in said read-write memory, and the position in said read-only memory to begin searching for the data unit having an identifier which more nearly matches the desired identifier than that in the additional memory device;

means for scanning said table to find the entry containing an identifier which most nearly matches the input identifier;

means for determininig if there is an identifier in said read-only memory which more nearly matches said input identifier;

means responsive to a determination that the identifier in said table is the one which most nearly matches said input identifier for retrieving the data unit at the address in said read-write memory contained in the matched-on table entry; and means responsive to a determination that there is an identifier in said read-only memory which more nearly matches said input identifier for retrieving the data unit corresponding to said matched-on identifier from said read-only memory.

5. A system for storing and retrieving data units, each of which has an identifier comprising:

a read-only memory in which a plurality of said data units and the identifiers therefor are stored in an ordered sequence;

a read-write memory in which related data units to those in said read-only memory are stored;

means for applying to said system the identifier for the data unit which it is desired to retrieve;

means for storing a table containing an entry for each data unit stored in said read-write memory, each of said entries containing the identifier for the related data unit, the position at which said data unit is stored in said read-write memory, and the position in said read-only memory to begin searching for a data unit having an identifier which more nearly matches the desired identifier than that in the additional memory device;

means for storing a directory containing an entry for each of a predetermined number of sub-divisions of said identifiers, each of said entries containing the addess in said table storing means at which a search is to be begun for entries which fall within the indicated sub-division;

means for applying a predetermined portion of the input identifier to said directory;

means responsive to the portion of said identifier applied to said directory for causing a search to be begun in said table at the address in said table storing means at which entries for the sub-division in which the input identifier falls begin;

means for scanning said table to find the entry containing an identifier which most nearly matches the input identifier;

means for determining if there is an identifier in said read-only memory which more nearly matches said input identifier;

means responsive to a determination that the identifier in said table is the one which most nearly matches said input identifier for retrieving the data unit at the address in said read-write memory contained in the matched-on table entry; and means responsive to a determination that there is an identifier in said read-only memory which more nearly matches said input identifier for retrieving the data unit corresponding to said matched-on identifier from said read-only memory.

6. A system for storing and retrieving data units, each of which has an identifier comprising:

a read-only memory in which a plurality of said data units and the identifiers therefor are stored in an ordered sequence;

a read-write memory in which related data units to those in said read-only memory are stored;

means for applying to said system the identifier for the data unit which it is desired to retrieve;

means for storing a table containing an entry for each data unit stored in said read-write memory, each of said entries containing the identifier for the related data unit, the position at which said data unit is stored in said read-write memory, and the position in said read-only memory to begin searching for a data unit having an identifier which more nearly matches the desired identifier than that in the additional memory device;

means for scanning said table to find the entry containing an identifier which most nearly matches the input identifier;

means for comparing said matched-on table entry identifier with identifiers from said read-only memory device starting with an entry in said read-only memory device determined with the aid of the position indicated in said matched-on table entry;

means responsive to a determination that the matched-on table entry identifier is more significant than the identifier from said read-only memory which it is being compared against for retrieving the data at the address in said read-write memory indicated in said matched-on table entry;

means responsive to a determination that the read-only memory identifier being compared on is more significant than the matched-on table entry identifier for causing a comparison to be made between the remainder of the read-only memory identifier and the corresponding portion of the input identifier;

means responsive to a mismatch during said last mentioned comparison for causing the comparison between the matched-on table entry identifier and a read-only memory identifier to be repeated with a new read-only memory identifier; and means responsive to a match during said read-only memory identifier versus input identifier comparison for retrieving the data unit corresponding to said matched-on identifier from said read-only memory device.

7. A system for storing and retrieving data units, each of which has an identifier comprising:

a read-only memory in which a plurality of said data units and the identifiers therefor are stored in an ordered sequence;

a read-write memory in which related data units to those in said read-only memory are stored;

means for applying to said system the identifier for the data unit which it is desired to retrieve;

means for storing a table containing an entry for each data unit stored in said read-write memory, each of said entries containing the identifier for the related data unit, the position at which said data unit is stored in said read-write memory, and the position in said read-only memory to begin searching for a data unit having an identifier which more nearly matches the desired identifier than that in the additional memory device;

means for storing a directory containing an entry for each of a predetermined number of sub-divisions of said identifiers, each of said entries containing the address in said table storing means at which a search is to be begun for entries which fall within the indicated sub-division;

means for applying a predetermined portion of the input identifier to said directory;

means responsive to the portion of said identifier applied to said directory for causing a seach to be begun in said table at the address in said table storing means at which entries for the sub-division in which the input identifier falls begin;

means for scanning said table to find the entry containing an identifier which most nearly matches the input identifier;

means for comparing said matched-on table entry identifier with identifiers from said read-only memory device starting with an entry in said read-only memory device determined with the aid of the position indicated in said matched-on table entry;

means responsive to a determination that the matched-on table entry identifier is more significant than the identifier from said read-only memory which it is being compared against for retrieving the data unit at the address in said read-write memory indicated in said matched-on table entry;

means responsive to a determination that the read-only memory identifier being compared on is more significant than the matched-on table entry identifier for causing a comparison to be made between the remainder of the read-only memory identifier and the corresponding portion of the input identifier;

means responsive to a mismatch during said last mentioned comparison for causing the comparison between the matched-on table entry identifier and a read-only memory identifier to be repeated with a new read-only memory identifier; and means responsive to a match during said read-only memory identifier versus input identifier comparison for retrieving the data unit corresponding to said matched-on identifier from said read-only memory device.

8. A system for storing and retrieving data units comprising:

a read-only memory in which a plurality of data units are stored in predetermined address positions;

a read-write memory in which related data units to those in said read-only memory are stored;

means for applying to said system the read-only memory address position of a desired data unit;

means for storing a table containing an entry for each data unit stored in said read-write memory, each entry containing the corresponding read-only memory device address and the address in said read-write memory at which the related data unit is stored;

means for storing a directory containing an entry for each of a predetermined number of sub-divisions in said table, each of said entries containing the address in said table at which the corresponding sub-division begins and a predetermined position in which a mark appears if there are no entries in said table for the corresponding sub-division;

means for applying a predetermined portion of the desired address in said read-only memory to said directory causing the corresponding entry therein to be accessed to give the address in said table at which a search therein should be begun;

means for determining whether there is a mark in the predetermined position of the accessed directory entry;

means responsive to the detection of a mark in the predetermined position of the accessed directory entry for causing the data unit to be retrieved from said desired position address in said main memory;

means for scanning said table to determine if there is an entry therein containing the desired read-only memory position address;

means responsive to the finding of said desired read-only memory position address in said table for causing the data unit at the address in said read-write memory indicated in the matched-on table entry to be retrieved; and means, including in part said mark detection responsive means, operative in response to the absence of an entry in said table containing the desired read-only memory position address for causing the data unit to be retrieved from said desired position address in said main memory.

9. A system for storing and retrieving data units comprising:

a read-only memory in which a plurality of data units are stored in predetermined address positions;

a read-write memory in which related data units to those in said read-only memory are stored;

means for applying to said system the read-only memory address position of a desired data unit;

means for storing a table containing an entry for each data unit stored in said read-write memory, each entry containing the corresponding ready-out memory device address, the address in said read-write memory at which the related data unit is stored, and a mark in a predetermined position thereof if the entry is the last entry of a sub-division in said table;

means for storing a directory containing an entry for each of a predetermined number of sub-divisions in said table, each of said entries containing the address in said table at which the corresponding sub-division begins and a predetermined position in which a mark appears if thereare no entries in said table for the corresponding sub-division;

means for applying a predetermined portion of the desired address in said read-only memory to said directory causing the corresponding entry therein to be accessed to give the address in said table at which a search therein should be begun;

means for determining whether there is a mark in the predetermined position of the accessed directory or table entry;

means for scanning said table to determine if there is an entry therein containing the desired read-only memory position address;

means responsive to the detection of a mark in the predetermined position of the accessed direction entry or to the combined occurrence of a mark in the predetermined position of the table entry and to the absence of said desired read-only memory position in the table entry for causing the data unit to be retrieved from said desired position address in said main memory;

means responsive to the finding of said desired read-only memory position address in said table for causing the data unit at the address in said read-write memory indicated in the matched-on table entry to be retrieved; and means, including in part said mark detection responsive means, operative in response to the absence of an entry in said table containing the desired read-only memory position address for causing the data unit to be retrieved from said desired position address in said main memory.

10. A system for storing and retrieving data units comprising:

a read-only memory device on which a plurality of data units are stored in predetermined address positions on closed tracks, there being for each data unit an early-warning entry the address of which differs in a predetermined way from the address of said data unit, each early-warning entry being positioned a predetermined number of degrees advanced on the track from the corresponding data unit;

a read-write memory in which related data units to those stored in said read-only memory device are stored;

means for applying to said system the read-only memory address position of a desired data unit;

means for storing a table containing an entry for each data unit stored in said read-write memory, each entry containing the corresponding read-only memory address and the address in said read-write memory at which the related data unit is stored;

means for scanning said table to determine if there is an entry therein containing the desired read-only memory position address;

means responsive to the finding of said read-only memory position address in said table for causing the data unit at the address in said read-write memory indicated in the matched-on table entry to be retrieved;

means responsive to the absence of a matching entry in said table for causing a search to be initiated in said read-only memory for the track containing the desired address position;

means responsive to the finding of the track containing the desired address position for initiating a search to find the early-warning entry the address of which differs from that of the desired entry in a predetermined way;

means responsive to the finding of said early-warning entry for generating a warning signal which may be used for any desired purpose and for initiating a search for the desired address position; and means responsive to the finding of said desired address position for causing a read-out of the desired data unit.

11. A system for storing and retrieving data units, each of which has an identifier comprising:

a read-only memory in which a plurality of said data units and the identifiers therefor are stored in an ordered sequence;

a read-write memory in which related data units to those in said read-only memory are stored;

means for applying to said system the identifier for the data unit which it is desired to retrieve;

means for storing a table containing an entry for each data unit stored in said read-write memory, each of said entries containing the identifier for the related data unit, the position at which said data unit is stored in said read-write memory, the position in said read-only memory to begin searching for a data unit having an identifier which may more nearly match the desired identifier than that in the additional memory device, and a mark in a predetermined position thereof if there is no data unit in said read-write memory corresponding to the entry in the table;

means for scanning said table to find the entry containing an identifier which most nearly matches the input identifier;

a mark indicator;

means responsive to the detection of a mark in the predetermined position of the entry containing the matched-on identifier for setting said mark indicator;

means for determining if there is an identifier in said read-only memory which more nearly matches said input identifier;

means responsive to a determination that the identifier in said table is the one which most nearly matches said input identifier and to said mark indicator not being set for retrieving the data unit at the address in said read-write memory contained in the matched-on table entry;

means responsive to said mark indicator being set for retrieving the data unit corresponding to the best matched-on identifier in said read-only memory; and means, including in part said last mentioned means, responsive to a determination that there is an identifier in said read-only memory which more nearly matches said input identifier for retrieving the data unit corresponding to said matched-on identifier from said read-only memory.

12. A system for storing and retrieving data units, each of which has an identifier comprising:

a photostore memory device in which a plurality of said data units and the identifiers therefor are stored in an ordered sequence on tracks;

a read-write memory in which related data units to those in said photostore memory are stored;

means for applying to said system the identifier for the data unit which it is desired to retrieve;

means for storing a table containing an entry for each data unit stored in said read-write memory, each of said entries containing the identifier for the related data unit, the position at which said data unit is stored in said read-write memory, and the track in said photostore to begin searching for a data unit having an identifier which may more nearly match the desired identifier than that in the additional memory device;

means for storing a directory containing an entry for each of a predetermined number of sub-divisions of said identifiers, each of said entries containing the address in said table storing means at which a search is to be begun for entries which fall within the indicated sub-division;

means for applying a predetermined portion of the input identifier to said directory;

means responsive to the portion of said identifier applied to said directory for causing a search to be begun in said table at the address in said table storing means at which entries for the sub-division in which the input identifier falls begin;

means for scanning said table to find the entry containing an identifier which most nearly matches the input identifier;

means operable after a match has been detected in said table for accessing the photostore track indicated in the table entry containing the matched-on identifier;

means for searching, starting at the accessed track, for the first track containing an identifier just higher than said desired identifier;

means for comparing said matched-on table entry identifier with identifiers from entries on said first track containing a higher identifier;

means responsive to a determination that the matched-on table entry identifier is more significant than any identifier from said photostore memory for retrieving the data at the address in said read-write memory indicated in said matched-on table entry;

means responsive to a determination that the photostore memory identifier being compared on is more significant than the matched-on table entry identifier for causing a comparison to be made between the remainder of the photostore memory identifier and the corresponding portion of the input identifier;

means responsive to a mismatch during said last mentioned comparison for causing the comparison between the matched-on table entry identifier and photostore memory identifier to be repeated with a new photostore memory identifier; and means responsive to a match during said photostore memory identifier versus input identifier comparison for retrieving the data unit corresponding to said matched-on identifier from said photostore memory.

13. A system for storing and retrieving data units, each of which has an identifier comprising:

a read-only memory in which a plurality of said data units and the identifiers therefor are stored in an ordered sequence;

a read-write memory in which related data units to those in said read-only memory are stored;

means for applying to said system the identifier for the data unit which it is desired to retrieve;

means for storing a prefix identifier;

means for storing a table containing an entry for each data unit stored in said read-write memory, each of said entries containing the identifier for the related data unit, the position at which said data unit is stored in said read-write memory, and the position in said read-only memory to begin searching for a data unit having an identifier which may more nearly match the desired identifier than that in the additional memory device;

means for scanning said table to find the entry containing an identifier which most nearly matches the prefix and input identifiers;

means for determining if there is an identifier in said read-only memory which more nearly matches said prefix and input identifiers;

means responsive to a determination that the identifier in said table is the one which most nearly matches said prefix and input identifiers for retrieving the data unit at the address in said read-write memory contained in the matched-on table entry; and means responsive to a determination that there is an identifier in said read-only memory which more nearly matches said prefix and input identifiers for retrieving the data unit corresponding to said matched-on identifier from said read-only memory.

14. A system for storing and retrieving data units, each of which has an identifier comprising:

a read-only memory in which a plurality of said data units and the identifiers therefor are stored in an ordered sequence;

a read-write memory in which related data units to those in said read-only memory are stored;

means for applying to said system the identifier for the data unit which it is desired to retrieve;

means for storing a table containing an entry for each data unit stored in said read-write memory, each of said entries containing the identifier for the related data unit, the position at which said data unit is stored in said read-write memory, and the position in said read-only memory to begin searching for a data unit having an identifier which may more nearly match the desired identifier than that in the additional memory device;

comparison means having two inputs;

arithmetic means for normally causing successive characters of the identifiers being applied to the inputs of said comparison means to be applied to said inputs, said arithmetic means being operable in response to certain characters in the identifier applied to one of said inputs for causing certain characters in one of said identifiers to be skipped over;

means for applying said input identifier to one input of said comparison means and successive identifiers from said table to the other input of said comparison means until the table entry identifier which most nearly matches the input identifier is located;

means for applying the matched-on table entry identifier to one input of said comparison means and successive identifiers from said read-only memory starting with an entry in said read-only memory determined with the aid of the position indicated in said matched-on table entry to the other input of said comparison means;

means responsive to a determination that the matched-on table entry identifier is more significant than the identifier from said read-only memory which it is being compared against for retrieving the data unit at the address in said read-write memory indicated in said matched-on table entry;

means responsive to a determination that the read-only memory identifier being compared on is more significant than the matched-on table entry identifier for causing the remainder of the read-only memory identifier to be applied to one input of said comparison means and the corresponding portion of the input identifier to be applied to the other input of said comparison means;

means responsive to a mismatch during said last mentioned comparison for causing the matched-on table entry identifier to again be applied to one input of said comparison means and for causing a new read-only memory identifier to be applied to the other input of said comparison means; and means responsive to a match during a comparison between a read-only memory identifier and an input identifier for retrieving the data unit corresponding to said matched-on identifier from said read-only memory device.

15. A system for storing and retrieving data units, which data units are stored in a plurality of different dictionaries comprising:

a read-only memory in which said dictionaries of data units are stored;

a read-write memory in which related data units to those in said read-only memory are stored;

means for applying to said system a designation for the data unit which it is desired to retrieve;

means for storing a table for each of said dictionaries, said tables containing an entry for each data unit stored in said read-write memory, each of said entries containing the designation for the related data unit and the position at which said data unit is stored in said read-write memory;

means for accessing the table corresponding to the dictionary in which said desired data unit is stored;

means for scanning said table to determine if the designation which best matches said input designation is contained therein;

means responsive to a determination that the designation which best matches said input designation is contained in said table for retrieving the data unit at the address in said read-write memory contained in the entry having said best matched designation; and means responsive to a determination that said best matched designation is not in said table for causing said data unit to be retrieved from said read-only memory.

16. A system for storing and retrieving data units, which data units are stored in two different dictionaries comprising:

a read-only memory in which said dictionaries of data units are stored with an address designation being included with the data units in one of said dictionaries and an identifier included with the data units in the other of said dictionaries;

a read-write memory in which related data units to those in said read-only memory are stored;

means for indicating to the system which dictionary a desired data unit is stored in;

means for applying to said system the address designation or the identifier for the data unit which it is desired to retrieve;

means for storing a table for each of said dictionaries, said tables containing an entry for each data unit stored in said read-write memory, each of the table entries for the table corresponding to the dictionary which includes address designations containing the address designation for the corresponding data unit in the read-only memory device and the address in said read-write memory at which the related data unit is stored, and each table entry for the table corresponding to the dictionary which includes identifiers containing the identifier for the related data unit, the position at which said data unit is stored in said read-write memory, and the position in said read-only memory to begin searching for a data unit having an identifier which may more nearly match the desired identifier than that in said table entry;

means for storing a directory containing an entry for each of a predetermined number of sub-divisions in said tables, each of said entries containing the address in each of said tables at which a search is to be begun for entries which fall within the corresponding sub-divisions;

means for applying a predetermined portion of the input identifier or address designation to said directory;

means responsive to said dictionary indicating means and to the portion of said identifier or address designation applied to said directory for causing a search to be begun in the proper table at the address in said table at which entries for the sub-division in which the input identifier address designation falls begin;

means for scanning said table to determine if the identifier or address designation which best matches said input identifier or address designation is contained therein;

means responsive to a determination that the identifier or address designation which best matches said input identifier or address designation is contained in said table for retrieving the data unit at the address in said read-write memory contained in the entry having said best-matched identifier or address designation; and means responsive to a determination that said best-matched identifier or address designation is not in said table for causing said data unit to be retrieved from said read-only memory.

References Cited

UNITED STATES PATENTS

| | | | |
|---|---|---|---|
| 2,843,841 | 7/1958 | King et al. | 340—172.5 X |
| 3,195,109 | 7/1965 | Behnke | 340—172.5 |
| 3,242,467 | 3/1966 | Lamy | 340—172.5 |
| 3,248,708 | 4/1966 | Haynes | 340—172.5 |
| 3,275,991 | 9/1966 | Schneberger | 340—172.5 |

ROBERT C. BAILEY, *Primary Examiner.*

PAUL J. HENON, *Examiner.*